United States Patent
Toolis et al.

(10) Patent No.: US 11,505,702 B2
(45) Date of Patent: Nov. 22, 2022

(54) CONTROLLED CURE RATE USING POLYETHER-COATED SYNERGISTS

(71) Applicant: PRC-DeSoto International, Inc., Sylmar, CA (US)

(72) Inventors: Amy Liane Toolis, Natrona Heights, PA (US); Lorraine Hsu, Allison Park, PA (US); Justin Martin, Harrison City, PA (US)

(73) Assignee: PRC-DESOTO INTERNATIONAL, INC., Sylmar, CA (US)

( * ) Notice: Subject to any disclaimer, the term of this patent is extended or adjusted under 35 U.S.C. 154(b) by 844 days.

(21) Appl. No.: 16/376,034

(22) Filed: Apr. 5, 2019

(65) Prior Publication Data
US 2020/0317918 A1 Oct. 8, 2020

(51) Int. Cl.
*C08L 81/04* (2006.01)
*C09K 3/10* (2006.01)

(52) U.S. Cl.
CPC ............ *C08L 81/04* (2013.01); *C09K 3/1012* (2013.01); *C09K 2200/0239* (2013.01); *C09K 2200/0247* (2013.01); *C09K 2200/0657* (2013.01); *C09K 2200/0682* (2013.01)

(58) Field of Classification Search
CPC ....... C08L 81/04; C08L 71/02; C09K 3/1012; C09K 2200/0247; C09K 2200/0657; C09K 2200/0682; C08K 3/22; C08K 5/3725; C08G 75/14
USPC ....................................................... 524/493
See application file for complete search history.

(56) References Cited

U.S. PATENT DOCUMENTS

| | | |
|---|---|---|
| 3,499,864 A | 3/1970 | Millen |
| 3,517,082 A | 6/1970 | Cockerham |
| 4,020,033 A | 4/1977 | Dannels |
| 4,623,711 A | 11/1986 | Morris et al. |
| 7,009,032 B2 | 3/2006 | Bojkova et al. |
| 8,486,363 B2 | 7/2013 | Hung et al. |
| 8,816,023 B2 | 8/2014 | Anderson et al. |
| 8,993,691 B2 | 3/2015 | Anderson et al. |
| 9,079,833 B2 | 7/2015 | Klobes et al. |
| 9,422,451 B2 | 8/2016 | Rao et al. |
| 9,663,619 B2 * | 5/2017 | Echigoya ............... C08G 18/52 |
| 2004/0220327 A1 | 11/2004 | Cosman et al. |
| 2006/0115669 A1 * | 6/2006 | Shinohara ............. C08F 283/00 428/524 |
| 2009/0118401 A1 * | 5/2009 | Saito .................... C09D 143/04 524/100 |
| 2010/0159238 A1 | 6/2010 | Reyes, Jr. et al. |
| 2016/0152775 A1 | 6/2016 | Tobis et al. |
| 2018/0312714 A1 * | 11/2018 | Fishel ..................... B27K 3/15 |

FOREIGN PATENT DOCUMENTS

| | | |
|---|---|---|
| EP | 2848590 | 3/2015 |
| JP | 62-53354 B2 | 12/2017 |
| WO | 2018/057337 A1 | 3/2018 |
| WO | 2020/206416 A1 | 10/2020 |

OTHER PUBLICATIONS

International Search Report and Written Opinion for Application No. PCT/US2020/026855, dated Jun. 8, 2020, 8 pages.
International Preliminary Report on Patentability for Application No. PCT/US2020/026855, dated Sep. 28, 2021, 6 pages.

* cited by examiner

*Primary Examiner* — Hannah J Pak
(74) *Attorney, Agent, or Firm* — William R. Lambert

(57) ABSTRACT

Polysulfide compositions having a polyether synergist are disclosed. Polysulfide compositions that contain polyether synergists exhibit a rapid onset of cure and have acceptable final properties. The polysulfide compositions can be used as sealants.

16 Claims, 11 Drawing Sheets

CONTROLLED CURE RATE USING POLYETHER-COATED SYNERGISTS

FIELD

Polysulfide compositions containing polyether synergists are disclosed. Polysulfide compositions that contain polyether synergists exhibit a rapid onset of cure and have acceptable cure properties. The polysulfide compositions can be used as sealants.

BACKGROUND

Polysulfide compositions typically include a polysulfide cure activator and a polysulfide cure accelerator to control the cure rate. To achieve acceptable performance such as tensile strength and elongation, large amounts of filler including porous material are typically added to the polysulfide compositions. Although the filler can enhance the physical properties of the cured polysulfide composition, the filler can also reduce the cure rate. A porous material such as silica has been observed to reduce the cure rate of polysulfide sealants. Although the silica content can be reduced, silica is unique in its ability to impart enhanced physical properties to the cured polysulfide composition.

Polysulfide formulations that contain porous materials such as silica and that exhibit a rapid cure rate and acceptable cured properties are desired.

SUMMARY

According to the present invention, compositions comprise: a polysulfide prepolymer; a polysulfide cure activator; a polysulfide cure accelerator; a porous material; and a synergist, wherein the synergist comprises a polyether, and wherein the composition comprises from 0.1 wt % to 10 wt % of the synergist, wherein wt % is based on the total weight of the composition.

According to the present invention, sealant systems comprise: (a) a first part, wherein the first part comprises a polysulfide prepolymer; and (b) a second part, wherein the second part comprises a polysulfide cure activator; wherein at least one of the first part and the second part independently comprises a synergist wherein the synergist comprises a polyether, a porous material, a polysulfide cure accelerator, or a combination of any of the foregoing, and wherein the sealant system comprises from 0.1 wt % to 10 wt % of the synergist, wherein wt % is based on the total weight of the first part and the second part.

BRIEF DESCRIPTION OF THE DRAWINGS

The drawings described herein are for illustration purposes only. The drawings are not intended to limit the scope of the present disclosure.

DETAILED DESCRIPTION

Figure 1:
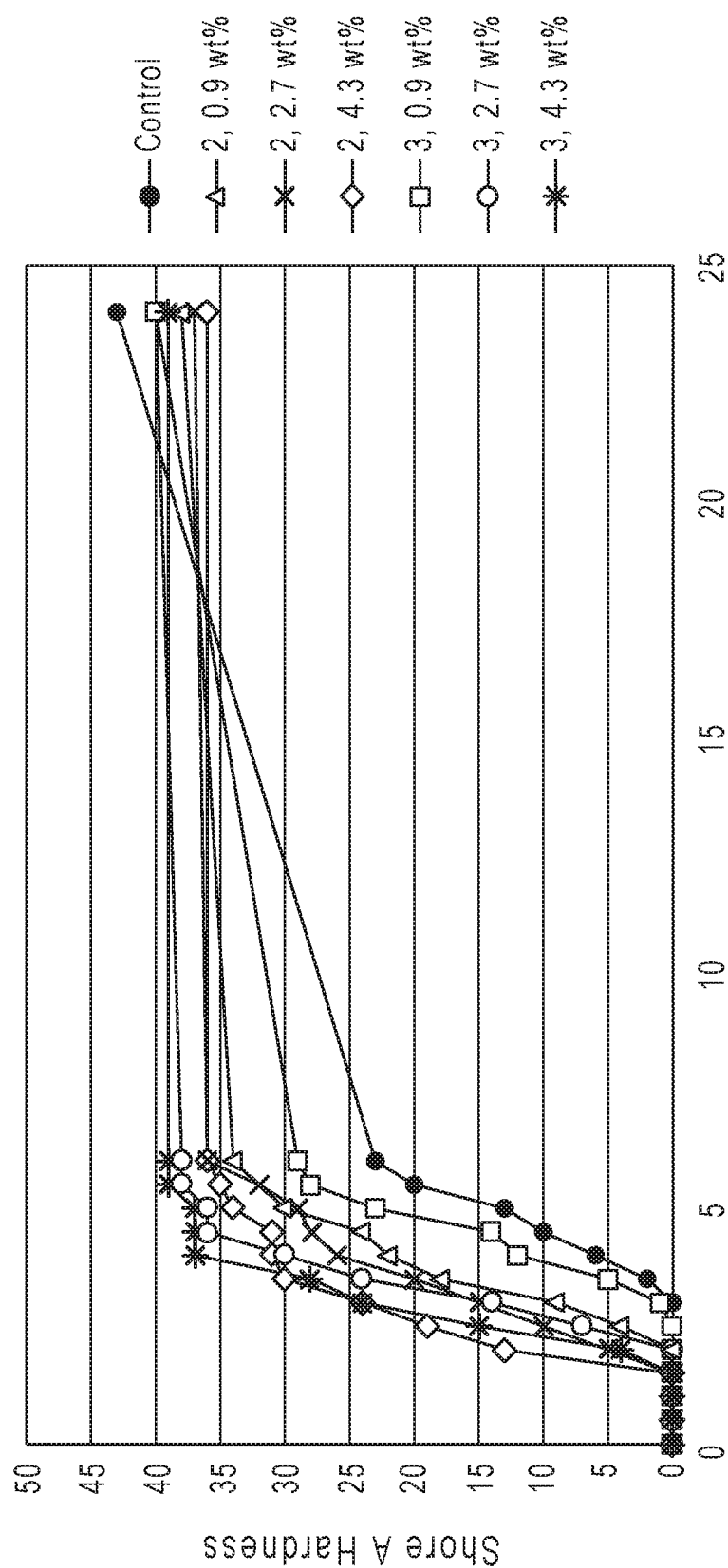
FIG. 1 shows the Shore A hardness during cure of polysulfide sealants containing different amounts and different types of polyethers.

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("-") that is not between two letters or symbols is used to indicate a point of bonding for a substituent or between two atoms. For example, —$CONH_2$ is attached through the carbon atom.

"Alkanediyl" refers to a diradical of a saturated or unsaturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, and dodecane-1,12-diyl.

"Alkyl" refers to a monoradical of a saturated or unsaturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group is $C_{1-6}$ alkyl, $C_{1-4}$ alkyl, and $C_{1-3}$ alkyl.

"Arenediyl" refers to diradical monocyclic or polycyclic aromatic group. Examples of arenediyl groups include benzene-diyl and naphthalene-diyl. An arenediyl group can be $C_{6-12}$ arenediyl, $C_{6-10}$ arenediyl, $C_{6-9}$ arenediyl, or benzene-diyl.

A "branched" group such as a branched $C_{2-10}$ alkanediyl refers to a non-linear $C_{2-10}$ alkanediyl in which at least one carbon atom is bonded to at least three carbon atoms. For example, the moiety —$CH_2$—$CH_2$—$CH_2$—$CH_2$— is a linear $C_4$ alkanediyl, and the moiety —$CH_2$—$CH(-CH_3)$—$CH_2$—$CH_2$— is an example of a branched $C_4$ alkanediyl.

"BET surface area" is determined according to DIN EN ISO 9277/DIN 66132.

"Total pore volume" is determined using $N_2$ desorption isotherms according to ASTM D-3663-78.

"Average pore diameter" is determined using $N_2$ desorption isotherms according to ASTM D-3663-78.

"Composition" is intended to encompass a product comprising the specified components in the specified amounts, as well as any product which results, directly or indirectly, from the combination of the specified ingredients in the specified amounts.

A "polysulfide cure activator" is an oxidant that provides a source of oxygen for the oxidation of terminal thiol groups of a polysulfide.

"Polysulfide cure accelerators" such as organic bases can increase the rate of oxidation of thiol groups.

As used herein, the term "cure" or "cured" as used in connection with a composition, e.g., "composition when cured" or a "cured composition", means that any curable or crosslinkable components of the composition are at least partially reacted or crosslinked.

A "curable composition" refers to a composition that comprises at least two reactants capable of reacting to form a cured composition. For example, a curable composition can comprise an isocyanate-terminated chain-extended polythioether prepolymer and a polyamine capable of reacting to form a cured polymer. A curable composition may include a catalyst for the curing reaction and other components such as, for example, filler, pigments, and adhesion promoters. A curable composition may be curable at room temperature or may require exposure to elevated temperature such as a temperature above room temperature or other condition(s) to initiate and/or to accelerate the curing reaction. A curable composition may initially be provided as a two-part composition including, for example, a separate base component and an accelerator component. The base composition can contain one of the reactants participating in the curing reaction such as an isocyanate-terminated chain-extended polythioether prepolymer and the accelerator component can contain the other reactant such as a polyamine. The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec). A Class B sealant composition, which is suitable for fillet seal applications, can be characterized by a viscosity from 4,500 poise to 20,000 poise (450 Pa-sec to 2,000 Pa-sec). A Class C sealant composition, which is suitable for fay seal applications, can be characterized by a viscosity from 500 poise to 4,500 poise (50 Pa-sec to 450 Pa-sec). The viscosity of the compositions is measured as described herein. After the two components of a sealant system are combined and mixed, the curing reaction can proceed, and the viscosity of the curable composition can increase and at some point, will no longer be workable, as described herein. The duration between when the two components are mixed to form the curable composition and when the curable composition can no longer be reasonably or practically applied to a surface for its intended purpose can be referred to as the working time. As can be appreciated, the working time can depend on a number of factors including, for example, the curing chemistry, the catalyst used, the application method, and the temperature. Once a curable composition is applied to a surface (and during application), the curing reaction can proceed to provide a cured composition. A cured composition develops a tack-free surface, cures, and then fully cures over a period of time. A curable composition can be considered to be cured when the hardness of the surface is at least Shore 30A for a Class B sealant or a Class C sealant. After a sealant has cured to a hardness of Shore 30A it can take from several days to several weeks for a curable composition fully cure. A composition is considered fully cured when the hardness no longer increases. Depending on the formulation, a fully cured sealant can exhibit, for example, a hardness from Shore 40A to Shore 70A, determined according to ISO 868. For coating applications, a curable composition can have a viscosity, for example, from 200 cps to 800 cps 0.2 (Pa-sec to 0.8 Pa-sec). For sprayable coating and sealant compositions, a curable composition can have a viscosity, for example, from 15 cps to 100 cps (0.015 Pa-sec to 0.1 Pa-sec), such as from 20 cps to 80 cps (0.02 Pa-sec to 0.0.8 Pa-sec).

"JRF Type I" (Jet Reference Fluid Type I) is employed for determination of solvent resistance and has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1., available from SAE (Society of Automotive Engineers). JRF Type I testing is performed according to methods described in ASTM D792 (American Society for Testing and Materials) or AMS 3269 (Aerospace Material Specification).

"(Meth)acryloyl" refers to —O—C(=O)—CH=$CH_2$ and —O—C(=O)—C(—$CH_3$)=$CH_2$ groups.

"Molecular weight" refers to a theoretical molecular weight estimated from the chemical structure of a compound such as a monomeric compound, or a number average molecular weight as appropriate for a prepolymer determined, for example, by gel permeation chromatography using polystyrene standards.

"Particle diameter" is determined according to the median value obtained from laser diffraction measurement according to ISO 13320.

"Polyether" refers to a compound that contains two or more ether groups, —O. A polyether can be a monomer such as a crown ether and/or a prepolymer such as a polyethylene glycol "Polyether synergist" refers to a polyether that when added to a curable composition such as a manganese dioxide-cured polysulfide composition accelerates the cure rate of the curable composition. The polyether synergist serves to augment other cure accelerators that may be in the curable composition.

"Polyfunctional moiety" refers to the moiety containing three or more moieties bonded to a common moiety. A common moiety can be derived from, for example, an atom such as a carbon atom, a cycloalkane, a heterocycloalkane, an arene, a heteroarene, an alkane, or a heteroalkane group. A polyfunctional moiety can be, for example, $C_{2-20}$ alkane-triyl, $C_{2-20}$ heteroalkane-triyl, $C_{5-10}$ cycloalkane-triyl, $C_{5-10}$ heterocycloalkane-triyl, $C_{6-20}$ alkanecycloalkane-triyl, $C_{6-20}$ heteroalkanecycloalkane-triyl, substituted $C_{2-20}$ alkane-triyl, substituted $C_{2-20}$ heteroalkane-triyl, substituted $C_{5-10}$ cycloalkane-triyl, substituted $C_{5-10}$ heterocycloalkane-triyl, substituted $C_{6-20}$ alkanecycloalkane-triyl, or substituted $C_{6-20}$ heteroalkanecycloalkane-triyl. A polyfunctional moiety can be, for example, $C_{2-8}$ alkane-tetrayl, $C_{2-8}$ heteroalkane-tetrayl, $C_{5-10}$ cycloalkane-tetrayl, $C_{5-10}$ heterocycloalkane-tetrayl, $C_{6-10}$ arene-tetrayl, $C_4$ heteroarene-tetrayl, substituted $C_{2-8}$ alkane-tetrayl, substituted $C_{2-8}$ heteroalkane-tetrayl, substituted $C_{5-10}$ cycloalkane-tetrayl, substituted $C_{5-10}$ heterocycloalkane-tetrayl, substituted $C_{6-10}$ arene-tetrayl, and substituted $C_{4-10}$ heteroarene-tetrayl.

"Polysulfide" refers to a prepolymer that contains one or more polysulfide linkages, i.e., —$S_x$— linkages, where x is from 2 to 4, in the prepolymer backbone. A polysulfide prepolymer can have two or more sulfur-sulfur linkages. Suitable thiol-terminated polysulfide prepolymers are commercially available, for example, from AkzoNobel and Toray Industries, Inc. under the tradenames Thioplast® and from Thiokol-LP®, respectively.

"Porous material" refers to materials comprising of voids or pores in which the sizes of the pores can be broadly distributed ranging from nanometers to micrometers. A porous material can comprise porous inorganic material, porous organic material, or a combination thereof. A porous material can be a filler, a rheology control agent, an extender, a flame retardant, a corrosion inhibitor, or a combination of any of the foregoing. A porous material can be characterized, for example, by a BET from 5 $m^2$/g to 700 $m^2$/g; a total pore volume from 0.01 mL/g to 10 mL/g; an average pore diameter from 5 nm to 30 nm; or a combination of any of the foregoing. A porous material can be characterized, for example, by a BET greater than 5 $m^2$/g; a total pore volume greater than 0.01 mL/g; an average pore diameter greater than 5; or a combination of any of the foregoing.

"Prepolymer" refers to oligomers, homopolymers, and copolymers. A prepolymer includes repeating units in the prepolymer backbone. A homopolymer refers to a prepolymer in which the repeat units are the same. A copolymer refers to a prepolymer includes alternating copolymers, random copolymers, and block copolymers. A prepolymer can have a number average molecular weight, for example, greater than 1,000 Da, greater than 2,000 Da, or greater than 3,000 Da. For thiol-terminated prepolymers, molecular weights are number average molecular weights "Mn" as determined by end group analysis using iodine titration. For example, the SH content of thiol-terminated prepolymer can be determined using iodine titration. For prepolymers that are not thiol-terminated, the number average molecular weights are determined by gel permeation chromatography using polystyrene standards. A prepolymer comprises reactive groups capable of reacting with another compound such as a curing agent or crosslinker to form a cured polymer. A prepolymer such as a chain-extended polythioether prepolymer provided by the present disclosure can be combined with a curing agent to provide a curable composition, which can cure to provide a cured polymer network. Prepolymers are liquid at room temperature (25° C.) and pressure (760 torr; 101 kPa). Prepolymers are reacted with another compound to provide a cured polymer network. A prepolymer includes multiple repeating subunits bonded to each other than can be the same or different. The multiple repeating subunits make up the backbone of the prepolymer.

Shore A hardness is measured using a Type A durometer in accordance with ASTM D2240.

"Silica" refers to $SiO_2$ and can be in the form of particles. Silica includes, for example, ionic silica, non-ionic silica, hydrophobic silica, hydrophilic silica, untreated silica, treated silica, fumed silica, precipitated silica, and combinations of any of the foregoing.

Specific gravity and density of compositions and sealants is determined according to ISO 2781.

"Thiol-terminated" refers to —SH end groups such as terminal groups of a prepolymer.

When reference is made to a chemical group defined, for example, by a number of carbon atoms, the chemical group is intended to include all sub-ranges of carbon atoms as well as a specific number of carbon atoms. For example, a $C_{2-10}$ alkanediyl includes a $C_{2-4}$ alkanediyl, $C_{5-7}$ alkanediyl, and other sub-ranges, a $C_2$ alkanediyl, a $C_6$ alkanediyl, and alkanediyls having other specific number(s) of carbon atoms from 2 to 10.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

The addition of small amounts of polyethers to a polysulfide composition can increase the cure rate without degrading the performance attributes of the cured polysulfide composition.

Polysulfide compositions provided by the present disclosure include a polysulfide prepolymer, a polysulfide cure activator, a polysulfide cure accelerator, a porous material, and a synergist, where the synergist comprises a polyether. A polysulfide composition may optionally include, for example, filler, adhesion promoters, thixotropes, plasticizers, fire retardants, corrosion inhibitor, colorants, moisture control additives, extenders, solvents, and combinations of any of the foregoing.

A polysulfide prepolymer can include a single polysulfide prepolymer or a combination of polysulfide prepolymers. A polysulfide prepolymer can comprise a thiol-terminated polysulfide prepolymer.

Examples of suitable polysulfide prepolymers are disclosed, for example, in U.S. Pat. Nos. 4,623,711 and 7,009,032.

A polysulfide prepolymer can be a blend of di- and tri-functional molecules where the difunctional polysulfide prepolymers can comprise the structure of Formula (1a) or can comprise a moiety of Formula (1):

—(—R—S—S—)$_n$—R— (1)

HS—(—R—S—S—)$_n$—R—SH (1a)

and the trifunctional polysulfide prepolymers can have the structure of Formula (2a) or can comprise a moiety of Formula (2):

—(—R—S—S—)$_a$—CH$_2$—CH{—CH$_2$—(—S—S—R—)$_b$—}{—(—S—S—R—)$_c$—} (2)

HS—(—R—S—S—)$_a$—CH$_2$—CH{—CH$_2$—(—S—S—R—)$_b$—SH}{—(—S—S—R—)$_c$—SH} (2a)

where each R is —(CH$_2$)$_2$—O—CH$_2$—O—(CH$_2$)$_2$—, and n=a+b+c, where the value for n can be from 7 to 38 depending on the amount of the trifunctional cross-linking agent (1,2,3-trichloropropane; TCP) used during synthesis of the polysulfide prepolymer. Suitable polysulfide prepolymers can have a number average molecular weight from less than 1,000 Da to 6,500 Da, an SH (thiol) content from 1% to greater than 5.5%, and a cross-linking density from 0% to 2.0%.

Examples of suitable thiol-terminated polysulfide prepolymers having a moiety of Formula (2) or the structure of Formula (2a) include Thioplast™ G polysulfides such as Thioplast™ G1, Thioplast™ G4, Thioplast™ G10, Thioplast™ G12, Thioplast™ G21, Thioplast™ G22, Thioplast™ G44, Thioplast™ G122, and Thioplast™ G131, which are commercially available from AkzoNobel.

A polysulfide prepolymer can comprise, for example, a combination of Thioplast™ G1 and Thioplast™ 112.

A polysulfide prepolymer can have a number average molecular weight from 1,000 Da to 7,500 Da, an SH (thiol) content from 0.8% to 7.7%, and a cross-linking density from 0% to 2%. A polysulfide prepolymer can have the general structure of Formula (3a) or can comprise a moiety of Formula (3):

—[(CH$_2$)$_2$—O—CH$_2$—O—(CH$_2$)$_2$—S—S—]$_n$—(CH$_2$)$_2$—O—CH$_2$—O—(CH$_2$)$_2$— (3)

HS—[(CH$_2$)$_2$—O—CH$_2$—O—(CH$_2$)$_2$—S—S—]$_n$—(CH$_2$)$_2$—O—CH$_2$—O—(CH$_2$)$_2$—SH (3a)

where n can be selected such that the number average molecular weight from 1,000 Da to 7,500 Da, such as, for example, an integer from 8 to 80.

Examples of suitable thiol-terminated polysulfide prepolymers having a moiety of Formula (3) or the structure of Formula (3a) also include Thiokol™ LP polysulfides commercially available from Toray Industries, Inc. such as Thiokol™ LP2, Thiokol™ LP3, Thiokol™ LP12, Thiokol™ LP23, Thiokol™ LP33, and Thiokol™ LP55.

A thiol-terminated sulfur-containing prepolymer can comprise a Thiokol-LP™ polysulfide, a Thioplast™ G polysulfide, or a combination thereof.

A thiol-terminated polysulfide prepolymer can comprise a thiol-terminated polysulfide prepolymer of Formula (4a) or can comprise a moiety of Formula (4):

—R—(S$_y$—R)$_t$— (4)

HS—R—(S$_y$—R)$_t$—SH (4a)

where,
t can be an integer from 1 to 60;
q can be an integer from 1 to 8;
p can be an integer from 1 to 10;
r can be an integer from 1 to 10;
y can have an average value within a range from 1.0 to 1.5; and each R can independently be selected from branched alkanediyl, branched arenediyl, and a moiety having the structure —(CH$_2$)$_p$—O—(CH$_2$)$_q$—O—(CH$_2$)$_r$—.

In thiol-terminated polysulfide prepolymers of Formula (4a) and moieties of Formula (4), t can be, for example, an integer from 2 to 60, from 1 to 40, or from 1 to 20.

In thiol-terminated polysulfide prepolymers of Formula (4a) and moieties of Formula (4), q can be, for example, an integer from 1 to 6, or an integer from 1 to 4. For example, q can be 1, 2, 3, 4, 5 or 6.

In thiol-terminated polysulfide prepolymers of Formula (4a) and moieties of Formula (4), each p can be, for example, an integer from 1 to 6 or from 1 to 4. For example, each p can be 1, 2, 3, 4, 5, 6, 7, 8, 9, or 10.

In thiol-terminated polysulfide prepolymers of Formula (4a) and moieties of Formula (4), each r can be, for example, an integer from 1 to 6 or from 1 to 4. For example, each p can be 1, 2, 3, 4, 5, 6, 7, 8, 9, or 10.

In thiol-terminated polysulfide prepolymers of Formula (4a) and moieties of Formula (4), each y can independently have a value of 1, 2, 3, 4, 5, or 6.

In thiol-terminated polysulfide prepolymers of Formula (4a) and moieties of Formula (4), y can have an average value, for example, of 1, such as from 1.05 to 2, from 1.1 to 1.8., or from 1.1 to 1.5.

In thiol-terminated polysulfide prepolymers of Formula (4a) and moieties of Formula (4), R can be —(CH$_2$)$_p$—O—(CH$_2$)$_q$—O—(CH$_2$)$_r$—.

In thiol-terminated polysulfide prepolymers of Formula (4a) and moieties of Formula (4), R can be —(CH$_2$)$_p$—O—(CH$_2$)$_q$—O—(CH$_2$)$_r$—, each q can be 1, 2, 3, or 4, and each p and r can be 1 or 2.

In thiol-terminated polysulfide prepolymers of Formula (4a) and moieties of Formula (4), 0% to 20% of the R groups can comprise branched alkanediyl or branched arenediyl, and 80% to 100% of the R groups can be —(CH$_2$)$_p$—O—(CH$_2$)$_q$—O—(CH$_2$)$_r$—.

In thiol-terminated polysulfide prepolymers of Formula (4a) and moieties of Formula (4), a branched alkanediyl or a branched arenediyl can be —R$^1$(-A)$_n$- where R$^1$ is a hydrocarbon group, n is 1 or 2, and A is a branching point. A branched alkanediyl can have the structure —CH$_2$(—CH(—CH$_2$—)—.

Thiol-terminated polysulfide prepolymers of Formula (4a) and moieties of Formula (4) can be prepared by reacting an α,ω-dihalo organic compound, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene.

Examples of thiol-terminated polysulfide prepolymers of Formula (4a) and moieties of Formula (4) are disclosed, for example, in U.S. Application Publication No. 2016/0152775, in U.S. Pat. No. 9,079,833, and in U.S. Pat. No. 9,663,619.

A thiol-terminated polysulfide prepolymer can comprise a thiol-terminated polysulfide prepolymer of Formula (5a) or can comprise a moiety of Formula (5):

—(R—O—CH$_2$—O—R—S$_m$)$_{n-1}$—R—O—CH$_2$—O—R— (5)

HS—(R—O—CH$_2$—O—R—S$_m$)$_{n-1}$—R—O—CH$_2$—O—R—SH (5a)

where R can be $C_{2-4}$ alkanediyl, m can be an integer from 1 to 8, and n can be an integer from 2 to 370.

In thiol-terminated polysulfide prepolymers of Formula (5a) and moieties of Formula (5), m can have an average value, for example, greater than 1, such as from 1.05 to 2, or from 1.1 to 1.8.

In thiol-terminated polysulfide prepolymers of Formula (5a) and moieties of Formula (5), m can be, for example, an integer from 1 to 6, and integer from 1 to 4, or the integer 1, 2, 3, 4, 5, 6, 7, or 8.

In thiol-terminated polysulfide prepolymers of Formula (5a) and moieties of Formula (5), n can be, for example, an integer from 2 to 200 or an integer from 2 to 100.

In thiol-terminated polysulfide prepolymers of Formula (5a) and moieties of Formula (5), each R can independently be selected from ethanediyl, 1,3-propanediyl, 1,1-propanediyl, 1,2-propanediyl, 1,4-butanediyl, 1,1-butanediyl, 1,2-butanediyl, and 1,3-butanediyl.

Examples of thiol-terminated polysulfide prepolymers of Formula (5a) and moieties of Formula (5) are disclosed, for example, in JP 62-53354.

Thiol-terminated polysulfide prepolymers can be liquid at room temperature. Thiol-terminated monosulfide prepolymers can have a viscosity of less than 1,500 poise (150 Pa-sec), such as from 40 poise to 500 poise (4 Pa-sec to 50 Pa-sec), at a temperature of about 25° C. and a pressure of 760 mm Hg (101 kPa) determined according to ASTM D-2849 § 79-90 using a Brookfield CAP 2000 viscometer.

Thiol-terminated polysulfide prepolymers can have a number average molecular weight, for example, from 300 Da to 10,000 Da, such as from 1,000 Da to 8,000 Da, wherein the molecular weight is determined by gel-permeation chromatography using a polystyrene standard. Thiol-terminated polysulfide prepolymers can have a glass transition temperature $T_g$ less than $-40°$ C., less than $-55°$ C., or less than $-60°$ C. The glass transition temperature $T_g$ is determined by Dynamic Mass Analysis (DMA) using a TA Instruments Q800 apparatus with a frequency of 1 Hz, an amplitude of 20 microns, and a temperature ramp of $-80°$ C. to $25°$ C., with the $T_g$ identified as the peak of the tan $\delta$ curve.

Compositions provided by the present disclosure can comprise, for example, from 30 wt % to 70 wt %, from 35 wt % to 65 wt %, from 40 wt % to 60 wt %, or from 45 wt % to 55 wt %, of a polysulfide prepolymer or combination of polysulfide prepolymers, wherein wt % is based on the total weight of the composition. For example, a composition can comprise greater than 30 wt %, greater than 40 wt %, greater than 50 wt %, or greater than 70 wt % of a polysulfide prepolymer or a combination of polysulfide prepolymers, wherein wt % is based on the total weight of the composition.

Compositions provided by the present disclosure can comprise a polysulfide cure activator or a combination of polysulfide cure activators.

A polysulfide cure activator can comprise an oxidizing agent capable of oxidizing terminal mercaptan groups to form disulfide bonds. Examples of suitable oxidizing agents include lead dioxide, manganese dioxide, calcium dioxide, sodium perborate monohydrate, calcium peroxide, zinc peroxide, and dichromate.

A polysulfide cure activator can comprise an inorganic activator, an organic activator, or a combination thereof.

Examples of suitable inorganic activators include metal oxides. Examples of suitable metal oxide activators include zinc oxide (ZnO), lead oxide (PbO), lead peroxide (PbO$_3$), manganese dioxide (MnO$_2$), sodium perborate (NaBO$_3$.H$_2$O), potassium permanganate (KMnO$_4$), calcium peroxide (CaCO$_3$), barium peroxide (BaO$_3$), cumene hydroperoxide, and combinations of any of the foregoing. A polysulfide cure activator can be MnO$_2$.

Metal oxides can be complexed with fatty acids in the form of fatty acid esters such as stearic acid, lauric acid, palmitic acid, oleic acid, and naphthenic acid. The fatty acid can serve to facilitate dispersion of the polysulfide cure activator and can function as a solubilizing agent for the metal oxide.

Compositions provided by the present disclosure can comprise, for example, from 1 wt % to 10 wt % of a polysulfide cure activator or combination of polysulfide cure activators, wherein wt % is based on the total weight of the composition. For example, a composition can comprise from 1 wt % to 9 wt %, from 2 wt % to 8 wt %, from 3 wt % to 7 wt %, or from 4 wt % to 6 wt % of an activator or a combination of polysulfide cure activators, wherein wt % is based on the total weight of the composition. For example, a composition can comprise greater than 1 wt % of a polysulfide cure activator or a combination of polysulfide cure activators, greater than 2 wt %, greater than 3 wt %, greater than 4 wt %, greater than 5 wt %, or greater than 6 wt % of a polysulfide cure actuator or combination of polysulfide cure activators, wherein wt % is based on the total weight of the composition.

Compositions provided by the present disclosure can include a polysulfide cure accelerator or combination of polysulfide cure accelerators.

Polysulfide cure accelerators can act as sulfur donors to generate active sulfur fragments capable of reacting with the terminal thiol groups of a thiol-terminated polysulfide prepolymer.

Examples of suitable polysulfide cure accelerators include thiazoles, thiurams, sulfenamides, guanidines, dithiocarbamates, xanthates, thioureas, aldehydeamines, and combinations of any of the foregoing.

A polysulfide cure accelerator can be thiuram polysulfide, a thiuram disulfide, or a combination thereof.

Examples of suitable thiazoles include bis(2-benzothiazole) disulfide (MBTS), 2-mercaptobenzothiazole (MBT), and the zinc salt of mercaptobenzothiazole (ZMBT).

Examples of suitable thiurams include tetramethyl thiuram monosulfide, tetramethyl thiuram disulfide (TMTD), tetraethyl thiuram disulfide, tetrabutyl thiuram disulfide, dipentamethylene thiuram hexasulfide, dicyclohexamethylene thiuram disulfide, diisopropyl thiuram disulfide, bis(morpholinothiocarbonyl) sulfide, tetramethyl thiuram monosulfide (TMTM), dipentamethylene thiuram tetrasulfide (DPTT), and compounds having the structure (R)$_2$N—C(=S)—S$_x$—C(=S)—N(R)$_2$ where each R can be C$_{1-6}$ alkyl and x is an integer from 1 to 4, and combinations of any of the foregoing.

Examples of suitable sulfenamides include N-cyclohexyl-2-benzothiazolsulfenamide, tertbutyl-2-benzothiazolsulfenamide (TBBS), dicyclohexyl-2-benzothiazolsulfenamide (DCBS), and combinations of any of the foregoing.

Examples of suitable guanidines include diphenyl guanidine (DPG), N,N'-diorthotolyl guanidine (DOTG), compounds having the structure R—NH—C(=NH)—NH—R where each R is selected from C$_{1-6}$ alkyl, phenyl and toluoyl, and combinations of any of the foregoing.

Examples of suitable dithiocarbamates include zinc dialkyl dithiocarbamates such as dimethyl-dithiocarbamate (ZDMC), diethyl-dithiocarbamate (ZDEC) and dibutyl-dithiocarbamate (ZDBC), other metal or ammonium salts of dithiocarbamoic acid, compounds having the structure Zn(—S—C(=S)—N(R)$_2$) where each R is selected from C$_{1-6}$ alkyl, phenyl and toluoyl, and combinations of any of the foregoing.

Examples of suitable xanthates include zinc salts of xanthic acid.

Examples of suitable thioureas include ethylene thiourea (ETU), dipentamethylene thiourea (DPTU), dibutyl thiourea (DBTU), and compounds having the structure R—NH—C(=S)—NH—R where each R is selected from C$_{1-6}$ alkyl, phenyl and toluoyl, and combinations of any of the foregoing.

Examples of suitable aldehydeamines include condensation products of aldehydes and amines, such as aniline, ammoniac or their derivates and also butyraldehyde, crotonylaldehyde or formaldehyde such as butyraldehydeaniline and tricrotonylidenetetramine, and combinations of any of the foregoing.

Examples of other suitable polysulfide cure accelerators include triazines and sulfides or metallic and amine salts of dialkyldithiophosphoric acids and dithiophosphates such as triazines and sulfides or metallic and amine salts of dialkyldithiophosphoric acids, and combinations of any of the foregoing. For example, a polysulfide cure accelerator can be a dithiophosphoric having the structure Zn(—S—C(=S)—(OR)$_2$).

Examples of non-sulfur-containing polysulfide cure accelerators include tetramethyl guanidine (TMG), di-o-tolyl guanidine (DOTG), sodium hydroxide (NaOH), water and bases.

Compositions provided by the present disclosure can comprise, for example, from 0.01 wt % to 2 wt % of a polysulfide cure accelerator or combination of polysulfide cure accelerators, from 0.05 wt % to 1.8 wt %, from 0.1 wt % to 1.6 wt %, or from 0.5 wt % to 1.5 wt % of a polysulfide cure accelerator or combination of polysulfide cure accelerators, where wt % is based on the total weight of the composition.

Compositions provided by the present disclosure can comprise, for example, less than 2 wt %, less than 1.8 wt %, less than 1.6 wt %, less than 1.4 wt %, less than 1.2 wt %, less than 1 wt %, less than 0.5 wt %, less than 0.1 wt %, or less than 0.05 wt % of a polysulfide cure accelerator or combination of polysulfide cure accelerators, where wt % is based on the total weight of the composition.

Compositions provided by the present disclosure can comprise a synergist or combination of synergists. A synergist acts to enhance the activity of the polysulfide cure activator and polysulfide cure accelerator. A synergist can be particularly effective in accelerating the cure rate of compositions containing a porous material.

Examples of suitable synergists include polyethers that are terminated in hydroxyl groups, alkyl groups, alkoxy groups, (meth)acryloyl groups, substituted phenyl, or substituted aryloxy groups. A synergist can include a polyether terminated in hydroxyl groups or alkoxy groups.

The polyether backbone can be a prepolymer such as a homopolymer or a copolymer. A prepolymer includes repeating units in the prepolymer backbone. A homopolymer refers to a prepolymer in which the repeat units are the same. A copolymer refers to a prepolymer includes alternating copolymers, random copolymers, and block copolymers.

A polyether synergist can have a functionality, for example, from 1 to 6, such as from 1 to 4, from 1 to 3, from 1 to 2. A polyether synergist can have a functionality of 1, 2, 3, 4, 5, or 6. For combinations of polyethers, the average functionality can be, for example, from 1 to 6, from 1 to 5, from 1 to 4, from 1 to 3, or from 1 to 2.

A polyether synergist can have a molecular weight, for example, from 100 Da to 4,000 Da, from 100 Da to 3,000 Da, from 100 Da to 2,000 Da, from 200 Da, to 1,750 Da, from 250 Da, to 1,500 Da, from 500 Da to 1,250 Da, or from 500 Da to 1,000 Da.

A polyether synergist can have a molecular weight, for example, less than 4,000 Da, less than 3,000 Da, less than 2,000 Da, less than 1,500 Da, less than 1,000 Da, less than 750 Da, less than 500 Da, or less than 250 Da.

A polyether synergist can be liquid at a temperature of 25° C. and pressure of 760 torr (101 kPa).

Examples of suitable polyether synergists include polyethylene glycols, polypropylene glycols, methoxypolyethylene glycol, polytetrahydrofuran, or combinations of any of the foregoing. The combinations can include homopolymers having different chemical structure or can be copolymers in which the segments of the copolymer have a different chemical structure.

Polyether synergists include homopolymer polyethers and copolymer polyethers.

Suitable polyethylene glycols and methoxypolyethylene glycols are available under the Carbowax™ tradename from Dow Chemical.

A polyether synergist can have the chemical structure of Formula (6a)-(6k):

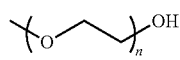

(6a)

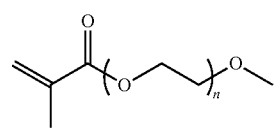

(6b)

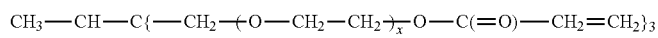

(6c)

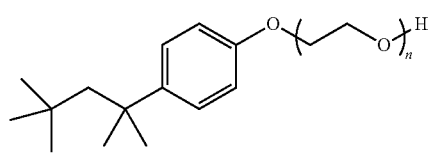

(6d)

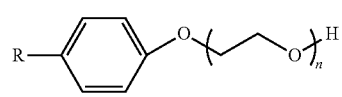

(6e)

-continued

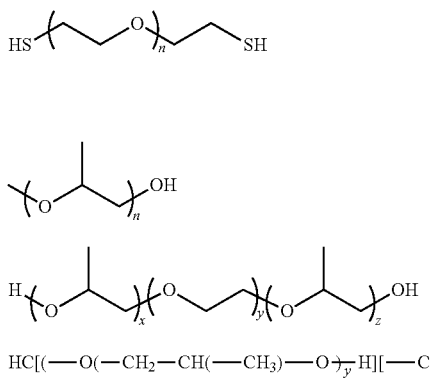

(6f)

(6g)

(6h)

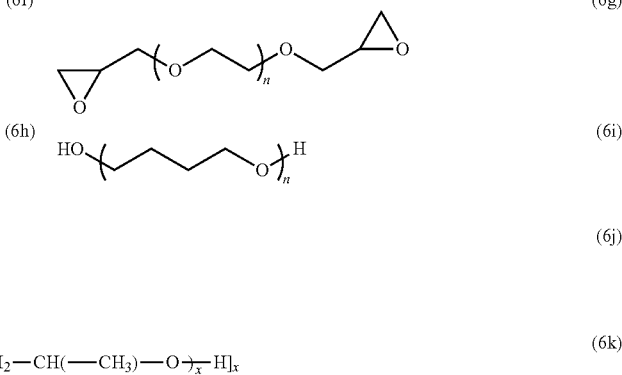

(6i)

(6j)

(6k)

HC[(—O(—CH₂—CH(—CH₃)—O$\xrightarrow{}_y$H][—CH₂—O—(CH₂—CH(—CH₃)—O$\xrightarrow{}_x$H]$_x$ where each n, x, y, and z can be selected from an integer from 1 to 20, such as from 1 to 15, from 1 to 10, from 5 to 20, from 5 to 15, or from 5 to 10; and R can be $C_{1-10}$ alkyl.

A polyether can comprise Carbowax™ 200, Carbowax™ 300, Carbowax™ 400, Carbowax™ 540, Carbowax™ 600, Carbowax™ 1000, Carbowax™ 1450, Carbowax™ 350, Carbowax™ 550, Carbowax™ 750, or a combination of any of the foregoing, which are commercially available from Dow Chemical.

A polyether synergist can comprise a (methoxy polyethyleneglycol methacrylate) such as Bisomer® MPEG350MA, Bisomer® DEGDMA, Bisomer® EP100DMA, Bisomer® EP150DMA, Bisomer® MPEG550MA, Bisomer® PEG200DMA, Bisomer® PEM63P, Bisomer® PPA6, Bisomer® PPM5, Bisomer® S10W, Bisomer® S20W, or a combination of any of the foregoing, which are commercially available from GEO Specialty Chemicals.

A polyether synergist can comprise, for example, CD553 (MPEG 550), CD730, SR230 (DEGDA), SR231 (DEGDMA), SR203 (THFMA), SR259 (PEG2000DA), SR268 (TTEGDA), SR272, SR306F (TPGDA), SR344 (PEG400DA), SR508 (DPGDA), SR550 (MPEG350MA), SR551 (MPEG550MA), SR6030P (PEG400DMA), SR610 (PEG600DA), SR611, SR644 (PPGDMA400), SR499 (EO6TMPTA), SR501 (PO6TMPTA), SR502 (EO9TMPTA), SR9035 (EO35TMPTA), or a combination of any of the foregoing, which are commercially available from Sartomer America.

A polyether can comprise an ocytlphenyl ethoxylate such as Triton® X-100, Triton® X-102, Triton® X-14, Triton® X-15, Triton® X-165, Triton® X-305, Triton® X-25, and Triton® X-405, or a combination of any of the foregoing, which are commercially available from Dow Chemical.

A polyether synergist can comprise a polyether glycol such as Terathane® PTMEG 250, Terathane® PTMEG 650, Terathane® PTMEG 1000, Terathane® PTMEG 1400, Terathane® PTMEG 1800, Terathane® PTMEG 2000, or a combination of any of the foregoing, which are commercially available from Invista.

A polyether synergist can comprise an ethylene glycol block copolymers such as a ethylene oxide-capped with propylene oxide. Examples include Plurionic® block copolymers such as Pluronic® 17R4, which are commercially available from BASF. Plurionic® 17R4 is a poly(ethylene glycol)-block poly(propylene glycol)-block-poly(ethylene glycol) copolymer.

A polyether synergist can comprise a polypropylene glycol such as Voranol® 220-056, Voranol® 220-056N, Voranol® 220-094, Voranol® 220-110N, Voranol® 220-260, Voranol® 220-530, Voranol® 222-056, or a combination of any of the foregoing, which are commercially available from Dow Chemical.

A polyether synergist can comprise, for example, polyethylene glycols, polyethylene oxides, poly(ethylene glycol) diacrylates, poly(ethylene glycol) diglycidyl ethers, poly (ethylene glycol) dimethacrylates, poly(ethylene glycol) mono methylethers, poly(ethylene glycol) monomethyl ether monomethacrylates, aliphatic block polyethylene glycols, or a combination of any of the foregoing, which are commercially available, for example, from Polysciences, Inc.

Suitable polyether synergists can comprise two or more consecutive ethylene oxide or phenylene oxide units.

A polyether synergist can include a non-sulfur-containing glycol or a derivative thereof. Non-sulfur-containing glycols do not contain sulfur atoms.

A polyether synergist can have a hydroxyl functionality, for example, from 1 to 6, such as from 1 to 5, from 1 to 4, from 1 to 3, or from 1 to 2. A glycol can have a hydroxyl functionality, for example, of 1, 2, 3, 4, 5, or 6.

A polyether synergist can be an ethoxylated or methoxylated derivative of a corresponding polyether. For example, a polyether can include terminal acryloyl or terminal methacryloyl groups.

Suitable polyethers include cyclic polyethers such as crown ethers. Examples of suitable crown ethers include 12-crown-4, 15-crown-5, 18-crown-6, dibenzo-18-crown-6, diaza-18-crown-6, and combinations of any of the foregoing. Suitable crown ethers are commercially available from Parchem.

Polyether synergists can comprise a polyether having the structure of Formula (7), the structure of Formula (8), or a combination thereof:

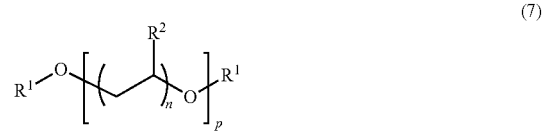

(7)

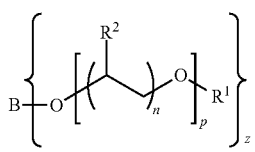
(8)

wherein, n is an integer from 1 to 6;
p is an integer from 2 to 50;
z is an integer from 3 to 6;
each $R^1$ is independently selected from hydrogen, $C_{1-10}$ alkyl, (meth)acrylate, and substituted aryl;
each $R^2$ is independently selected from hydrogen and $C_{1-3}$ alkyl; and
B is a polyfunctional moiety.

In polyethers of Formula (7) and Formula (8), each n can independently be selected from an integer from 1 to 6, from 1 to 5, from 1 to 4, from 1 to 3, or from 1 to 2.

In polyethers of Formula (7) and Formula (8), each n can independently be selected from 1, 2, 3, 4, 5, or 6.

In polyethers of Formula (7) and Formula (8), p can be an integer from 2 to 50, from 2 to 40, from 2 to 30, from 2 to 20, from 2 to 10, or from 2 to 5.

In polyethers of Formula (7) and Formula (8), each z can independently be selected from an integer from 3 to 6, from 3 to 5, or from 3 to 4.

In polyethers of Formula (7) and Formula (8), each z can independently be selected from 3, 4, 5, or 6.

In polyethers of Formula (7) and Formula (8), each $R^1$ can independently be selected from hydrogen, $C_{1-10}$ alkyl, (meth)acryloyl, and substituted aryl.

In polyethers of Formula (7) and Formula (8), each $R^1$ can be hydrogen.

In polyethers of Formula (7) and Formula (8), each $R^1$ can independently be selected from hydrogen and $C_{1-3}$ alkyl, such as methyl, ethyl, propyl, or isopropyl.

In polyethers of Formula (7) and Formula (8), each $R^1$ can be (meth)acryloyl.

In polyethers of Formula (7) and Formula (8), each $R^1$ can be substituted phenyl, wherein the substituent is selected from $C_{1-12}$ alkyl.

In polyethers of Formula (7) and Formula (8), each $R^1$ can be para-substituted phenyl, wherein the substituent is selected from $C_{1-12}$ alkyl, such as $C_{1-10}$ alkyl, $C_{1-8}$ alkyl, $C_{1-6}$ alkyl, $C_{1-4}$ alkyl, methyl, ethyl, propyl, isopropyl, n-butyl, tert-butyl, and iso-butyl.

In polyethers of Formula (7) and Formula (8), each $R^1$ can be substituted phenyl, such as para-substituted phenyl, wherein the substituent group is selected from $C_{1-10}$ alkyl.

In polyethers of Formula (7) and Formula (8), each $R^2$ can independently be selected from hydrogen, methyl, ethyl, propyl, and iso-propyl.

In polyethers of Formula (7) and Formula (8), B can be a polyfunctional core having a functionality, z, for example, from 3 to 6, from 3 to 5, or from 3 to 4. Z can be, for example, of 3, 4, 5, or 6.

In polyethers of Formula (7) and Formula (8), B can be $C_{2-20}$ alkane-triyl, $C_{2-20}$ heteroalkane-triyl, $C_{2-20}$ alkane-tetrayl, or $C_{2-20}$ heteroalkane-tetrayl.

In polyethers of Formula (7) and Formula (8), B can be $CH_3-CH_2-C(-CH_2-)_3$.

A polyether can be an ionic polyether, a non-ionic polyether, or a combination thereof.

Compositions provided by the present disclosure can comprise a filler or combination of filler.

Compositions provided by the present disclosure can comprise, for example, from 5 wt % to 95 wt %, from 10 wt % to 60 wt % of a filler or combination of filler, from 15 wt % to 55 wt %, from 20 wt % to 50 wt %, from 25 wt % to 45 wt %, or from 30 wt % to 40 wt % of a filler or combination of filler, where wt % is based on the total weight of the composition. Compositions provided by the present disclosure can comprise, for example, greater than 5 wt % of a filler or combination of filler, greater than 10 wt %, greater than 20 wt %, greater than 30 wt %, greater than 40 wt %, greater than 50 wt %, or greater than 60 wt %, of a filler or combination of filler, where wt % is based on the total weight of the composition. Compositions provided by the present disclosure can comprise, for example, less than 10 wt % of a filler or combination of filler, less than 20 wt %, less than 30 wt %, less than 40 wt %, less than 50 wt %, less than 60 wt %, or less than 70 wt %, of a filler or combination of filler, where wt % is based on the total weight of the composition. The filler can comprise a combination of non-porous filler and porous filler.

For example, from 1 wt % to 10 wt % of the filler in a composition can be a porous filler and from 90 wt % to 99 wt % can be non-porous filler.

A filler can comprise a porous material and/or a non-porous material. A filler, including a porous material and a non-porous material, can comprise an inorganic filler, an organic filler, a low-density filler, or a combination of any of the foregoing.

A filler can comprise a porous material or combination of porous materials.

For example, a porous material can have a BET surface area from 5 $m^2/g$ to 700 $m^2/g$, such as from 10 $m^2/g$ to 600 $m^2/g$, from 50 $m^2/g$ to 500 $m^2/g$, or from 100 $m^2/g$ to 400 $m^2/g$. A porous material can have a BET surface area greater than 5 $m^2/g$, greater than 50 $m^2/g$, greater than 100 $m^2/g$, greater than 200 $m^2/g$, greater than 400 $m^2/g$, or greater than 600 $m^2/g$. BET surface area is measured according to DIN EN ISO 9277/DIN 66132

A porous material can have a pore volume, for example, from 0.01 mL/g to 10 mL/g, such as from 0.05 mL/g to 8 mL/g, from 0.1 mL/g to 6 mL/g, or from 1 mL/g to 5 mL/g. A porous material can have a pore volume, for example, greater than 0.01 mL/g, greater than 0.05 mL/g, greater than 0.1 mL/g, greater than 0.5 mL/g, greater than 1 mL/g, greater than 2 mL/g, greater than 4 mL/g, greater than 6 mL/g, or greater than 8 mL/g. Pore volume is measured using $N_2$ desorption isotherms according to ASTM D-3663-78.

A porous material can have an average pore diameter, for example, from 1 nm to 100 nm, from 2 nm to 80 nm, from 3 nm to 60 nm, from 5 nm to 40 nm, or from 10 nm to 30 nm. A porous material can have an average pore diameter, for example, greater than 1 nm, greater than 5 nm, greater than 10 nm, greater than 30 nm, greater than 40 nm, greater than 60 nm, or greater than 80 nm. Average pore diameter is measured using $N_2$ desorption isotherms according to ASTM D-3663-78.

A porous material can have an average diameter (d50) from 0.1 μm to 40 μm, such as from 0.5 μm to 30 μm, from 1 μm to 20 μm, or from 2 μm to 10 μm. A porous material can have an average (d50) diameter, for example, greater than 0.1 μm, greater than 0.5 μm, greater than 1 μm, greater than 5 μm, greater than 10 μm, greater than 20 μm, greater than 30 μm, or greater than 40 μm. The average diameter can be determined using laser diffraction.

A porous material can have any suitable shape such as, for example, a porous material can be in the form of particles having a substantially spherical shape such as, for example, having an aspect ratio less than 2:1.

Examples of porous materials include silica, alumina, zinc oxide, titanium dioxide, zirconia, hafnia, yttria, rare earth oxides, boehmite, alkaline earth fluorides, calcium phosphates, and hydroxyapatite, and combinations of any of the foregoing.

A porous material can comprise silica.

Silica can include fumed silica, hydrophobic silica, hydrophilic silica, precipitated silica, untreated silica, treated silica, or a combination of any of the foregoing.

Examples of suitable hydrophilic silica include Aerosil® 200 (Evonik Corporation) and Hi-sil™ T700 (PPG Industries, Inc.).

Examples of suitable hydrophobic silica include Lo-vel™ 2018 (PPG Industries, Inc.), Lo-vel™ 8100 (PPG Industries, Inc.), and Sipernat® D13 (Evonik Corporation).

Examples of suitable fumed silica include Aerosil® 200 available from Evonik Corporation.

Examples of precipitated silica include Hi-sil™ WB10 and Hi-sil™ T700 available from PPG Industries, Inc.

Examples of modified silica include Inhibisil™ 73 and Inhibisil™ 75 available from PPG Industries, Inc.

Suitable silica particles are commercially available, for example, from Evonik Corporation, Cabot Corporation, Wacker Chemie, Dow Corning, PPG Industries, Inc., and Heraeus.

A composition provided by the present disclosure can comprise, for example, from 0.1 wt % to 10 wt % of a porous material such as silica, from 0.1 wt % to 6 wt % of a porous material, from 0.1 wt % to 5 wt % of a porous material, from 0.5 wt % to 4 wt % of a porous material, from 0.5 wt % to 3 wt %, from 0.5 wt % to 2 wt %, from 1 wt % to 10 wt %, from 1 wt % to 6 wt %, or from 1 wt % to 4 wt % of a porous material, where wt % is based on the total weight of the composition.

A composition provided by the present disclosure can comprise, for example, less than 10 wt % of a porous material such as silica, less than 8 wt % less than 6 wt %, less than 5 wt %, less than 4 wt %, less than 3 wt %, less than 2 wt %, less than 1 wt %, or less than 0.5 wt % of a porous material, where wt % is based on the total weight of the composition.

Compositions provided by the present disclosure can comprise a non-porous material or combination of non-porous materials.

A porous material can comprise, for example, a porous inorganic filler, a porous organic filler, a porous low-density filler, a porous conductive filler, or a combination of any of the foregoing.

A non-porous material can comprise, for example, a non-porous inorganic filler, a non-porous organic filler, a non-porous low-density filler, a non-porous conductive filler, or a combination of any of the foregoing.

A non-porous material such as a non-porous filler can be characterized, for example, by a BET surface area less than 1 m²/g, a total pore volume less than 0.01 mL/g, an average pore diameter less than 1 nm, or a combination of any of the foregoing.

Compositions provided by the present disclosure can comprise an inorganic filler or combination of inorganic filler. An inorganic filler can be included to provide mechanical reinforcement and to control the rheological properties of the composition. Inorganic filler may be added to compositions to impart desirable physical properties such as, for example, to increase the impact strength, to control the viscosity, or to modify the electrical properties of a cured composition.

Inorganic filler useful in compositions provided by the present disclosure and useful for sealant applications such as aviation and aerospace sealant applications include carbon black, calcium carbonate, precipitated calcium carbonate, calcium hydroxide, hydrated alumina (aluminum hydroxide), talc, mica, titanium dioxide, alumina silicate, carbonates, chalk, silicates, glass, metal oxides, graphite, and combinations of any of the foregoing.

An inorganic filler can comprise, for example, calcium carbonate, talc, and titanium dioxide.

Examples of suitable calcium carbonate filler include products such as Socal® 31, Socal® 312, Socal® U1S1, Socal® UaS2, Socal® N2R, Winnofil® SPM, and Winnofil® SPT available from Solvay Special Chemicals. A calcium carbonate filler can include a combination of precipitated calcium carbonates.

Inorganic filler can be surface treated to provide hydrophobic or hydrophilic surfaces that can facilitate dispersion and compatibility of the inorganic filler with other components of a coreactive composition. An inorganic filler can include surface-modified particles such as, for example, surface modified silica. The surface of silica particles can be modified, for example, to tailor the hydrophobicity or hydrophilicity of the surface of the silica particle. The surface modification can affect the dispensability of the particles, the viscosity, the curing rate, and/or the adhesion.

A filler can comprise from 70 wt % to 99 wt % calcium carbonate, such as from 75 wt % to 95 wt %, or from 80 wt % to 90 wt % calcium carbonate, where wt % is based on the total weight of the filler.

A filler can comprise from 4 wt % to 14 wt % of titanium dioxide, such as from 6 wt % to 12 wt %, or from 8 wt % to 10 wt % of titanium dioxide, where wt % is based on the total weight of the filler.

Compositions provided by the present disclosure can comprise, for example, from 15 t % to 55 wt % of an inorganic filler, from 20 wt % to 50 wt % of an inorganic filler, from 25 wt % to 45 wt % of an inorganic filler, or from 30 wt % to 40 wt % of an inorganic filler, where wt % is based on the total weight of the composition.

Compositions and sealants provided by the present disclosure can comprise an organic filler or a combination of organic filler. Organic filler can be selected to have a low specific gravity and to be resistant to solvents such as JRF Type I. Suitable organic filler can also have acceptable adhesion to the sulfur-containing polymer matrix. An organic filler can include solid powders or particles, hollow powders or particles, or a combination thereof.

An organic filler can have a specific gravity, for example, less than 1.15, less than 1.1, less than 1.05, less than 1, less than 0.95, less than 0.9, less than 0.8, or less than 0.7. Organic filler can have a specific gravity, for example, within a range from 0.85 to 1.15, within a range from 0.9 to 1.1, within a range from 0.9 to 1.05, or from 0.85 to 1.05.

Organic filler can comprise thermoplastics, thermosets, or a combination thereof. Examples of suitable thermoplastics and thermosets include epoxies, epoxy-amides, ethylene tetrafluorethylene copolymers, nylons, polyethylenes, polypropylenes, polyethylene oxides, polypropylene oxides, polyvinylidene chlorides, polyvinylfluorides, tetrafluoroethylene, polyamides, polyimides, ethylene propylenes, perfluorohydrocarbons, fluoroethylenes, polycarbonates, polyetheretherketones, polyetherketones, polyphenylene oxides, polyphenylene sulfides, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing.

Examples of suitable organic filler include polyamides, polyimides, polyethylenes, polyphenylene sulfides, and combinations of any of the foregoing, which can be particles and/or powders.

Examples of suitable polyamide 6 and polyamide 12 particles are available from Toray Plastics as grades SP-500, SP-10, TR-1, and TR-2. Suitable polyamide powders are also available from the Arkema Group under the tradename Orgasol®, and from Evonik Industries under the tradename Vestosin®.

Examples of suitable polyimide powders are available from Evonik Industries under the tradename P84®.

An organic filler can include a polyethylene powder, such as an oxidized polyethylene powder. Suitable polyethylene powders are available from Honeywell International, Inc. under the tradename ACumist®, from INEOS under the tradename Eltrex®, and Mitsui Chemicals America, Inc. under the tradename Mipelon™.

The use of organic filler such as polyphenylene sulfide in aerospace sealants is disclosed in U.S. Pat. No. 9,422,451. Polyphenylene sulfide is a thermoplastic engineering resin that exhibits dimensional stability, chemical resistance, and resistance to corrosive and high temperature environments. Polyphenylene sulfide engineering resins are commercially available, for example, under the tradenames Ryton® (Chevron), Techtron® (Quadrant), Fortron® (Celanese), and Torelina® (Toray). Polyphenylene sulfide resins are generally characterized by a specific gravity from about 1.3 to about 1.4.

An organic filler can have any suitable shape. For example, an organic filler can comprise fractions of crushed polymer that has been filtered to select a desired size range. An organic filler can comprise substantially spherical particles. Particles can be solid or can be porous.

An organic filler can have an average particle size, for example, within a range from 1 µm to 100 µm, 2 µm to 40 µm, from 2 µm to 30 µm, from 4 µm to 25 µm, from 4 µm to 20 µm, from 2 µm to 12 µm, or from 5 µm to 15 µm. An organic filler can have an average particle size, for example, less than 100 µm, less than 75 µm, less than 50 µm, less than 40 µm, or less than 20 µm. Particle size distribution can be determined using a Fischer Sub-Sieve Sizer or by optical inspection.

An organic filler can include a low-density such as modified, expanded thermoplastic microcapsules. Suitable modified expanded thermoplastic microcapsules can include an exterior coating of a melamine resin, a melamine/formaldehyde resin, or urea/formaldehyde resin.

Compositions provided by the present disclosure can comprise low-density microcapsules. A low-density microcapsule can comprise a thermally expandable microcapsule.

A thermally expandable microcapsule refers to a hollow shell comprising a volatile material that expands at a predetermined temperature. Thermally expandable thermoplastic microcapsules can have an average initial particle size of 5 µm to 70 µm, in some cases 10 µm to 24 µm, or from 10 µm to 17 µm. The term "average initial particle size" refers to the average particle size (numerical weighted average of the particle size distribution) of the microcapsules prior to any expansion. The particle size distribution can be determined using a Fischer Sub-Sieve Sizer or by optical inspection.

A thermally expandable thermoplastic microcapsule can comprise a volatile hydrocarbon within a wall of a thermoplastic resin. Examples of hydrocarbons suitable for use in such microcapsules include methyl chloride, methyl bromide, trichloroethane, dichloroethane, n-butane, n-heptane, n-propane, n-hexane, n-pentane, isobutane, isopentane, isooctane, neopentane, petroleum ether, and aliphatic hydrocarbons containing fluorine, such as Freon™, and combinations of any of the foregoing.

Examples of materials suitable for forming the wall of a thermally expandable microcapsule include polymers of vinylidene chloride, acrylonitrile, styrene, polycarbonate, methyl methacrylate, ethyl acrylate, and vinyl acetate, copolymers of these monomers, and combinations of the polymers and copolymers. A crosslinking agent may be included with the materials forming the wall of a thermally expandable microcapsule.

Examples of suitable thermoplastic microcapsules include Expancel™ microcapsules such as Expancel™ DE microspheres available from AkzoNobel. Examples of suitable Expancel™ DE microspheres include Expancel™ 920 DE 40 and Expancel™ 920 DE 80. Suitable low-density microcapsules are also available from Kureha Corporation.

Suitable low-density filler such as low-density microcapsules can have a mean diameter (d0.5), for example, from 1 µm to 100 µm, from 10 µm to 80 µm, or from 10 µm to 50 µm, as determined according to ASTM D1475.

Low-density filler such as low-density microcapsules can be characterized by a specific gravity within a range from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ASTM D1475. Low-density filler such as low-density microcapsules can be characterized by a specific gravity less than 0.1, less than 0.09, less than 0.08, less than 0.07, less than 0.06, less than 0.05, less than 0.04, less than 0.03, or less than 0.02, wherein the specific gravity is determined according to ASTM D1475.

Low-density filler such as low microcapsules can be characterized by a mean particle diameter from 1 µm to 100 µm and can have a substantially spherical shape. Low-density filler such as low-density microcapsules can be characterized, for example, by a mean particle diameter from 10 µm to 100 µm, from 10 µm to 60 µm, from 10 µm to 40 µm, or from 10 µm to 30 µm, as determined according to ASTM D1475.

Low-density filler can comprise uncoated microcapsules, coated microcapsules, or combinations thereof.

Low-density filler such as low-density microcapsules can comprise expanded microcapsules or microballoons having a coating of an aminoplast resin such as a melamine resin. Aminoplast resin-coated particles are described, for example, in U.S. Pat. No. 8,993,691. Such microcapsules can be formed by heating a microcapsule comprising a blowing agent surrounded by a thermoplastic shell. Uncoated low-density microcapsules can be reacted with an aminoplast resin such as a urea/formaldehyde resin to provide a coating of a thermoset resin on the outer surface of the particle.

Low-density filler such as low-density microcapsules can comprise thermally expandable thermoplastic microcapsules having an exterior coating of an aminoplast resin, such as a melamine resin. The coated low-density microcapsules can have an exterior coating of a melamine resin, where the coating can have a thickness, for example, less than 2 µm, less than 1 µm, or less than 0.5 µm. The melamine coating on the low-density microcapsules is believed to render the microcapsules reactive with the thiol-terminated polythioether prepolymer and/or the polyepoxide curing agent, which enhances the fuel resistance, and renders the microcapsules resistant to pressure.

The thin coating of an aminoplast resin can have a film thickness of less than 25 µm, less than 20 µm, less than 15 µm, or less than 5 µm. The thin coating of an aminoplast resin can have a film thickness of at least 0.1 nanometers, such as at least 10 nanometers, or at least 100 nanometers, or, in some cases, at least 500 nanometers.

Aminoplast resins can be based on the condensation products of formaldehyde, with an amino- or amido-group carrying substance. Condensation products can be obtained from the reaction of alcohols and formaldehyde with melamine, urea or benzoguanamine Condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines Examples of such compounds include N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris(ethylamino)-1,3,5 triazine. Suitable aminoplast resins can also be based on the condensation products of other aldehydes such as acetaldehyde, crotonaldehyde, acrolein, benzaldehyde, furfural, and glyoxal.

An aminoplast resin can comprise a highly alkylated, low-imino aminoplast resin which has a degree of polymerization less than 3.75, such as less than 3.0, or less than 2.0. The number average degree of polymerization can be defined as the average number of structural units per polymer chain. For example, a degree of polymerization of 1.0 indicates a completely monomeric triazine structure, while a degree of polymerization of 2.0 indicates two triazine rings joined by a methylene or methylene-oxy bridge. Degree of polymerization represents an average degree of polymerization value as determined by gel permeation chromatography using polystyrene standards.

An aminoplast resin can contain methylol or other alkylol groups, and at least a portion of the alkylol groups can be etherified by reaction with an alcohol. Examples of suitable monohydric alcohols include alcohols such as methanol, ethanol, propanol, butanol, pentanol, hexanol, heptanol, benzyl alcohol, other aromatic alcohols, cyclic alcohols such as cyclohexanol, monoethers of glycols, and halogen-substituted or other substituted alcohols, such as 3-chloropropanol and butoxyethanol. Aminoplast resins can be substantially alkylated with methanol or butanol.

An aminoplast resin can comprise a melamine resin. Examples of suitable melamine resins include methylated melamine resins (hexamethoxymethylmelamine), mixed ether melamine resins, butylated melamine resins, urea resins, butylated urea resins, benzoguanamine and glycoluril resins, and formaldehyde free resins. Such resins are available, for example, from Allnex Group and Hexion. Examples of suitable melamine resins include methylated melamine resins such as Cymel™ 300, Cymel™ 301, Cymel™ 303LF, Cymel™ 303ULF, Cymel™ 304, Cymel™ 350, Cymel 3745, Cymel™ XW-3106, Cymel™ MM-100, Cymel™ 370, Cymel™ 373, Cymel™ 380, ASTRO MEL™ 601, ASTRO MEL™ 601ULF, ASTRO MEL™ 400, ASTRO MEL™ NVV-3A, Aricel PC-6A, ASTRO MEL™ CR-1, and ASTRO SET™ 90.

A suitable aminoplast resin can comprise a urea-formaldehyde resin. A suitable aminoplast resin can comprise a melamine-formaldehyde resin.

Aminoplast resin-coated particles are distinct from uncoated particles that are merely incorporated into a polymer network, such as is the case when uncoated low-density particles are dispersed in a film-forming binder. For aminoplast resin-coated particles, a thin film is deposited on the exterior surface of individual discrete particles such as thermally expanded microcapsules. These aminoplast resin-coated particles may then be dispersed in a film-forming binder, thereby resulting in dispersion of the coated particles throughout a polymer network. The thin coating of an aminoplast resin can cover, for example from 70% to 100%, from 80% to 100%, or from 90% to 100% of the exterior surface of a low-density particle such as a thermally expanded microcapsule. The coating of an aminoplast resin can form a substantially continuous covering on the exterior surface of a low-density particle.

Low-density microcapsules can be prepared by any suitable technique, including, for example, as described U.S. Pat. Nos. 8,816,023 and 8,993,691. Coated low-density microcapsules can be obtained, for example, by preparing an aqueous dispersion of microcapsules in water with a melamine resin, under stirring. A catalyst can then be added, and the dispersion heated to, for example, a temperature from 50° C. to 80° C. Low-density microcapsules such as thermally expanded microcapsules having a polyacrylonitrile shell, de-ionized water and an aminoplast resin such as a melamine resin can be combined and mixed. A 10% w/w solution of para-toluene sulfuric acid in distilled water can then be added and the mixture reacted at 60° C. for about 2 hours. Saturated sodium bicarbonate can then be added, and the mixture stirred for 10 minutes. The solids can be filtered, rinsed with distilled water, and dried overnight at room temperature. The resulting powder of aminoplast resin-coated microcapsules can then be sifted through a 250 µm sieve to remove and separate agglomerates.

Prior to application of an aminoplast resin coating, a thermally-expanded thermoplastic microcapsule can be characterized by a specific gravity, for example, within a range from 0.01 to 0.05, within a range from 0.015 to 0.045, within a range from 0.02 to 0.04, or within a range from 0.025 to 0.035, wherein the specific gravity is determined according to ASTM D1475. For example, Expancel™ 920 DE 40 and Expancel™ 920 DE 80 can be characterized by a specific gravity of about 0.03, wherein the specific gravity is determined according to ASTM D1475.

Following coating with an aminoplast resin, an aminoplast-coated microcapsule can be characterized by a specific gravity, for example, within a range from 0.02 to 0.08, within a range from 0.02 to 0.07, within a range from 0.02 to 0.06, within a range from 0.03 to 0.07, within a range from 0.03 to 0.065, within a range from 0.04 to 0.065, within a range from 0.045 to 0.06, or within a range from 0.05 to 0.06, wherein the specific gravity is determined according to ASTM D1475.

Compositions provided by the present disclose can comprise micronized oxidized polyethylene homopolymer. An organic filler can include a polyethylenes, such as an oxidized polyethylene powder. Suitable polyethylenes are available, for example, from Honeywell International, Inc.

under the tradename ACumist®, from INEOS under the tradename Eltrex®, and Mitsui Chemicals America, Inc. under the tradename Mipelon™.

Compositions provided by the present disclosure can comprise, for example, from 5 wt % to 65 wt % filler, from 10 wt % to 60 wt %, from 15 wt % to 55 wt %, from 20 wt % to 50 wt %, from 25 wt % to 45 wt %, or from 30 wt % to 40 wt % filler, where wt % is based on the total weight of the composition.

A composition can comprise greater than 5 wt % filler, greater than 15 wt %, greater than 25 wt %, greater than 35 wt %, greater than 45 wt %, greater than 55 wt %, or greater than 65 wt % filler, where wt % is based on the total weight of the composition.

Coreactive conductive compositions provided by the present disclosure can include a conductive filler or a combination of conductive filler. A conductive filler can include electrically conductive filler, semiconductive filler, thermally conductive filler, magnetic filler, EMI/RFI shielding filler, static dissipative filler, electroactive filler, or a combination of any of the foregoing.

To render a part electrically conductive, the concentration of an electrically conductive filler can be above the electrical percolation threshold, where a conductive network of electrically conductive particles is formed. Once the electrical percolation threshold is achieved, the increase in conductivity as function of filler loading can be modeled by a simple power-law expression:

$$\sigma_c = \sigma_f(\varphi - \varphi_c)_t \qquad \text{Eqn. 1}$$

where $\varphi$ is the filler volume fraction, $\varphi_c$ is the percolation threshold, $\sigma_f$ is the filler conductivity, $\varphi$ is the composite conductivity, and t is a scaling component. The filler need not be in direct contact for current flow and conduction can take place via tunneling between thin layers of binder surrounding the electrically conductive filler particles, and this tunneling resistance can be the limiting factor in the conductivity of an electrically conductive composite.

Compositions provided by the present disclosure can comprise an electrically conductive filler or combination of electrically conductive filler.

A conductive filler can have any suitable shape and/or dimensions. For example, an electrically conductive filler can be in form of particles, powders, flakes, platelets, filaments, fiber, crystals, or a combination of any of the foregoing.

A conductive filler can comprise a combination of conductive filler having different shapes, different dimensions, different properties such as, for example, different thermal conduction, electrical conduction, magnetic permittivity, electromagnetic properties, or a combination of any of the foregoing.

A conductive filler can be a solid or can be in the form of a substrate such as a particle having a coating of a conductive material. For example, a conductive filler can be a low-density microcapsule having an exterior conductive coating.

Examples of suitable conductive filler such as electrically conductive filler include metals, metal alloys, conductive oxides, semiconductors, carbon, and combinations of any of the foregoing.

Other examples of electrically conductive filler include electrically conductive noble metal-based filler such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive filler. Non-noble metal-based materials can also be used and include, for example, non-noble metal-plated non-noble metals such as copper-coated iron particles or nickel-plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive filler and shapes of electrically conductive filler can be used to achieve a desired conductivity, EMI/RFI shielding effectiveness, hardness, and other properties suitable for a particular application.

Carbon fibers such as graphitized carbon fibers can also be used to impart electrical conductivity to compositions of the present disclosure. Carbon fibers formed by vapor phase pyrolysis methods and graphitized by heat treatment and which are hollow or solid with a fiber diameter ranging from 0.1 micron to several microns, have high electrical conductivity. Carbon microfibers such as nanotubes or carbon fibrils having an outer diameter of less than 0.1 μm to tens of nanometers can be used as electrically conductive filler. An example of graphitized carbon fiber suitable for conductive compositions of the present disclosure include Panex® 3OMF (Zoltek Companies, Inc., St. Louis, Mo.), a 0.921 μm diameter round fiber having an electrical resistivity of 0.00055 Ω-cm.

The average particle size of an electrically conductive filler can be within a range useful for imparting electrical conductivity to a polymer-based composition. For example, the particle size of the one or more filler can range from 0.25 μm to 250 μm, can range from 0.25 μm to 75 μm, or can range from 0.25 μm to 60 μm. Composition provided by the present disclosure can comprise an electrically conductive carbon black characterized by an iodine absorption of 1,000 mg/g to 11,500 mg/g (J0/84-5 test method), and a pore volume of 480 cm$^3$/100 g to 510 cm$^3$/100 g (DBP absorption, KTM 81-3504). An example is Ketjenblack® EC-600 JD, which is commercially available from AkzoNobel, Inc. An electrically conductive carbon black filler is Black Pearls® 2000, which is commercially available from Cabot Corporation.

Electrically conductive compositions provided by the present disclosure can comprise more than one electrically conductive filler and the more than one electrically conductive filler can be of the same or different materials and/or shapes. For example, a composition can comprise electrically conductive Ni fibers, and electrically conductive Ni-coated graphite in the form of powder, particles or flakes. The amount and type of electrically conductive filler can be selected to produce a coreactive composition which, when cured, exhibits a sheet resistance (four-point resistance) of less than 0.50 Ω/cm$^2$, or a sheet resistance less than 0.15 Ω/cm$^2$. The amount and type of filler can also be selected to provide effective EMI/RFI shielding over a frequency range of from 1 MHz to 18 GHz for an aperture sealed using a sealant composition of the present disclosure.

Organic filler, inorganic filler, and low-density filler can be coated with a metal to provide conductive filler.

An electrically conductive filler can include graphene.

Graphene comprises a densely packed honeycomb crystal lattice made of carbon atoms having a thickness equal to the atomic size of one carbon atom, i.e., a monolayer of sp$^2$ hybridized carbon atoms arranged in a two-dimensional lattice.

Graphene can comprise graphenic carbon particles. Graphenic carbon particles refer to carbon particles having structures comprising one or more layers of one-atom-thick planar sheets of sp²-bonded carbon atoms that are densely packed in a honeycomb crystal lattice. An average number of stacked layers can be less than 100, for example, less than 50. An average number of stacked layers can be 30 or less, such as 20 or less, 10 or less, or 5 or less. Graphenic carbon particles can be substantially flat, however, at least a portion of the planar sheets may be substantially curved, curled, creased or buckled. Graphenic carbon particles typically do not have a spheroidal or equiaxed morphology.

Graphenic carbon particles can have a thickness, measured in a direction perpendicular to the carbon atom layers, for example, of no more than 10 nm, no more than 5 nm, or no more than 4 or 3 or 2 or 1 nm, such as no more than 3.6 nm. Graphenic carbon particles can be from 1 atom layer up to 3, 6, 9, 12, 20 or 30 atom layers thick, or more. Graphenic carbon particles can have a width and length, measured in a direction parallel to the carbon atoms layers, of at least 50 nm, such as more than 100 nm, more than 100 nm up to 500 nm, or more than 100 nm up to 200 nm. Graphenic carbon particles can be provided in the form of ultrathin flakes, platelets or sheets having relatively high aspect ratios, where the aspect ratio is the ratio of the longest dimension of a particle to the shortest dimension of the particle, of greater than 3:1, such as greater than 10:1.

Graphenic carbon particles can have a relatively low oxygen content. For example, graphenic carbon particles can, even when having a thickness of no more than 5 nm or no more than 2 nm, have an oxygen content of no more than 2 atomic wt %, such as no more than 1.5 or 1 atomic wt %, or no more than 0.6 atomic wt %, such as about 0.5 atomic wt %. The oxygen content of the graphenic carbon particles can be determined using X-ray Photoelectron Spectroscopy.

Graphenic carbon particles have a BET specific surface area of at least 50 m²/g, such as from 70 m²/g to 1000 m²/g, or, in some cases, 200 m²/g to 1000 m²/g, or from 200 m²/g to 400 m²/g.

Graphenic carbon particles can have a Raman spectroscopy 2D/G peak ratio of at least 1:1, for example, at least 1.2:1 or 1.3:1. The 2D/G peak ratio refers to the ratio of the intensity of the 2D peak at 2692 cm to the intensity of the G peak at 1,580 cm$^{-1}$.

Graphenic carbon particles can have a relatively low bulk density. For example, graphenic carbon particles are characterized by having a bulk density (tap density) of less than 0.2 g/cm³, such as no more than 0.1 g/cm³. The bulk density of the graphenic carbon particles is determined by placing 0.4 grams of the graphenic carbon particles in a glass measuring cylinder having a readable scale. The cylinder is raised approximately one-inch and tapped 100 times, by striking the base of the cylinder onto a hard surface, to allow the graphenic carbon particles to settle within the cylinder. The volume of the particles is then measured, and the bulk density is calculated by dividing 0.4 g by the measured volume, wherein the bulk density is expressed in terms of g/cm³.

Graphenic carbon particles can have a compressed density and a percent densification that is less than the compressed density and percent densification of graphite powder and certain types of substantially flat graphenic carbon particles such as those formed from exfoliated graphite. Lower compressed density and lower percent densification are each currently believed to contribute to better dispersion and/or rheological properties than graphenic carbon particles exhibiting higher compressed density and higher percent densification. The compressed density of the graphenic carbon particles is 0.9 or less, such as less than 0.8, less than 0.7, such as from 0.6 to 0.7. The percent densification of the graphenic carbon particles is less than 40%, such as less than 30%, such as from 25 to 30%.

The compressed density of graphenic carbon particles can be calculated from a measured thickness of a given mass of the particles after compression. For example, the measured thickness can be determined by subjecting 0.1 g of the graphenic carbon particles to cold press under 15,000 pound of force in a 1.3 cm die for 45 min, wherein the contact pressure is 500 MPa. The compressed density of the graphenic carbon particles can then be calculated from this measured thickness according to the following equation: Compressed Density (gm/cm³)=0.1 gm×3.14×(1.3 cm$^{-2}$)²× (measured thickness in cm). The percent densification of the graphenic carbon particles can then be determined as the ratio of the calculated compressed density of the graphenic carbon particles to 2.2 g/cm³, which is the density of graphite.

Graphene can have a measured bulk liquid conductivity of at least 100 μS (microsiemens), such as at least 120 μS, such as at least 140 μS immediately after mixing and at later points in time, such as at 10 min, or 20 min, or 30 min, or 40 min. The bulk liquid conductivity of graphene can be determined using the following procedure. A sample comprising 0.5% solution of graphene in butyl Cellosolve® can be sonicated for 30 min with a bath sonicator Immediately following sonication, the sample can be placed in a standard calibrated electrolytic conductivity cell (K=1). A Fisher Scientific AB 30 conductivity meter can be introduced to the sample to measure the conductivity of the sample. The conductivity can be plotted over the course of about 40 min.

Suitable graphene can be made, for example, by thermal processes. For example, graphene can be produced from carbon-containing precursor materials that are heated to high temperatures in a thermal zone. For example, the graphene can be produced by the systems and methods disclosed in U.S. Pat. No. 8,486,363 and its counterparts.

Graphenic carbon particles can comprise exfoliated graphite and have different characteristics in comparison with the thermally produced graphenic carbon particles, such as different size distributions, thicknesses, aspect ratios, structural morphologies, oxygen contents, and chemical functionalities at the basal planes/edges.

Graphenic carbon particles can be functionalized. Functionalized graphenic carbon particles refer to graphenic carbon particles that are covalently bonded to organic groups. The graphenic carbon particles can be functionalized through the formation of covalent bonds between the carbon atoms of a particle and other chemical moieties such as carboxylic acid groups, sulfonic acid groups, hydroxyl groups, halogen atoms, nitro groups, amine groups, aliphatic hydrocarbon groups, phenyl groups and the like. For example, functionalization with carbonaceous materials may result in the formation of carboxylic acid groups on the graphenic carbon particles. Graphenic carbon particles may also be functionalized by other reactions such as Diels-Alder addition reactions, 1,3-dipolar cycloaddition reactions, free radical addition reactions and diazonium addition reactions. Hydrocarbon and phenyl groups may be further functionalized. For graphenic carbon particles having a hydroxyl functionality, the hydroxyl functionality can be modified and extended by reacting these groups with, for example, an organic isocyanate.

Different types of graphenic carbon particles may be used in a composition. For example, when thermally produced graphenic carbon particles are combined with commercially available graphenic carbon particles a bi-modal distribution, tri-modal distribution, or other distribution of graphenic carbon particle characteristics and/or properties may be achieved. The graphenic carbon particles contained in the compositions may have multi-modal particle size distributions, aspect ratio distributions, structural morphologies, edge functionality differences, oxygen content, and combinations of any of the foregoing. When both thermally produced graphenic carbon particles and commercially available graphenic carbon particles, e.g., from exfoliated graphite, are used to produce a bi-modal graphenic particle size distribution, the relative amounts of the different types of graphenic carbon particles are controlled to produce desired conductivity properties of the coatings. For example, thermally produced graphenic particles may comprise from 1 wt % to 50 wt %, and the commercially available graphenic carbon particles may comprise from 50 wt % to 99 wt %, based on the total weight of the graphenic carbon particles.

A composition can comprise, for example, from 2 wt % to 50 wt %, from 4 wt % to 40 wt %, from 6 wt % to 35 wt %, or from 10 wt % to 30 wt % thermally produced graphenic carbon particles, based on the total wt % of the composition. Compositions can comprise thermally produced graphenic carbon nanoparticles as well as graphenic carbon particles produced by other methods, and also other forms of carbon or graphite.

Filler used to impart electrical conductivity and EMI/RFI shielding effectiveness can be used in combination with graphene. Examples of electrically conductive filler for use in combination with graphene include electrically conductive noble metal-based filler; noble metal-plated noble metals; noble metal-plated non-noble metals; noble-metal plated glass, plastic or ceramics; noble-metal plated mica; and other noble-metal conductive filler. Non-noble metal-based materials can also be used and include, for example, non-noble metal-plated non-noble metals; non-noble metals; non-noble-metal-plated-nonmetals. Examples of suitable materials and combinations are disclosed, for example, in U.S. Application Publication No. 2004/0220327 A1.

Electrically conductive non-metal filler, such as carbon nanotubes, carbon fibers such as graphitized carbon fibers, and electrically conductive carbon black, can also be used in coreactive compositions in combination with graphene. An example of suitable graphitized carbon fiber is PANEX 3OMF (Zoltek Companies, Inc.), a 0.921-µm diameter round fiber having an electrical resistivity of 0.00055 Ω-cm. Examples of suitable electrically conductive carbon black include Ketjenblack® EC-600 JD (AkzoNobel, Inc.), an electrically conductive carbon black characterized by an iodine absorption within a range from 1,000 mg/g to 11,500 mg/g (J0/84-5 test method), and a pore volume of 480-510 cm$^3$/100 gm (DBP absorption, KTM 81-3504) and Blackpearls® 2000 and REGAL® 660R (Cabot Corporation, Boston, Mass.). Compositions can comprise carbon nanotubes having a length dimension, for example, from 5 µm to 30 µm, and a diameter from 10 nm to 30 nm. Carbon nanotubes can have dimensions, for example, from 11 nm by 10 µm.

Conductive filler can comprise magnetic filler or combination of magnetic filler.

The magnetic filler can include a soft magnetic metal. This can enhance permeability of the magnetic mold resin. As a main component of the soft magnetic metal, at least one magnetic material selected from Fe, Fe—Co, Fe—Ni, Fe—Al, and Fe—Si may be used. A magnetic filler can be a soft magnetic metal having a high bulk permeability. As the soft magnetic metal, at least one magnetic material selected can be Fe, FeCo, FeNi, FeAl, and FeSi may be used. Specific examples include a permalloy (FeNi alloy), a super permalloy (FeNiMo alloy), a sendust (FeSiAl alloy), an FeSi alloy, an FeCo alloy, an FeCr alloy, an FeCrSi alloy, FeNiCo alloy, and Fe. Other examples of magnetic filler include iron-based powder, iron-nickel based powder, iron powder, ferrite powder, Alnico powder, $Sm_2Co_{17}$ powder, Nd—B—Fe powder, barium ferrite $BaFe_2O_4$, bismuth ferrite $BiFeO_3$, chromium dioxide $CrO_2$, SmFeN, NdFeB, and SmCo.

A surface of the magnetic filler can be insulation-coated or can have a film thickness of the insulation coating equal to or larger than 10 nm.

A surface of the magnetic filler can be insulation-coated with a metal oxide such as Si, Al, Ti, Mg or an organic material for enhancing fluidity, adhesion, and insulation performance.

Examples of suitable metal filler include, for example, silver, copper, aluminum, platinum, palladium, nickel, chromium, gold, bronze, and colloidal metals. Examples of suitable metal oxides include antimony tin oxide and indium tin oxide and materials such as filler coated with metal oxides. Suitable, metal and metal-oxide coated materials include metal coated carbon and graphite fibers, metal coated glass fibers, metal coated glass beads, metal coated ceramic materials such as ceramic beads. These materials can be coated with a variety of metals, including nickel.

Examples of conductive materials include metallic such as silver, copper, gold, platinum, palladium, tungsten, and iron; nanomaterials such as nanoparticles, nanorods, nanowires, nanotubes, and nanosheets; conductive oxides such as indium tin oxide, antimony oxide, and zinc oxide; conducting polymers such as poly(3,4-ethylenedioxythiophene) polystyrene sulfonate (PEDOT:PSS), polyacetylene, polythiophenes, and other conjugated polymers; carbonaceous nanomaterials such as graphene (single or multi-layer), carbon-nanotubes (CNTs, single or multi-walled), graphene nanoribbons, and fullerenes; and reactive metal systems such as metal oxide nanoparticles. Carbonaceous nanomaterials and metallic materials are stable at very high temperatures and therefore can be useful in high-temperature parts.

Examples of carbonaceous materials for use as conductive filler other than graphene and graphite include, for example, graphitized carbon black, carbon fibers and fibrils, vapor-grown carbon nanofibers, metal coated carbon fibers, carbon nanotubes including single- and multi-walled nanotubes, fullerenes, activated carbon, carbon fibers, expanded graphite, expandable graphite, graphite oxide, hollow carbon spheres, and carbon foams.

Conductive filler can include semiconductors or combinations of semiconductors.

Examples of suitable semiconductive materials include semiconducting nanomaterials such as nanoparticles, nanorods, nanowires, nanotubes, and nanosheets, semiconducting metal oxides such as tin oxide, antimony oxide, and indium oxide, semiconducting polymers such as PEDOT: PSS, polythiophenes, poly(p-phenylene sulfide), polyanilines, poly(pyrrole)s, poly(acetylene)s, poly(p-phenylene vinylene), polyparaphenylene, any other conjugated polymer, and semiconducting small molecules, for example, having a number average molecular weight less than 5,000 Da, such as rubrene, pentacene, anthracene, and aromatic hydrocarbons. Examples of semiconducting nanomaterials include quantum dots, III-V or II-VI semiconductors, Si, Ge, transition metal dichalcogenides such as $WS_2$, $WSe_2$, and MoSe$_x$, graphene nanoribbons, semiconducting carbon nanotubes, and fullerenes and fullerene derivatives.

Examples of suitable metal fiber include steel, titanium, aluminum, gold, silver, and alloys of any of the foregoing.

Examples of suitable ceramic fiber include metal oxide such as alumina fibers, aluminasilicate fibers, boron nitride fibers, silicon carbide fibers, and combinations of any of the foregoing.

Examples of suitable inorganic fiber include carbon, alumina, basalt, calcium silicate, and rock wool.

A fiber can be a glass fiber such as S-glass fibers, E-glass fibers, soda-lime-silica fibers, basalt fibers, or quartz fibers. Glass fibers may be in the form of woven and/or braided glass fibers, or non-woven glass fibers.

A fiber can include carbon such as graphite fibers, glass fibers, ceramic fibers, silicon carbide fibers, polyimide fibers, polyamide fibers, or polyethylene fibers. Continuous fibers can comprise titanium, tungsten, boron, shape memory alloy, graphite, silicon carbide, boron, aramid, poly(p-phenylene-2,6-benzobisoxazole), and combinations of any of the foregoing.

Fiber capable of withstanding high temperature include, for example, carbon fiber, high-strength glass (SiO$_2$) fiber, oxide fiber, alumina fiber, ceramic fiber, metal fiber, and fibers of high temperature thermoplastics or thermosets.

A filler can include carbon nanotubes, fullerenes, or a combination thereof.

A filler can include graphene or other, flat polycyclic aromatic hydrocarbon. Graphene can be used to impart thermal conductivity, electrical conductivity EMI/RFI shielding capability, and/or anti-static properties to a cured composition.

Carbon particles can be graphene or carbon nanotubes.

Suitable carbon nanotubes can be characterized by a length, for example, from 1 nm to 5,000 nm.

Suitable carbon nanotubes can be cylindrical in shape and structurally related to fullerenes. Suitable carbon nanotubes can be open or capped at their ends. Suitable carbon nanotubes can comprise, for example, more than 90 wt %, more than 95 wt %, more than 99 wt %, or more than 99.9 wt % carbon, where wt % is based on the total weight of the carbon nanotube.

Suitable carbon nanotubes can be prepared by any suitable method known in the art. For example, carbon nanotubes can be prepared by the catalyst decomposition of hydrocarbons such as catalytic carbon vapor deposition (CCVD). Other methods for preparing carbon nanotubes include the arc-discharge method, the plasma decomposition of hydrocarbons, and the pyrolysis of selected polyolefin under selected oxidative conditions. The starting hydrocarbons can be acetylene, ethylene, butane, propane, ethane, methane or any other gaseous or volatile carbon-containing compound. The catalyst, if present, can be used in either pure or in a supported form. Purification can remove undesirable by-products and impurities.

Nanotubes can exist as single-walled nanotubes (SWNT) and multi-walled nanotubes (MWNT), for example, as nanotubes having one single wall and nanotubes having more than one wall, respectively. In single-walled nanotubes a one atom thick sheet of atoms, for example, a one atom thick sheet of graphite, i.e., graphene, is rolled seamlessly to form a cylinder. Multi-walled nanotubes consist of a number of such cylinders arranged concentrically.

A multi-walled carbon nanotube can have, for example, on average from 5 to 15 walls.

Nanotubes, irrespective of whether they are single-walled or multi-walled, may be characterized by their outer diameter or by their length or by both.

Single-walled nanotubes can be characterized by a diameter, for example, of at least 0.5 nm, such as at least 1 nm, or at least 2 nm. A single-walled nanotube can have a diameter, for example, less than 50 nm, such as less than 30 nm, or less than 10 nm. A single-walled nanotube can have a diameter, for example, from 0.2 nm to 50, such as from 1 nm to 30 nm. A length of single-walled nanotubes can be, for example, at least 0.05 µm, at least 0.1 µm, or at least 1 µm. A length of a single-walled nanotube can be, for example, less than 50 mm, such as less than 25 mm. A length of a single-walled nanotube can be, for example, from 0.05 µm to 50 mm, from 0.1 µm to 10 mm, or from 1 µm to 1 mm.

Multi-walled nanotubes can be characterized by an outer diameter of at least 1 nm, such as at least 2 nm, 4 nm, 6 nm, 8 nm, or at least 9 nm. An outer diameter can be less than 100 nm, less than 80 nm, 60 nm, 40 nm, or less than 20 nm. The outer diameter can be from 9 nm to 20 nm. A length of a multi-walled nanotube can be less than 50 nm, less than 75 nm, or less than 100 nm. A length can be less than 500 µm, or less than 100 µm. A length can be from 100 nm to 10 µm. A multi-walled carbon nanotube can have an average outer diameter from 9 nm to 20 nm and/or an average length from 100 nm to 10 µm.

Carbon nanotubes can have a BET surface area, for example, from 200 m$^2$/g to 400 m$^2$/g.

Carbon nanotubes can have a mean number of from 5 walls to 15 walls.

Compositions can comprise an antioxidant or a combination of antioxidants. Examples of suitable antioxidants include phenolic antioxidants such as pentaerythritol tetrakis [3-(3',5'-di-tert-butyl-4'-hydroxyphenyl)propionate] (herein referred to as Irganox® 1010), tris(2,4-di-tert-butylphenyl) phosphite (herein referred to as Irgafos® 168), 3DL-α-tocopherol, 2,6-di-tert-butyl-4-methylphenol, dibutylhydroxyphenylpropionic acid stearyl ester, 3,5-di-tert-butyl-4-hydroxyhydrocinnamic acid, 2,2'-methylenebis(6-tert-butyl-4-methyl-phenol), hexamethylene bis[3-(3,5-di-tert-butyl-4-hydroxyphenyl)propionate], benzenepropanamide, N,N'-1,6-hexanediyl bis[3,5-bis(1,1-dimethylethyl)-4-hydroxy], diethyl 3.5-di-tert-butyl-4-hydroxybenzyl phosphonate, calcium bis[monoethyl(3,5-di-tert-butyl-4-hydroxylbenzyl) phosphonate], triethylene glycol bis(3-tert-butyl-4-hydroxy-5-methylphenyl)propionate, 6,6'-di-tert-butyl-4,4'-butylidenedi-m-cresol, 3,9-bis(2-(3-(3-tert-butyl-4-hydroxy-5-methylphenyl)propionyloxy-1,1-dimethylethyl)-2,4,8,10-tetraoxaspiro[5.5]undecane, 1,3,5-trimethyl-2,4,6-tris(3,5-di-tert-butyl-4-hydroxybenzyl)benzene, 1,1,3-tris (2-methyl-4-hydroxy-5-tert-butylphenyl)butane, (2,4,6-trioxo-1,3,5-triazine-1,3,5(2H,4H,6H)-triyl)triethylene tris [3-(3,5-di-tert-butyl-4-hydroxyphenyl)propionate], tris(3,5-di-tert-butyl-4-hydroxybenzyl) isocyanurate, tris(4-tert-butyl-3-hydroxy-2,6-dimethylbenzyl) isocyanurate, ethylene bis[3,3-bis(3-tert-butyl-4-hydroxyphenyl)butyrate], and 2,6-bis[[3-(1,1-dimethylethyl)-2-hydroxy-5-methylphenyl] octahydro-4,7-methano-1H-indenyl]-4-methyl-phenol.

Suitable antioxidants also include, for example, phenolic antioxidants with dual functionality such 4,4'-thio-bis(6-tert-butyl-m-methyl phenol), 2,2'-sulfanediylbis(6-tert-butyl-4-methylphenol), 2-methyl-4,6-bis(octylsulfanylmethyl)phenol, thiodiethylene bis[3-(3,5-di-tert-butyl-4-hydroxyphenyl)propionate], 2,6-di-tert-butyl-4-(4,6-bis (octylthio)-1,3,5-triazin-2-ylamino)phenol, N-(4-hydroxyphenyl)stearamide, bis(1,2,2,6,6-pentamethyl-4- piperidyl) [[3,5-bis(1,1-dimethylethyl)-4-hydroxyphenyl]methyl]butylmalonate, 2,4-di-tert-butylphenyl 3,5-di-tert-butyl-4-hydroxybenzoate, hexadecyl 3,5-di-tert-butyl-4-hydroxybenzoate, and 2-(1,1-dimethylethyl)-6-[[3-(1,1-dimethylethyl)-2-hydroxy-5-methylphenyl]-methyl]-4-methylphenyl acrylate. Suitable antioxidants also include, for example, aminic antioxidants such as N-phenyl-2-naphthylamine, poly(1,2-dihydro-2,2,4-trimethyl-quinoline), N-isopropyl-N'-phenyl-p-phenylenediamine, N-phenyl-1-naphthylamine, and 4,4-bis($\alpha,\alpha$-dimethylbenzyl)diphenylamine.

Compositions provided by the present disclosure can comprise a thermally-conductive filler or combination of thermally-conductive filler.

A conductive filler can also be thermally conductive.

A thermally conductive filler can include, for example, metal nitrides such as boron nitride, silicon nitride, aluminum nitride, boron arsenide, carbon compounds such as diamond, graphite, carbon black, carbon fibers, graphene, and graphenic carbon particles, metal oxides such as aluminum oxide, magnesium oxide, beryllium oxide, silicon dioxide, titanium oxide, nickel oxide, zinc oxide, copper oxide, tin oxide, metal hydroxides such as aluminum hydroxide or magnesium hydroxide, carbides such as silicon carbide, minerals such as agate and emery, ceramics such as ceramic microspheres, mullite, silica, silicon carbide, carbonyl iron, cerium (III) molybdate, copper, zinc, or combinations of any of the foregoing.

Compositions provided by the present disclosure can have greater than 50 wt % of a conductive filler, greater than 60 wt %, greater than 70 wt %, greater than 80 wt %, greater than 90 wt %, or greater than 95 wt % of a conductive filler, where wt % is based on the total weight of the composition.

Compositions provided by the present disclosure can comprise less than 50 wt % of a conductive filler, less than 60 wt %, less than 70 wt %, less than 80 wt %, less than 90 wt %, or less than 95 wt % of a conductive filler, where wt % is based on the total weight of the composition.

Compositions provided by the present disclosure can have from 50 wt % to 95 wt % of a conductive filler, from 60 wt % to 95 wt %, from 70 wt % to 95 wt %, or from 80 wt % to 95 wt % of a conductive filler, where wt % is based on the total weight of the composition.

Compositions provided by the present disclosure can have greater than 50 vol % of a conductive filler, greater than 60 vol %, greater than 70 vol %, greater than 80 vol %, greater than 90 vol %, or greater than 95 vol % of a conductive filler, where vol % is based on the total volume of the composition.

Compositions provided by the present disclosure can comprise less than 50 vol % of a conductive filler, less than 60 vol %, less than 70 vol %, less than 80 vol %, less than 90 vol %, or less than 95 vol % of a conductive filler, where vol % is based on the total volume of the composition.

Compositions provided by the present disclosure can have from 50 vol % to 95 vol % of a conductive filler, from 60 vol % to 95 vol %, from 70 vol % to 95 vol %, or from 80 vol % to 95 vol % of a conductive filler, where vol % is based on the total volume of the composition.

Compositions provided by the present disclosure can include one or more additional constituents such as, for example, adhesion promoters, solvents, plasticizers, reactive diluents, rheological modifiers, polysulfide cure retarders, colorants, corrosion inhibitors, fire retardants, or combinations of any of the foregoing.

Compositions provided by the present disclosure can comprise an adhesion promoter or combination of adhesion promoters. An adhesion promoter can include a phenolic adhesion promoter, a combination of phenolic adhesion promoters, an organo-functional silane, a combination of organo-functional silanes, or a combination of any of the foregoing. An organosilane can be an amine-functional silane.

The use of aminosilane adhesion promoters can be used to control the acidity of a sealant composition.

Compositions and sealants provided by the present disclosure can comprise a phenolic adhesion promoter, an organosilane, or a combination thereof. A phenolic adhesion promoter can comprise a cooked phenolic resin, an uncooked phenolic resin, or a combination thereof. Examples of suitable adhesion promoters include phenolic resins such as Methylon® phenolic resin, and organosilanes, such as epoxy-, mercapto- or amine-functional silanes, such as Silquest® organosilanes.

Phenolic adhesion promoters can comprise the reaction product of a condensation reaction of a phenolic resin with one or more thiol-terminated polysulfides and are referred to as cooked phenolics. Phenolic adhesion promoters can be thiol-terminated.

Examples of phenolic resins include 2-(hydroxymethyl)phenol, (4-hydroxy-1,3-phenylene)dimethanol, (2-hydroxybenzene-1,3,4-triyl) trimethanol, 2-benzyl-6-(hydroxymethyl)phenol, (4-hydroxy-5-((2-hydroxy-5-(hydroxymethyl)cyclohexa-2,4-dien-1-yl)methyl)-1,3-phenylene) dimethanol, (4-hydroxy-5-((2-hydroxy-3,5-bis(hydroxymethyl)cyclohexa-2,4-dien-1-yl)methyl)-1,3-phenylene)dimethanol, and a combination of any of the foregoing.

Suitable phenolic resins can be synthesized by the base-catalyzed reaction of phenol with formaldehyde.

Phenolic adhesion promoters can comprise the reaction product of a condensation reaction of a Methylon® resin, a Varcum® resin, or a Durez® resin available from Durez Corporation with a thiol-terminated polysulfide such as a Thioplast® resin.

Examples of Methylon® resins include Methylon® 75108 (allyl ether of methylol phenol, see U.S. Pat. No. 3,517,082) and Methylon® 75202.

Examples of Varcum® resins include Varcum® 29101, Varcum® 29108, Varcum® 29112, Varcum® 29116, Varcum® 29008, Varcum® 29202, Varcum® 29401, Varcum® 29159, Varcum® 29181, Varcum® 92600, Varcum® 94635, Varcum® 94879, and Varcum® 94917.

An example of a Durez® resin is Durez® 34071.

Compositions provided by the present disclosure can comprise an organo-functional adhesion promoter such as an organo-functional alkoxysilane. An organo-functional alkoxysilane can comprise hydrolysable groups bonded to a silicon atom and at least one organofunctional group. An organo-functional alkoxysilane can have the structure $R^{13}$—$(CH_2)_n$—$Si(-OR)_{3-n}R_n$, where $R^{13}$ is an organofunctional group, n is 0, 1, or 2, and R is alkyl such as methyl or ethyl. Examples of organofunctional groups include epoxy, amino, methacryloxy, or sulfide groups. An organofunctional alkoxysilane can be a dipodal alkoxysilane having two or more alkoxysilane groups, a functional dipodal alkoxysilane, a non-functional dipodal alkoxysilane or a combination of any of the foregoing. An organofunctional alkoxysilane can be a combination of a monoalkoxysilane and a dipodal alkoxysilane. For amino functional alkoxysilanes, $R^{13}$ can be —$NH_2$, An amine-functional alkoxysilane can comprise a primary amine-functional alkoxysilane, a secondary amine-functional alkoxysilane, or a combination thereof. A primary amine-functional alkoxysilane refers to a alkoxysilane having primary amino group. A secondary amine-functional alkoxysilane refers to a alkoxysilane having a secondary amine group. An amine-functional alkoxysilane can comprise, for example, from 40 wt % to 60 wt % of a primary amine-functional alkoxysilane; and from 40 wt % to 60 wt % of a secondary amine-functional alkoxysilane; from 45 wt % to 55 wt % of a primary amine-functional alkoxysilane and from 45 wt % to 55 wt % of a secondary amine-functional alkoxysilane; or from 47 wt % to 53 wt % of a primary amine-functional alkoxysilane and from 47 wt % to 53 wt % of a secondary amine-functional alkoxysilane; where wt % is based on the total weight of the amine-functional alkoxysilane in a composition.

A secondary amine-functional alkoxysilane can be a sterically hindered amine-functional alkoxysilane. In a sterically hindered amine-functional alkoxysilane the secondary amine can be adjacent to a large group or moiety that limits or restricts the degrees of freedom of the secondary amine compared to the degrees of freedom for a non-sterically hindered secondary amine. For example, in a sterically hindered secondary amine, the secondary amine can be adjacent to a phenyl group, a cyclohexyl group, or a branched alkyl group.

Amine-functional alkoxysilanes can be monomeric amine-functional alkoxysilanes having a molecular weight, for example, from 100 Da to 1000 Da, from 100 Da to 800 Da, from 100 Da to 600 Da, or from 200 Da to 500 Da.

Examples of suitable primary amine-functional alkoxysilanes include 4-aminobutyltriethoxysilane, 4-amino-3,3-dimethylbutyltrimethoxysilane, N-(2-aminoethyl)-3-aminopropyltriethoxysilane, 3-(m-aminophenoxy)propyltrimethoxysilane, m-aminophenyltrimethoxysilane, p-aminophenyltrimethoxysilane, 3-aminopropyltriethoxysilane, 3-aminopropyltrimethoxysilane, 3-aminopropyltris(methoxyethoxyethoxy)silane, 11-aminoundecyltriethoxysilane, 2-(4-pyridylethyl)triethoxysilane, 2-(2-pyridylethyltrimethoxysilane, N-(3-trimethoxysilylpropyl) pyrrole, 3-aminopropylsilanetriol, 4-amino-3,3-dimethylbutylmethyldimethoxysilane, 3-aminopropylmethyldiethoxysilane, 1-amino-2-(dimethylethoxysilyl)propane, 3-aminopropyldiisopropylene ethoxysilane, and 3-aminopropyldimethylethoxysilane.

Examples of suitable diamine-functional alkoxysilanes include aminoethylaminomethyl)phenethyltrimethoxysilane N-(2-aminoethyl)-3-aminopropyltrimethoxysilane, and n-(β-aminoethyl) γ-aminopropyltrimethoxy silane.

Examples of suitable secondary amine-functional silanes include 3-(N-allylamino)propyltrimethoxysilane, n-butylaminopropyltrimethoxysilane, tert-butylaminopropyltrimethoxysilane, (N,N-cylohexylaminomethyl)methyldiethoxysilane, (N-cyclohexylaminomethyl)triethoxysilane, (N-cyclohexylaminopropyl)trimethoxysilane, (3-(N-ethylamino)isobutyl)methyldiethoxysilane, (3-(N-ethylamino)isobutyl)trimethoxysilane, N-methylaminopropylmethyldimethoxysilane, N-methylaminopropyltrimethoxysilane, (phenylaminomethyl)methyldimethoxysilane, N-phenylaminomethyltriethoxysilane, and N-phenylaminopropyltrimethoxysilane.

Examples of suitable amino-functional alkoxysilanes under the Silquest® tradename include Silquest® A-1100 (γ-aminopropyltriethoxysilane), Silquest® A-1108 (γ-aminopropylsilsesquioxane), Silquest® A-1110 (γ-aminopropyltrimethoxysilane), Silquest® 1120 (N-β-(aminoethyl)-γ-aminopropyltrimethoxysilane), Silquest® 1128 (benzylamino-silane), Silquest® A-1130 (triaminofunctional silane), Silquest® Y-11699 (bis-(γ-triethoxysilylpropyl)amine), Silquest® A-1170 (bis-(γ-trimethoxysilylpropyl)amine), Silquest® A-1387 (polyazamide), Silquest® Y-19139 (ethoxy based polyazamide), and Silquest® A-2120 (N-β-(aminoethyl)-γ-aminopropylmethyldimethoxysilane).

Suitable amine-functional alkoxysilanes are commercially available, for example, from Gelest Inc, from Dow Corning Corporation, and Momentive.

An organo-functional alkoxysilane can be a mercapto-functional alkoxysilane including, for example, 3-mercaptopropyltriethoxysilane, 3-mercaptopropyltriemthoxysilane, 11-mercaptoundecyltrimethoxysilane, 3-mercaptopropylmethyldimethoxysilane, and combinations of any of the foregoing.

Compositions provided by the present disclosure can comprise, for example, from 1 wt % to 16 wt % of an adhesion promoter, from 3 wt % to 14 wt %, from 5 wt % to 12 wt %, or from 7 wt % to 10 wt % of an adhesion promoter or combination of adhesion promoters, where wt % is based on the total weight of the composition.

Compositions provided by the present disclosure can comprise less than 16 wt % of an adhesion promoter, less than 14 wt %, less than 12 wt %, less than 10 wt %, less than 8 wt %, less than 6 wt %, less than 4 wt % or less than 2 wt % of an adhesion promoter or combination of adhesion promoters.

Compositions provided by the present disclosure can contain a solvent or a combination of solvents. Solvents can be included to adjust the viscosity of the composition and to facilitate application.

Examples of suitable solvents include organic solvents such as toluene, methyl ethyl ketone, benzene, n-hexane, and combinations of any of the foregoing.

Compositions provided by the present disclosure can comprise from 1 wt % to 10 wt % solvent, from 2 wt % to 9 wt %, from 3 wt % to 8 wt %, or from 4 wt % to 7 wt % solvent or combination of solvents, where wt % is based on the total weight of the composition.

Compositions provided by the present disclosure can comprise less than 10 wt % solvent, less than 8 wt %, less than 6 wt %, less than 4 wt %, or less than 2 wt % solvent or a combination of solvents, where wt % is based on the total weight of the composition.

Compositions provided by the present disclosure can contain a plasticizer or a combination of plasticizers. Plasticizers can be included to adjust the viscosity of the composition and to facilitate application.

Examples of suitable plasticizers include a combination of phthalates, terephthalic, isophthalic, hydrogenated terphenyls, quaterphenyls and higher or polyphenyls, phthalate esters, chlorinated paraffins, modified polyphenyl, tung oil, benzoates, dibenzoates, thermoplastic polyurethane plasticizers, phthalate esters, naphthalene sulfonate, trimellitates, adipates, sebacates, maleates, sulfonamides, organophosphates, polybutene, and combinations of any of the foregoing.

Compositions provided by the present disclosure can comprise from 0.5 wt % to 7 wt % of a plasticizer or combination of plasticizers from 1 wt % to 6 wt %, from 2 wt % to 5 wt % or from 2 wt % to 4 wt % of a plasticizer or combination of plasticizers, where wt % is based on the total weight of the composition.

Compositions provided by the present disclosure can comprise less than 8 wt % plasticizer, less than 6 wt %, less than 4 wt %, or less than 2 wt % of a plasticizer or combination of plasticizers, where wt % is based on the total weight of the composition.

Compositions provided by the present disclosure can contain an extender or a combination of extenders. Extenders can be included to adjust the viscosity of the composition and to facilitate application.

Examples of suitable extenders include talc, silica, clay, calcium sulfate, calcium carbonate, glass fibers, glass beads, carbon black, alumina trihydrate, wollastonite, and combinations of any of the foregoing.

Compositions provided by the present disclosure can comprise from 0.1 wt % to 3 wt % of an extender or combination of extenders from 0.2 wt % to 2 wt %, from 0.5 wt % to 1.5 wt % or from 0.5 wt % to 1 wt % of an extender or a combination of extenders, where wt % is based on the total weight of the composition.

Compositions provided by the present disclosure can comprise less than 3 wt % of an extender, less than 2 wt %, less than 1 wt %, or less than 0.5 wt % of an extender or combination of extenders, where wt % is based on the total weight of the composition.

Compositions provided by the present disclosure can comprise a polysulfide cure retarder or combination of polysulfide cure retarder.

A polysulfide cure retarder can comprise an acid such as fatty acids, organic or inorganic acids or fatty acid salts. Examples of suitable polysulfide cure retarders include phenylphosphonic acid, and itaconic acid. Cure retarders can improve the stability of the polysulfide cure activator and polysulfide cure accelerator.

Compositions provided by the present disclosure can comprise less than 5 wt % of a polysulfide cure retarder, less than 3 wt %, less than 2 wt %, less than 1 wt %, or less than 0.5 wt % of a polysulfide cure retarder or combination of polysulfide cure retarders, where wt % is based on the total weight of the composition.

Compositions provided by the present disclosure can comprise a fire retardant or combination of fire retardants.

A fire retardant can include an inorganic fire retardant, an organic fire retardant, or a combination thereof.

Examples of suitable inorganic fire retardants include aluminum hydroxide, magnesium hydroxide, zinc borate, antimony oxides, hydromagnesite, aluminum trihydroxide (ATH), calcium phosphate, titanium oxide, zinc oxide, magnesium carbonate, barium sulfate, barium borate, kaolinite, silica, antimony oxides, and combinations of any of the foregoing.

Examples of suitable organic fire retardants include halocarbons, halogenated esters, halogenated ethers, chlorinated and/or brominated flame retardants, halogen free compounds such as organophosphorus compounds, organonitrogen compounds, and combinations of any of the foregoing.

A composition can comprise, for example, from 1 wt % to 30 wt %, such as from 1 wt % to 20 wt %, or from 1 wt % to 10 wt % of a flame retardant or combination of flame retardants based on the total weight of the composition. For example, a composition can comprise less than 30 wt %, less than 20 wt %, less than 10 wt %, less than 5 wt %, or less than 2 wt %, of a flame retardant or combination of flame retardants based on the total weight of the composition.

Compositions provided by the present disclosure can comprise a corrosion inhibitor or combination of corrosion inhibitors.

Examples of suitable corrosion inhibitors include, for example, zinc phosphate-based corrosion inhibitors, for example, micronized Halox® SZP-391, Halox® 430 calcium phosphate, Halox® ZP zinc phosphate, Halox® SW-111 strontium phosphosilicate Halox® 720 mixed metal phosphor-carbonate, and Halox® 550 and 650 proprietary organic corrosion inhibitors commercially available from Halox. Other suitable corrosion inhibitors include Heucophos® ZPA zinc aluminum phosphate and Heucophos® ZMP zinc molybdenum phosphate, commercially available from Heucotech Ltd.

A corrosion inhibitor can comprise a lithium silicate such as lithium orthosilicate ($Li_4SiO_4$) and lithium metasilicate ($Li_2SiO_3$), MgO, an azole, or a combination of any of the foregoing. The corrosion inhibiting component (2) may further comprise at least one of magnesium oxide (MgO) and an azole.

A corrosion inhibitor can comprise a monomeric amino acid, a dimeric amino acid. an oligomeric amino acid, or a combination of any of the foregoing. Examples of suitable amino acids include histidine, arginine, lysine, cysteine, cystine, tryptophan, methionine, phenylalanine, tyrosine, and combinations of any of the foregoing.

A corrosion inhibitor can comprise a nitrogen-containing heterocyclic compound. Examples of such compounds include azoles, oxazoles, thiazoles, thiazolines, imidazoles, diazoles, pyridines, indolizines, and triazines, tetrazoles, tolyltriazole, and combinations of any of the foregoing.

Examples of suitable triazoles include 1,2,3-triazole, 1,2, 4-triazole, benzotriazole, derivatives thereof, and combinations of any of the foregoing. Derivatives of 1,2,3-triazole include 1-methyl-1,2,3-triazole, 1-phenyl-1,2,3-triazole, 4-methyl-2-phenyl-1,2,3-triazole, 1-benzyl-1,2,3-triazole, 4-hydroxy-1,2,3-triazole, 1-amino-1,2,3-triazole, 1-benzamido-4-methyl-1,2,3-triazole, 1-amino-4,5-diphenyl-1,2, 3-triazole, 1,2,3-triazole aldehyde, 2-methyl-1,2,3-triazole-4-carboxylic acid, and 4-cyano-1,2,3-triazole, or combinations thereof. Derivatives of 1,2,4-triazole include 1-methyl-1,2,4-triazole, 1,3-diphenyl-1,2,4-triazole, 5-amino-3-methyl-1,2,4-triazole, 3-mercapto-1,2,4-triazole, 1,2,4-triazole-3-carboxylic acid, 1-phenyl-1,2,4-triazole-5-one, 1-phenylurazole, and combinations of any of the foregoing. Examples of diazoles include 2,5-dimercapto-1,3,4-thiadiazole.

A corrosion inhibitor can include an azole or combination of azoles. Azoles are 5-membered N-heterocyclic compounds that contain in the heterocyclic ring two double bonds, one to three carbon atoms and optionally a sulfur or oxygen atom. Examples of suitable azoles include benzotriazole, 5-methyl benzotriazole, tolyltriazole, 2,5-dimercapto-1,3,4-thiazole, 2-mercaptobenzothiazole, 2-mercaptobenzimidazole, 1-phenyl-5-mercaptotetrazole, 2-amino-5-mercapto-1,3,4-thiadiazole, 2-mercapto-1-methylimidazole, 2-amino-5-ethyl-1,3,4-thiadiazole, 2-amino-5-ethylthio-1,3,4-thiadiazole, 5-phenyltetrazole, 7H-imidazo (4,5-d)pyrimidine, and 2-amino thiazole. Salts of any of the foregoing, such as sodium and/or zinc salts, can also be used as effective corrosion inhibitors. Other suitable azoles include 2-hydroxybenzothiazole, benzothiazole, 1-phenyl-4-methylimidazole, and 1-(p-tolyl)-4-methlyimidazole.

Compositions provided by the present disclosure can comprise corrosion resistant particles such as inorganic oxide particles, including for example, zinc oxide (ZnO), magnesium oxide (MgO), cerium oxide ($CeO_2$), molybdenum oxide ($MoO_3$), silicon dioxide ($SiO_2$), and combinations of any of the foregoing. An inorganic oxide can comprise an oxide of zinc, cerium, yttrium, manganese, magnesium, molybdenum, lithium, aluminum, magnesium, tin, calcium, boron, phosphorous, silicon, zirconium, iron, titanium, or a combination of any of the forgoing. In certain embodiments, the particles comprise an oxide of magnesium, zinc, cerium, or calcium.

Compositions provided by the present disclosure can comprise less than 5 wt % of a corrosion inhibitor or combination of corrosion inhibitors, less than 3 wt %, less than 2 wt %, less than 1 wt %, or less than 0.5 wt % of a corrosion inhibitor or combination of a corrosion inhibitors, where wt % is based on the total weight of the composition.

Compositions provided by the present disclosure can comprise a moisture control additive or combination of moisture control additives.

Examples of suitable moisture control additives include synthetic zeolite, activated alumina, silica gel, calcium oxide, magnesium oxide, molecular sieve, anhydrous sodium sulphate, anhydrous magnesium sulphate, and combinations of any of the foregoing.

Examples of alkoxysilane compounds useful as moisture control agents include n-propyltrimethoxysilane, vinyltrimethoxysilane, vinylmethyldimethoxysilane, methylsilicate, ethylsilicate, γ-mercaptopropylmethyldimethoxysilane, γ-mercaptopropylmethyldiethoxysilane, γ-glycidoxypropyltrimethoxysilane, and combinations of any of the foregoing.

An example of an oxazolidine compound useful as a moisture control agent is 3-ethyl-2-methyl-2-(3-methylbutyl)-1,3-oxazolidine.

Examples of other suitable moisture control agents include, vinyltrimethoxysilane, vinyltriethoxysilane, N-trimethoxysilylmethyl-O-methylcarbamate, N-dimethoxy(methyl)silylmethyl-O-methylcarbamate, N-methyl[3-(trimethoxysilyl)propyl]carbamate, vinyldimethoxymethylsilane, vinyltris(2-methoxyethoxy)silane, bis(3-triethoxysilylpropyl)amine, bis(3-trimethoxysilylpropyl)amine, N-dimethoxy(methyl)silylmethyl-O-methylcarbamate, oligomeric vinylsilanes, and combinations of any of the foregoing.

Compositions provided by the present disclosure can comprise less than 5 wt % of a moisture control agent or combination of moisture control agent, less than 3 wt %, less than 2 wt %, less than 1 wt %, or less than 0.5 wt % of a moisture control agent or combination of a moisture control agents, where wt % is based on the total weight of the composition.

Compositions provided by the present disclosure can comprise a polysulfide or combination of polysulfides, an activator or combination of activators, a polysulfide cure accelerator or combination of polysulfide cure accelerators, and a porous material or combination of porous materials.

A composition can further comprise, for example, a non-porous material, a plasticizer, a solvent, a fire retardant, a corrosion inhibitor, a polysulfide cure retardant, an adhesion promoter, an extender, a colorant, a moisture control agent, or a combination of any of the foregoing.

Compositions provided by the present disclosure can comprise from 20 wt % to 70 wt % of polysulfide prepolymers, such as from 25 wt % to 65 wt %, from 30 wt % to 60 wt %, from 35 wt % to 55 wt %, or from 40 wt % to 50 wt %, where wt % is based on the total weight of the composition.

Compositions provided by the present disclosure can comprise greater than 20 wt % polysulfide prepolymers, greater than 30 wt %, greater than 40 wt %, greater than 50 wt %, or greater than 60 wt % polysulfide prepolymers s, and less than 95 wt % polysulfide prepolymers s, where wt % is based on the total weight of the composition.

Compositions provided by the present disclosure can comprise from 0.5 wt % to 10 wt % of a polysulfide cure activator or combination of polysulfide cure activators, such as from 1 wt % to 9 wt %, from 2 wt % to 8 wt %, from 3 wt % to 7 wt %, or from 4 wt % to 6 wt %, of a polysulfide cure activator or combination of polysulfide cure activators, wherein wt % is based on the total weight of the composition. Compositions provided by the present disclosure can comprise less than 10 wt % of a polysulfide cure activator or combination of polysulfide cure activators, less than 8 wt %, less than 6 wt %, less than 4 wt %, or less than 2 wt %; and greater than 1 wt % of a polysulfide cure activator or combination of polysulfide cure activators, where wt % is based on the total weight of the composition.

Compositions provided by the present disclosure can comprise from 0.01 wt % to 2 wt % of a polysulfide cure accelerator or combination of polysulfide cure accelerators, such as from 0.02 wt % to 1.5 wt %, from 0.05 wt % to 1.25 wt %, from 0.075 wt % to 1 wt %, or from 0.1 wt % to 0.75 wt of a polysulfide cure accelerator or combination of polysulfide cure accelerators, where wt % is based on the total weight of the composition. Compositions provided by the present disclosure can comprise, for example, less than 2 wt % of a polysulfide cure accelerator or combination of polysulfide cure accelerators, less than 1.5 wt %, less than 1.25 wt %, less than 1 wt %, less than 0.75 wt %, less than 0.5 wt %, less than 0.25 wt %, or less than 0.2 wt %; and greater than 0.01 wt % of a polysulfide cure accelerator or combination of polysulfide cure accelerators, where wt % is based on the total weight of the composition.

Compositions provided by the present disclosure can comprise, for example, from 0.1 wt % to 10 wt % of a synergist or combination of synergists, such as from 0.1 wt % to 9 wt %, from 0.5 wt % to 8 wt %, from 1 wt % to 6 wt %, or from 2 wt % to 4 wt % of a synergist or combination of synergists, where wt % is based on the total weight of the composition. A composition can comprise, for example, greater than 0.1 wt % of a synergist or combination of synergists and less than 10 wt %, less than 8 wt %, less than 6 wt %, less than 4 wt %, or less than 2 wt % of a synergist or combination of synergists, where wt % is based on the total weight of the composition.

A synergist can comprise polyether or a combination of polyethers, and compositions provided by the present disclosure can comprise, for example, from 0.1 wt % to 10 wt % of a polyether or combination of polyethers, such as from 0.1 wt % to 9 wt %, from 0.5 wt % to 8 wt %, from 1 wt % to 6 wt %, or from 2 wt % to 4 wt % of a polyether or combination of polyethers, where wt % is based on the total weight of the composition. A composition can comprise, for example, greater than 0.1 wt % of a polyether or combination of polyethers and less than 10 wt %, less than 8 wt %, less than 6 wt %, less than 4 wt %, or less than 2 wt % of a polyether or combination of polyethers, where wt % is based on the total weight of the composition.

Compositions provided by the present disclosure can comprise, for example, from 0.1 wt % to 15 wt % of a porous material such as silica, from 0.1 wt % to 10 wt %, from 0.5 wt % to 5 wt % of a porous material, from 0.75 wt % to 3 wt %, or from 1 wt % to 2 wt % of a porous material, where wt % is based on the total weight of the composition.

Compositions provided by the present disclosure can comprise, for example, less than 15 wt % of a porous material such as silica, less than 10 wt %, less than 7.5 wt %, less than 5 wt %, less than 3 wt %, less than 2 wt %, or less than 1 wt % porous material; and greater than at least 0.1 wt % of a porous material, where wt % is based on the total weight of the composition.

Compositions provided by the present disclosure can comprise, for example, from 15 wt % to 55 wt % total filler, such as from 20 wt % to 50 wt %, from 25 wt % to 45 wt %, or from 30 wt % to 40 wt % total filler, where wt % is based on the total weight of the composition. Compositions provided by the present disclosure can comprise, for example, less than 55 wt % filler, less than 45 wt %, less than 35 wt %, or less than 25 wt % filler; and greater than 15 wt % total filler, where wt % is based on the total weight of the composition.

Compositions provided by the present disclosure can comprise, for example, from 20 wt % to 70 wt % of a polysulfide prepolymer, from 10 wt % to 60 wt % of a non-porous in organic filler, from 0.1 wt % to 10 wt % of a porous material, from 0.1 wt % to 10 wt % of a polysulfide cure activator, from 0.01 wt % to 5 wt % for a polysulfide cure accelerator, and from 2 wt % to 30 wt % of one or more additional constituents, where wt % is based on the total weight of the composition.

Compositions provided by the present disclosure can comprise, for example, from 30 wt % to 60 wt % of a polysulfide prepolymer, from 20 wt % to 50 wt % of a non-porous in organic filler, from 0.5 wt % to 5 wt % of a porous material, from 1 wt % to 8 wt % of a polysulfide cure activator, from 0.1 wt % to 3 wt % for a polysulfide cure accelerator, and from 5 wt % to 25 wt % of one or more additional constituents, where wt % is based on the total weight of the composition.

Compositions provided by the present disclosure can comprise, for example, from 40 wt % to 50 wt % of a polysulfide prepolymer, from 30 wt % to 40 wt % of a non-porous in organic filler, from 0.5 wt % to 3 wt % of a porous material, from 5 wt % to 7 wt % of a polysulfide cure activator, from 0.3 wt % to 2 wt % for a polysulfide cure accelerator, and from 10 wt % to 20 wt % of one or more additional constituents, where wt % is based on the total weight of the composition.

The one or more additional constituents can comprise an adhesion promoter, solvent, a plasticizer, other additives, or a combination of any of the foregoing.

Uncured sealants provided by the present disclosure can be provided as a two-part system comprising a first part and a second part, which can be prepared and stored separately, and combined and mixed at the time of use.

A first part of the sealant system can comprise, for example, a polysulfide prepolymer.

A second part of a sealant system can comprise a polysulfide cure activator.

At least one of the first part and the second part can comprise a synergist, a porous material, or a polysulfide cure activator.

Each of the first part and the second part can independently comprise a synergist, a porous material, a polysulfide cure accelerator, or a combination of any of the foregoing.

When the first part and the second part are combined to form a curable composition, the curable composition can comprise, a polysulfide prepolymer, a polysulfide cure activator, a polysulfide cure accelerator, a synergist, and a porous material.

To facilitate homogeneous mixing, it can be desirable that the viscosity of the first and second parts be similar.

Curable compositions provided by the present disclosure can be used as sealants or coatings such as vehicle and aerospace sealants and coatings, and in particular, as sealants or coatings where resistance to hydraulic fluid is desired. A sealant refers to a curable composition that has the ability when cured to resist atmospheric conditions such as moisture and temperature and at least partially block the transmission of materials such as water, water vapor, fuel, solvents, and/or liquids and gases.

Compositions provided by the present disclosure may be applied directly onto the surface of a substrate or over an underlayer such as a primer by any suitable coating process.

Furthermore, methods are provided for sealing an aperture utilizing a composition provided by the present disclosure. These methods comprise, for example, applying the curable composition to at least one surface of a part; and curing the applied composition to provide a sealed part.

Compositions, including sealants, provided by the present disclosure may be applied to any of a variety of substrates. Examples of substrates to which a composition may be applied include metals such as titanium, stainless steel, steel alloy, aluminum, and aluminum alloy, any of which may be anodized, primed, organic-coated or chromate-coated; epoxy, urethane, graphite, fiberglass composite, Kevlar®, acrylics, and polycarbonates. Compositions provided by the present disclosure may be applied to a substrate such as aluminum or to an aluminum alloy.

Sealant compositions provided by the present disclosure may be formulated as Class A, Class B, or Class C sealants. A Class A sealant refers to a brushable sealant having a viscosity of 1 poise to 500 poise (0.1 Pa-sec to 50 Pa-sec) and is designed for brush application. A Class B sealant refers to an extrudable sealant having a viscosity from 4,500 poise to 20,000 poise (450 Pa-sec to 2,000 Pa-sec) and is designed for application by extrusion via a pneumatic gun. A Class B sealant can be used form fillets and sealing on vertical surfaces or edges where low slump/slag is required. A Class C sealant has a viscosity from 500 poise to 4,500 poise (50 Pa-sec to 450 Pa-sec) and is designed for application by a roller or combed tooth spreader. A Class C sealant can be used for fay surface sealing. Viscosity can be measured according to Section 5.3 of SAE Aerospace Standard AS5127/1C published by SAE International Group.

A composition provided by the present disclosure may be cured under ambient conditions, where ambient conditions refers to a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, e.g., 25° C. The methods may be used to seal apertures on aerospace vehicles including aircraft and aerospace vehicles.

Curing an applied composition encompasses leaving the composition at ambient conditions such as 25° C. and 50% RH and exposing the applied coating to elevated temperature such as a temperature greater than 30° C. for a period of time.

Apertures, surfaces, joints, fillets, fay surfaces including apertures, surfaces, fillets, joints, and fay surfaces of aerospace vehicles, sealed with compositions provided by the present disclosure are also disclosed. The compositions and sealants can also be used to seal fasteners.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within about 3 days to about 7 days following mixing and application to a surface. In general, full adhesion strength as well as other properties of cured compositions of the present disclosure becomes fully developed up to 7 days following mixing and application of a curable composition to a surface. A viable seal refers to a seal that meets the requirements of an intended use.

A cured composition can have a thickness, for example, from 5 mils to 25 mils (127 μm to 635 μm) such as from 10 mils to 20 mils (254 μm to 508 μm).

Cured compositions provided by the present disclosure, such as cured sealants, can exhibit properties acceptable for use in vehicle and aerospace sealant applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi (2.75 MPa); tear strength greater than 50 pounds per linear inch (pli) (8.75 N/mm); elongation between 250% and 300%; and hardness greater than 40 Durometer A. These and other cured sealant properties appropriate for aviation and aerospace applications are disclosed in AMS 3265B. It is also desirable that, when cured, compositions of the present disclosure used in aviation and aircraft applications exhibit a percent volume swell not greater than 25% following immersion for one week at 60° C. (140° F.) and ambient pressure in Jet Reference Fluid (JRF) Type 1. Other properties, ranges, and/or thresholds may be appropriate for other sealant applications.

Cured compositions provided by the present disclosure can be fuel-resistant. The term "fuel resistant" means that a composition, when applied to a substrate and cured, can provide a cured product, such as a sealant, that exhibits a percent volume swell of not greater than 40%, in some cases not greater than 25%, in some cases not greater than 20%, and in other cases not more than 10%, after immersion for one week at 140° F. (60° C.) and ambient pressure in JRF Type I according to methods similar to those described in ASTM D792 (American Society for Testing and Materials) or AMS 3269 (Aerospace Material Specification). JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1 etc., available from SAE (Society of Automotive Engineers)).

Compositions provided by the present disclosure provide a cured product, such as a sealant, exhibiting a tensile elongation of at least 200% and a tensile strength of at least 200 psi when measured in accordance with the procedure described in AMS 3279, § 3.3.17.1, test procedure AS5127/1, § 7.7. In general, for a Class A sealant there is no tensile and elongation requirement. For a Class B sealant, as a general requirement, tensile strength is equal to or greater than 200 psi (1.38 MPa) and elongation is equal to or greater than 200%. Acceptable elongation and tensile strength can be different depending on the application.

Compositions provide a cured product, such as a sealant, that exhibits a lap shear strength of greater than 200 psi (1.38 MPa), such as at least 220 psi (1.52 MPa), at least 250 psi (1.72 MPa), and, in some cases, at least 400 psi (2.76 MPa), when measured according to the procedure described in SAE AS5127/1 paragraph 7.8.

A cured sealant prepared from a composition provided by the present disclosure can meet or exceed the requirements for aerospace sealants as set forth in AMS 3277.

Apertures, surfaces, joints, fillets, fay surfaces including apertures, surfaces, fillets, joints, and fay surfaces of aerospace vehicles, sealed with compositions provided by the present disclosure are also disclosed.

Compositions provided by the present disclosure can be used to seal a part including a surface of a vehicle.

The term "vehicle" is used in its broadest sense and includes all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft.

A composition provided by the present disclosure can be used in a F/A-18 jet or related aircraft such as the F/A-18E Super Hornet and F/A-18F; in the Boeing 787 Dreamliner, 737, 747, 717 passenger jet aircraft, a related aircraft (produced by Boeing Commercial Airplanes); in the V-22 Osprey; VH-92, S-92, and related aircraft (produced by NAVAIR and Sikorsky); in the G650, G600, G550, G500, G450, and related aircraft (produced by Gulfstream); and in the A350, A320, A330, and related aircraft (produced by Airbus). Compositions provided by the present disclosure can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

Compositions provided by the present disclosure can be used to seal parts and surfaces of vehicles such as fuel tank surfaces and other surfaces exposed to or potentially exposed to aerospace solvents, aerospace hydraulic fluids, and aerospace fuels.

The present invention includes parts sealed with a composition provided by the present disclosure, and assemblies and apparatus comprising a part sealed with a composition provided by the present disclosure.

The present invention includes vehicles comprising a part such as a surface sealed with a composition provided by the present disclosure. For example, an aircraft comprising a fuel tank or portion of a fuel tank sealed with a sealant provided by the present disclosure is included within the scope of the invention.

ASPECTS OF THE INVENTION

Embodiments of the present disclosure are further defined by the following aspects of the invention.

Aspect 1. A composition, comprising: a polysulfide prepolymer; a polysulfide cure activator; a polysulfide cure accelerator; a filler, wherein the filler comprises a porous material; and a synergist, wherein the synergist comprises a polyether, and wherein the composition comprises from 0.1 wt % to 10 wt % of the synergist, wherein wt % is based on the total weight of the composition.

Aspect 2. The composition of aspect 1, wherein the polysulfide prepolymer comprises a polysulfide prepolymer comprising a moiety of Formula (1) or a polysulfide prepolymer having the structure of Formula (1a):

  (1)

  (1a)

wherein each R is —(CH$_2$)$_2$—O—CH$_2$—O—(CH$_2$)$_2$—; and n is an integer from 7 to 38.

Aspect 3. The composition of any one of aspects 1 to 2, wherein the polysulfide prepolymer comprises a polysulfide prepolymer comprising a moiety of Formula (2) or a polysulfide prepolymer having the structure of Formula (2a):

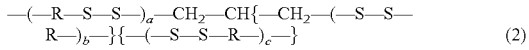  (2)

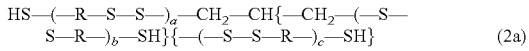  (2a)

wherein,
each R is —(CH$_2$)$_2$—O—CH$_2$—O—(CH$_2$)$_2$—;
n is the sum of a, b, and c; and
n is an integer from 7 to 38.

Aspect 4. The composition of aspect 3, wherein the polysulfide prepolymer has a number average molecular weight from 1,000 Da to 6,500 Da, an SH content from 1% to 6%, and a cross-linking density from 0% to 2%.

Aspect 5. The composition of any one of aspects 1 to 4, wherein the polysulfide prepolymer comprises a polysulfide prepolymer comprising a moiety of Formula (3) or a polysulfide prepolymer having the structure of Formula (3a):

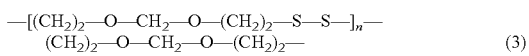  (3)

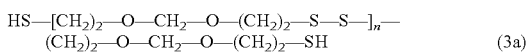  (3a)

wherein n is an integer from 8 to 80.

Aspect 6. The composition of any one of aspects 1 to 5, wherein the polysulfide prepolymer comprising a polysulfide prepolymer comprises a moiety of Formula (4) or a polysulfide prepolymer having the structure of Formula (4a):

  (4)

  (4a)

wherein,
t is an integer from 1 to 60;
q is an integer from 1 to 8;
p is an integer from 1 to 10;
r is an integer from 1 to 10;
y has average value within a range from 1.0 to 1.5; and
each R is independently selected from branched C$_{1-10}$ alkanediyl, branched C$_{6-12}$ arenediyl, and a moiety having the structure —(CH$_2$)$_p$—O—(CH$_2$)$_q$—O—(CH$_2$)$_r$—.

Aspect 7. The composition of any one of aspects 1 to 6, wherein the polysulfide prepolymer comprises a polysulfide prepolymer comprising a moiety of Formula (5) or a polysulfide prepolymer having the structure of Formula (5a):

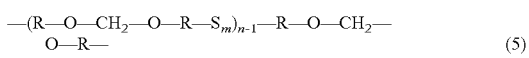  (5)

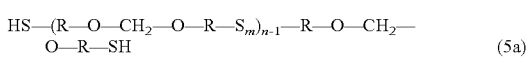  (5a)

wherein,
each R is independently C$_{2-4}$ alkanediyl;
m is an integer from 1 to 8; and
n is an integer from 2 to 370.

Aspect 8. The composition of any one of aspects 1 to 7, wherein the polysulfide prepolymer comprises a thiol-terminated polysulfide prepolymer.

Aspect 9. The composition of any one of aspects 1 to 8, wherein the polysulfide prepolymer as an average functionality from 2.1 to 2.9.

Aspect 10. The composition of any one of aspects 1 to 9, wherein the polysulfide cure activator comprises a metal oxide.

Aspect 11. The composition of any one of aspects 1 to 9, wherein the polysulfide cure activator comprises manganese dioxide.

Aspect 12. The composition of any one of aspects 1 to 11, wherein the polysulfide cure accelerator comprises an amine-based sulfur donor.

Aspect 13. The composition of aspect 12, wherein the polysulfide cure accelerator comprises a thiuram polysulfide.

Aspect 14. The composition of any one of aspects 12 to 13, wherein the polysulfide cure accelerator comprises a thiuram disulfide.

Aspect 15. The composition of any one of aspects 1 to 14, wherein the porous material is characterized by: a BET from 5 m$^2$/g to 700 m$^2$/g; a total pore volume from 0.01 mL/g to 10 mL/g; an average pore diameter from 10 nm to 30 nm; or a combination of any of the foregoing.

Aspect 16. The composition of any one of aspects 1 to 15, wherein the porous material comprises silica, alumina, zinc oxide, titanium dioxide, zirconia, hafnia, yttria, rare earth oxides, boehmite, alkaline earth fluorides, calcium phosphates, and hydroxyapatite, or a combination of any of the foregoing.

Aspect 17. The composition of any one of aspects 1 to 16, wherein the porous material comprises silica.

Aspect 18. The composition of any one of aspects 1 to 17, wherein the porous material comprises untreated silica.

Aspect 19. The composition of any one of aspects 1 to 17, wherein the porous material comprises treated silica.

Aspect 20. The composition of any one of aspects 1 to 19, wherein the porous material comprises fumed silica, precipitated silica, or a combination thereof.

Aspect 21. The composition of aspect 20, wherein the fumed silica comprises hydrophobic silica, hydrophilic silica, or a combination thereof.

Aspect 22. The composition of any one of aspects 1 to 21, wherein the porous material has an average diameter (d50) from 1 μm to 20 μm.

Aspect 23. The composition of any one of aspects 1 to 21, wherein the porous material has an average diameter (d50) less than 20 μm.

Aspect 24. The composition of any one of aspects 1 to 23, wherein the porous material has a BET surface area from 5 m$^2$/g to 700 m$^2$/g, wherein BET surface area is determined according to DIN EN ISO 9277/DIN 66132.

Aspect 25. The composition of any one of aspects 1 to 23, wherein the porous material has a BET surface area greater than 5 m$^2$/g, wherein BET surface area is determined according to DIN EN ISO 9277/DIN 66132.

Aspect 26. The composition of any one of aspects 1 to 25, wherein the composition comprises from 0.1 wt % to 10 wt % of the porous material, wherein wt % is based on the total weight of the composition.

Aspect 27. The composition of any one of aspects 1 to 26, wherein the composition comprises less than 10 wt % of the porous material, wherein wt % is based on the total weight of the composition.

Aspect 28. The composition of any one of aspects 1 to 27, wherein the composition comprises a filler.

Aspect 29. The composition of aspect 28, wherein the composition comprises from 5 wt % to 70 wt % of a filler, where wt % is based on the total weight of the composition.

Aspect 30. The composition of any one of aspects 28 to 29, wherein the filler comprises a porous material.

Aspect 31. The composition of aspect 30, wherein the porous material comprises hydrophobic silica, hydrophilic silica, or a combination thereof.

Aspect 32. The composition of any one of aspects 1 to 31, wherein the filler comprises an inorganic filler, an organic filler, a low-density filler, a conductive filler, or a combination of any of the foregoing.

Aspect 33. The composition of any one of aspects 1 to 32, wherein the filler further comprises alumina silicate, calcium carbonate, talc, titanium dioxide, or a combination of any of the foregoing.

Aspect 34. The composition of any one of aspects 1 to 33, wherein the filler comprises from 70 wt % to 99 wt % of calcium carbonate, wherein wt % is based on the total weight of the filler.

Aspect 35. The composition of any one of aspects 1 to 34, wherein the filler comprises from 4 wt % to 14 wt % of titanium dioxide, wherein wt % is based on the total weight of the filler.

Aspect 36. The composition of any one of aspects 1 to 35, wherein the polyether comprises a polyether that is liquid at 25° C.

Aspect 37. The composition of any one of aspects 1 to 36, wherein the polyether comprises polyethylene glycol, polypropylene glycol, poly(tetramethylene ether) glycol, blocked copolymers of any of the foregoing, crown ethers, or a combination of any of the foregoing.

Aspect 38. The composition of any one of aspects 1 to 37, wherein the polyether comprises terminal hydroxyl groups, terminal alkyl groups, terminal substituted phenyl groups, terminal (meth)acryloyl groups, or a combination of any of the foregoing.

Aspect 39. The composition of any one of aspects 1 to 38, wherein the polyether comprises a polyether having the structure of Formula (7), the structure of Formula (8), or a combination thereof:

$$R^1-O-\left[\left(C(R^2)\right)_n-O\right]_p-R^1 \quad (7)$$

$$B-\left\{O-\left[\left(C(R^2)\right)_n-O\right]_p-R^1\right\}_z \quad (8)$$

wherein,
n is an integer from 1 to 6;
p is an integer from 2 to 50;
z is an integer from 3 to 6;
each $R^1$ is independently selected from hydrogen, $C_{1-10}$ alkyl, (meth)acryloyl, and substituted aryl;
each $R^2$ is independently selected from hydrogen and $C_{1-3}$ alkyl; and
B is a polyfunctional moiety.

Aspect 40. The composition of aspect 39, wherein B is selected from $C_{2-20}$ alkane-triyl, $C_{2-20}$ heteroalkane triyl, $C_{2-20}$ alkane-tetrayl, and $C_{2-20}$ heteroalkane tetrayl.

Aspect 41. The composition of any one of aspects 1 to 40, wherein the polyether comprises an ionic polyether.

Aspect 42. The composition of any one of aspects 1 to 36, wherein the polyether comprises a non-ionic polyether.

Aspect 43. The composition of any one of aspects 1 to 42, wherein the polyether has a number average molecular weight from 100 Da to 5,000 Da, wherein molecular weight is determined by gel permeation chromatography.

Aspect 44. The composition of any one of aspects 1 to 42, wherein the polyether has a number average molecular weight less than 5,000 Da, wherein molecular weight is determined by gel permeation chromatography.

Aspect 45. The composition of any one of aspects 1 to 44, wherein the composition comprises from 20 wt % to 70 wt % of the polysulfide prepolymer, wherein wt % is based on the total weight of the composition.

Aspect 46. The composition of any one of aspects 1 to 44, wherein the composition comprises greater than 20 wt % of the polysulfide prepolymer, wherein wt % is based on the total weight of the composition.

Aspect 47. The composition of any one of aspects 1 to 46, wherein the composition comprises from 1 wt % to 10 wt % of the polysulfide cure activator, wherein wt % is based on the total weight of the composition.

Aspect 48. The composition of any one of aspects 1 to 46, wherein the composition comprises less than 10 wt % of the polysulfide cure activator, wherein wt % is based on the total weight of the composition.

Aspect 49. The composition of any one of aspects 1 to 48, wherein the composition comprises from 0.01 wt % to 2 wt % of the polysulfide cure accelerator, wherein wt % is based on the total weight of the composition.

Aspect 50. The composition of any one of aspects 1 to 48, wherein the composition comprises less than 2 wt % of the polysulfide cure accelerator.

Aspect 51. The composition of any one of aspects 1 to 45, wherein the composition comprises from 1 wt % to 10 wt % of the synergist, wherein wt % is based on the total weight of the composition.

Aspect 52. The composition of any one of aspects 1 to 45, wherein the composition comprises from 2 wt % to 6 wt % of the synergist, wherein wt % is based on the total weight of the composition.

Aspect 53. The composition of any one of aspects 1 to 48, wherein the composition comprises one or more additives.

Aspect 54. The composition of aspect 53, wherein the one or more additives comprises a polysulfide cure retarder, an adhesion promotor, a solvent, an extender, a plasticizer, a flame retardant, a corrosion inhibitor, a colorant, or a combination of any of the foregoing.

Aspect 55. The composition of any one of aspects 1 to 52, wherein the composition comprises a polysulfide cure retarder.

Aspect 56. The composition of aspect 55, wherein the polysulfide cure retarder comprises a fatty acid, an inorganic acid, a zeolite, or a combination of any of the foregoing.

Aspect 57. The composition of any one of aspects 55 to 56, wherein the composition comprises from 0.1 wt % to 2 wt % of the polysulfide cure retarder, wherein wt % is based on the total weight of the composition.

Aspect 58. The composition of any one of aspects 1 to 58, wherein the composition comprises an adhesion promoter.

Aspect 59. The composition of aspect 58, wherein the adhesion promoter comprises a phenolic resin, an organofunctional polyalkoxysilane, or a combination thereof.

Aspect 60. The composition of any one of aspects 1 to 59, wherein the composition further comprises a solvent.

Aspect 61. The composition of aspect 60, wherein the solvent comprises an organic solvent.

Aspect 62. The composition of aspect 61, wherein the organic solvent comprises toluene, methyl ethyl ketone, xylene, light aromatic naphtha or a combination of any of the foregoing.

Aspect 63. The composition of any one of aspects 60 to 62, wherein the composition comprises from 0.1 wt % to 8 wt % of the solvent, wherein wt % is based on the total weight of the composition.

Aspect 64. The composition of any one of aspects 1 to 63, wherein the composition further comprises an extender.

Aspect 65. The composition of aspect 64, wherein the extender comprises calcium sulfonate.

Aspect 66. The composition of any one of aspects 64 to 65, wherein the composition comprises from 0.1 wt % to 3 wt % of the extender, wherein wt % is based on the total weight of the composition.

Aspect 67. The composition of any one of aspects 1 to 66, wherein the composition further comprises a plasticizer.

Aspect 68. The composition of aspect 67, wherein the plasticizer comprises a modified polyphenyl.

Aspect 69. The composition of any one of aspects 67 to 68, wherein the composition comprises from 0.1 wt % to 8 wt % of the plasticizer, wherein wt % is based on the total weight of the composition.

Aspect 70. The composition of any one of aspects 1 to 69, wherein the composition further comprises a corrosion inhibitor.

Aspect 71. The composition of aspect 70, wherein the corrosion inhibitor comprises a zinc phosphate-based corrosion inhibitor.

Aspect 72. The composition of any one of aspects 70 to 71, wherein the composition comprises from 0.1 wt % to 10 wt % of the corrosion inhibitor, wherein wt % is based on the total weight of the composition.

Aspect 73. The composition of any one of aspects 1 to 72, wherein the composition further comprises a fire retardant.

Aspect 74. The composition of aspect 73, wherein the fire retardant comprises aluminum hydroxide, magnesium hydroxide, zinc borate, antimony oxides, hydromagnesite, aluminum trihydroxide (ATH), calcium phosphate, titanium oxide, zinc oxide, magnesium carbonate, barium sulfate, barium borate, kaolinite, silica, antimony oxides, halocarbons, halogenated esters, halogenated ethers, chlorinated and/or brominated flame retardants, organophosphorus compounds, organonitrogen compounds, or a combination of any of the foregoing.

Aspect 75. The composition of any one of aspects 74 to 75, wherein the composition comprises from 0.1 wt % to 10 wt % of the fire retardant, wherein wt % is based on the total weight of the composition.

Aspect 76. A cured composition prepared from the composition of any one of aspects 1 to 73.

Aspect 77. A part comprising the cured composition of aspect 76.

Aspect 78. A vehicle comprising the cured composition of aspect 76 or the part of aspect 77.

Aspect 79. The vehicle of aspect 78, wherein the vehicle comprises an aerospace vehicle.

Aspect 80. A method of sealing a part, comprising: applying the composition of any one of aspects 1 to 73, to a surface of a part; and curing the applied composition to seal the part.

Aspect 81. A part sealed using the method of aspect 80.

Aspect 82. A sealant system comprising: (a) a first part, wherein the first part comprises a polysulfide prepolymer; and (b) a second part, wherein the second part comprises a polysulfide cure activator; wherein at least one of the first part and the second part independently comprises a synergist comprising a polyether, a porous material, a polysulfide cure accelerator, or a combination of any of the foregoing, and wherein the sealant system comprises from 0.1 wt % to 10 wt % of the synergist, wherein wt % is based on the total weight of the first part and the second part.

Aspect 83. The sealant system of aspect 82, wherein the porous material comprises silica.

Aspect 84. A cured sealant prepared from the sealant system of any one of aspects 80 to 81.

Aspect 85. A part comprising the cured sealant of aspect 84.

Aspect 86. A vehicle comprising the cured sealant of any one of aspect 84 or the part of aspect 85.

Aspect 87. The vehicle of aspect 86, wherein the vehicle comprises an aerospace vehicle.

Aspect 88. A method of sealing a part, comprising: combining the first part and the second part of the sealant system of any one of aspects 82 and 83, to provide a curable sealant composition; applying the curable sealant composition to a surface of a part; and curing the applied sealant composition to seal the part.

Aspect 89. A part sealed using the method of aspect 88.

Aspect 90. A vehicle comprising the sealed part of aspect 89.

Aspect 91. The vehicle of aspect 90, wherein the vehicle comprises an aerospace vehicle.

EXAMPLES

Embodiments provided by the present disclosure are further illustrated by reference to the following examples, which describe compositions and uses provided by the present disclosure. It will be apparent to those skilled in the art that many modifications, both to materials, and methods, may be practiced without departing from the scope of the disclosure.

Example 1

Sealant Compositions

A manganese dioxide-cured polysulfide sealant similar to that described in U.S. Pat. No. 4,623,711. was used. The sealant consisted of two parts; a Base component and an Accelerator component.

The composition of the Base and Accelerator components of the sealant are shown in Tables 1 and 2, respectively.

TABLE 1

| Base component. | |
| --- | --- |
| Base Component | Amount (wt %) |
| Polysulfide prepolymer | 49 |
| Filler | 34 |
| Phenolic resin | 8 |
| TiO$_2$ | 3.5 |

TABLE 1-continued

Base component.

| Base Component | Amount (wt %) |
|---|---|
| Polysulfide cure accelerator | 0.46 |
| Additives/solvent | 5 |

TABLE 2

Accelerator component.

| Accelerator Component | Amount (wt %) |
|---|---|
| MnO$_2$ activator | 52 |
| Plasticizer | 34 |
| Filler | 8 |
| Additives | 6 |

Polyethers were combined with the Base component, and the Base component was combined and mixed with the Accelerator component in a wt % ratio of 10:1 to provide a curable polysulfide sealant. The composition of the curable polysulfide sealant is shown in Table 2.

TABLE 3

Curable sealant composition.

| Component | Amount (wt %) |
|---|---|
| Polysulfide prepolymer[1] | 45 |
| Non-porous inorganic filler[2] | 34 |
| Porous hydrophobic silica | 1 |
| Phenolic resin | 7 |
| Solvent and hydrogenated terphenyl plasticizer | 7 |
| Polysulfide cure activator | 5 |
| Polysulfide cure accelerator MnO$_2$ | 0.7 |
| Additives | 1 |

[1]Polysulfide resin, U.S. Pat. No. 4,623,711.
[2]TiO$_2$ (3 wt % of composition), calcium carbonate (30 wt % of composition), and talc (0.7 wt % of composition).

The curable sealant composition contained about 1 wt % of a porous hydrophobic silica.

To evaluate the effect of various polyether synergists shown in Table 4 on the cure rate of the polysulfide sealant, the polyether synergists were added to the Base component of the sealant and the Base and Accelerator components combined. Samples were cured in a controlled humidity chamber at 50% relative humidity, 25° C. until a constant final hardness was reached, unless otherwise mentioned.

TABLE 4

Polyethers.

| No. | Polyether |
|---|---|
| 1 | Carbowax ® 350 |
| 2 | Bisomer ® MPEG 350 |
| 3 | Sartomer ® SR 415 |
| 4 | Triton ® X-35 |
| 5 | Triton ® X-100 |
| 6 | Triton ® X-405 |
| 7 | Propylene glycol 725 |
| 8 | Terathane ® 650 |
| 9 | Pluronic ® 17R4 |
| 10 | Voranol ® 220-056N |
| 11 | Voranol ® 220-110N |

TABLE 4-continued

Polyethers.

| No. | Polyether |
|---|---|
| 12 | Carbowax ® 750 |
| 13 | 15-Crown-5 |

1 Carbowax ® 350, methoxypolyethylene glycol having an average molecular weight from 335 Da to 365 Da, and an average hydroxyl number (mg KOH/g) from 154 to 167, available from Dow Chemical Co.
2 Bisomer ® MPEG 350 methoxy polyethyleneglycol methacrylate having an average molecular weight of 430 Da, and a hydroxyl number from 127 to 140 mg KOH/g determined according to ISO 3657; 19-09, available from GEO Specialty Chemicals.
3 Sartomer ® SR 415, ethoxylated trimethylolpropane triacrylate having a molecular weight of 428 Da, available from Arkema.
4 Triton ® X-35, octylphenol ethoxylate, nonionic, available from Dow Chemical.
5 Triton ® X-100, octylphenol ethoxylate, nonionic, available from Dow Chemical.
6 Triton ® X-405, octylphenol ethoxylate, nonionic, available from Dow Chemical.
7 Propylene glycol 725, having a molecular weight of 760 Da, and a hydroxyl number from 141.9 to 151.9 mg KOH/g, available from Covestro.
8 Terathane ® 650, polytetramethylene ether glycol having an average molecular weight from 230 Da to 270 Da, and a hydroxyl number from 415.6 to 487.8 mg KOH/gm, available from The Lycra Company.
9 Plurionic ® 17R4, poly(propylene glycol)-block-poly(ethylene glycol)-block-poly(propylene glycol), number average molecular weight of 2,700, 40% polyethylene glycol content, available from BASF.
10 Voranol 220-056N, propylene glycol, having an average molecular with of 2,000 Da, and a hydroxyl number of 56 mg KOH/g, available from Dow Chemical.
11 Voranol ® 220-110N, propylene glycol, having an average molecular with of 1,000 Da, and a hydroxyl number of 110 mg KOH/g, available from Dow Chemical.
12 Carbowax ® 750, methoxypolyethylene glycol having an average molecular weight from 715 Da to 785 Da, and an average hydroxyl number (mg KOH/g) from 71 to 78, available from Dow Chemical Co.
13 15-Crown-5, 1,4,7,10,13-pentaoxacyclopentadecane, available from TCI America.

Example 2

Cure Profiles of Sealants Incorporating Polyether 2 or Polyether 3

The Shore A hardness determined using a Type A durometer in accordance with ASTM D2240, during cure of the sealant of Example 1 containing Polyether 2 or Polyether 3 were compared with the control sealant without a polyether synergist. The results are presented in Table 5 and in FIG. 1 (polyether, wt %). The amounts of the polyether for the various sealant compositions are indicated as wt % of the total weight of the curable sealant composition.

TABLE 5

Shore A hardness during cure.

| | Polyether 2 Bisomer ® MPEG350 | | | Polyether 3 Sartomer SR 415 | | | Control |
|---|---|---|---|---|---|---|---|
| Time (h) | 0.9 wt % | 2.7 wt % | 4.3 wt % | 0.9 wt % | 2.7 wt % | 4.3 wt % | 0 wt % |
| 2 | <0 | 5 | 13 | <0 | <0 | 4 | <0 |
| 3 | 9 | 15 | 24 | 1 | 14 | 24 | <0 |
| 4 | 22 | 26 | 31 | 12 | 30 | 37 | 6 |
| 5 | 30 | 29 | 34 | 23 | 36 | 37 | 13 |
| 6 | 34 | 36 | 36 | 29 | 38 | 39 | 23 |
| 24 | 38 | 37 | 36 | 40 | 40 | 39 | 43 |

Example 3

Cure Profiles of Sealants Incorporating Polyether 1 or Polyether 2

Figure 2:
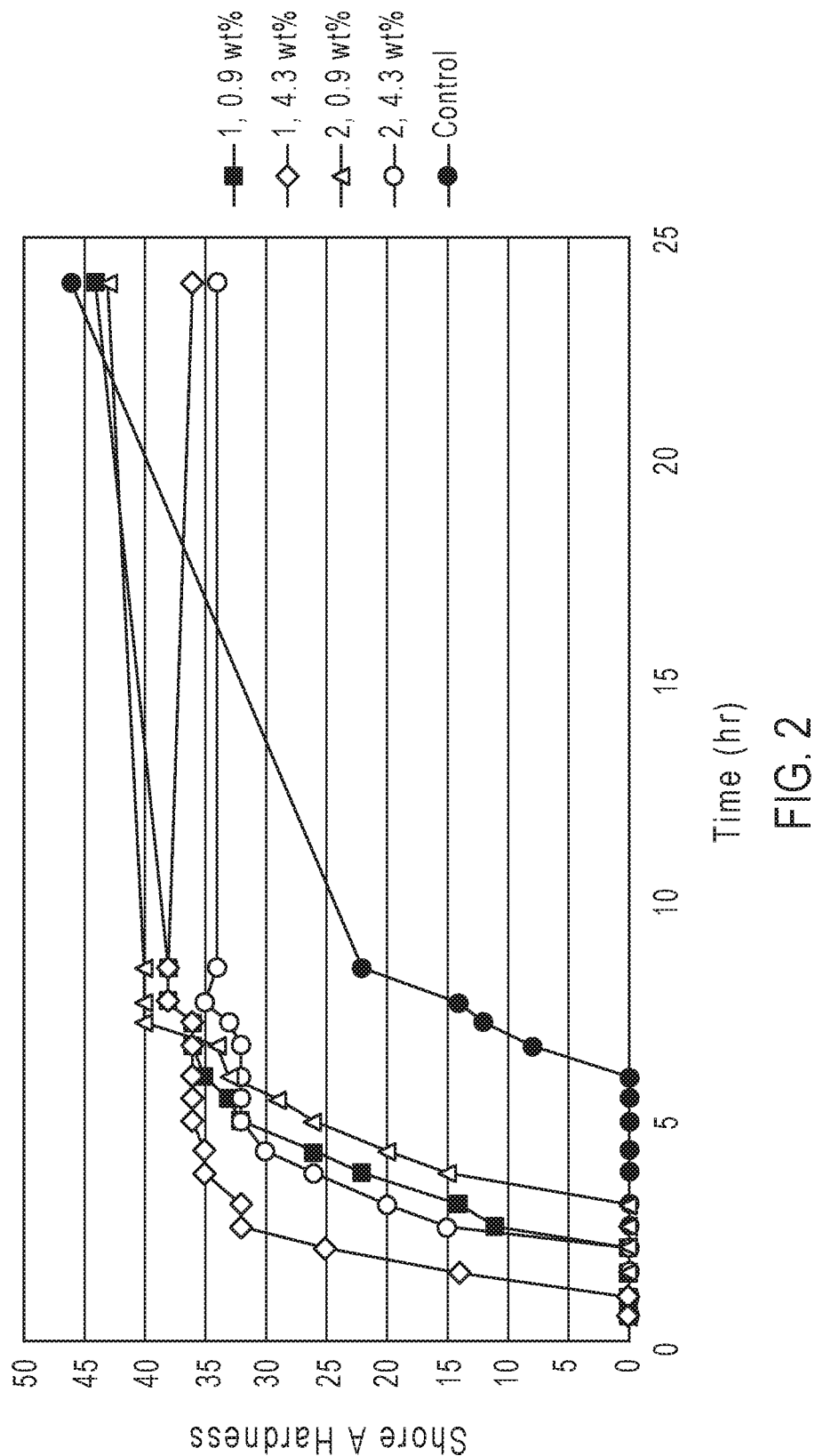
FIG. 2 shows the Shore A hardness during cure of polysulfide sealants containing different amounts and different types of polyethers.

The Shore A hardness during cure of the sealant of Example 1 containing either Polyether 1 or Polyether 2 were compared with the control sealant without a polyether synergist. The results are presented in Table 6 and in FIG. 2 (polyether, wt %). The amounts of the polyether in the various sealant compositions are indicated as wt % of the total weight of the curable sealant composition.

TABLE 6

Shore A hardness during cure.

| | Polyether 1 Carbowax ® 350 | | Polyether 2 Bisomer ® MPEG 350 | | Control |
|---|---|---|---|---|---|
| Time (h) | 0.9 wt % | 4.3 wt % | 0.9 wt % | 4.3 wt % | 0 wt % |
| 2 | <0 | 25 | <0 | <0 | <0 |
| 3 | 14 | 32 | <0 | 20 | <0 |
| 4 | 22 | 35 | 15 | 26 | <0 |
| 5 | 32 | 36 | 26 | 32 | <0 |
| 6 | 35 | 36 | 33 | 31 | <0 |
| 7 | 36 | 36 | 40 | 33 | 12 |
| 24 | 44 | 36 | 43 | 34 | 46 |
| 48 | 43 | 37 | 41 | 34 | 45 |

Example 4

Cure Profiles of Sealants Incorporating Polyether 1 or Polyether 2

Figure 3:
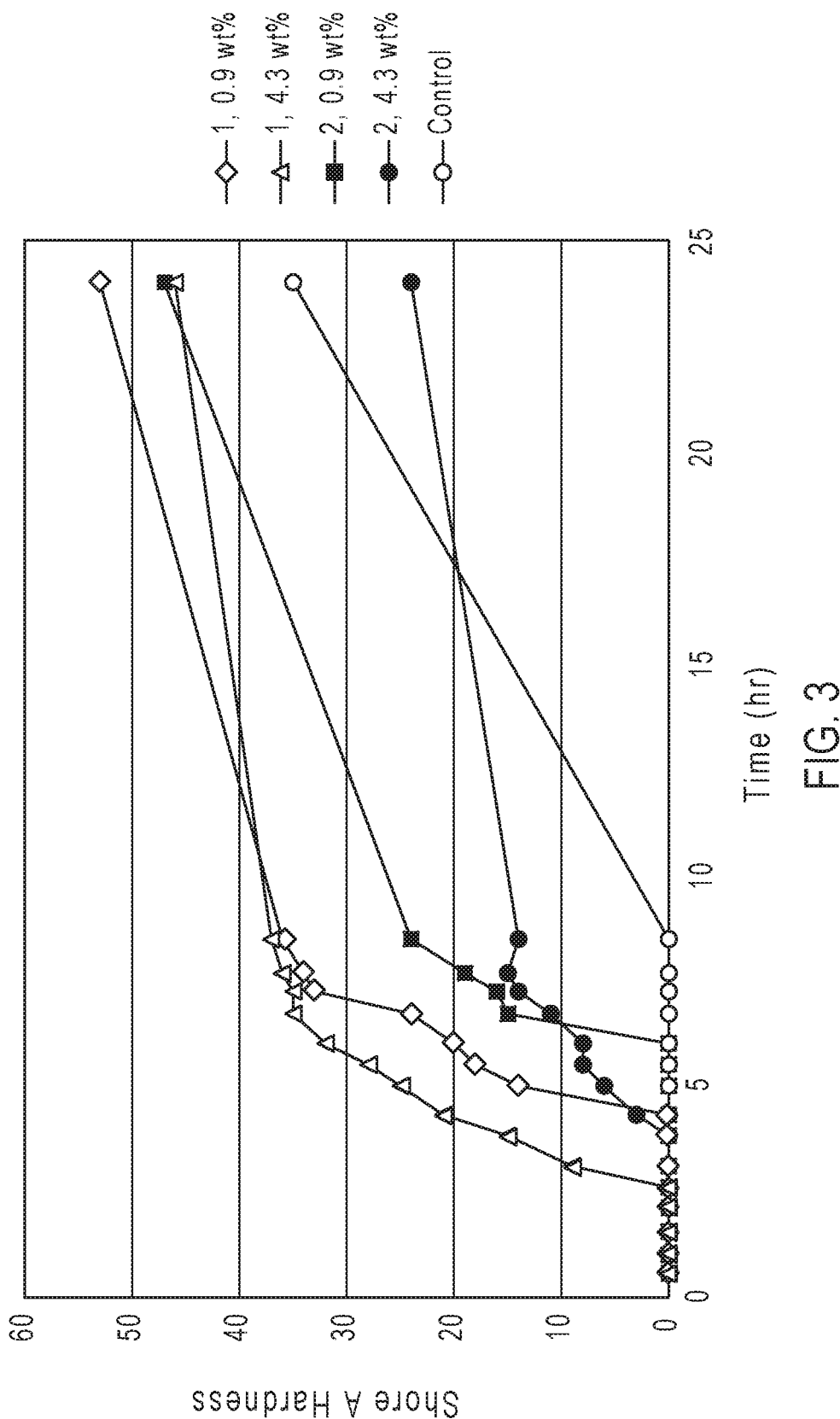
FIG. 3 shows the Shore A hardness during cure of polysulfide sealants containing different amounts and different types of polyethers.

The Shore A hardness during cure of the sealant containing either Polyether 1 or Polyether 2 were compared with the control sealant. The results are presented in Table 7 and in FIG. 3 (polyether, wt %). The amounts of the polyether for the various sealant compositions are indicated as wt % of the total weight of the curable sealant composition.

TABLE 7

Shore A hardness during cure.

| | Polyether 1 Carbowax ® 350 | | Polyether 2 Bisomer ® MPEG350 | | Control |
|---|---|---|---|---|---|
| Time (h) | 0.9 wt % | 4.3 wt % | 0.9 wt % | 4.3 wt % | 0 wt % |
| 2 | <0 | <0 | <0 | <0 | <0 |
| 3 | <0 | 9 | <0 | <0 | <0 |
| 4 | <0 | 15 | <0 | <0 | <0 |
| 5 | 14 | 25 | <0 | 6 | <0 |
| 6 | 20 | 32 | <0 | 8 | <0 |
| 7 | 33 | 35 | 16 | 14 | <0 |
| 24 | 53 | 46 | 47 | 24 | 35 |
| 48 | 56 | 52 | 51 | 22 | 54 |

Example 5

Cure Profiles of Sealants Incorporating Polyethers 4-6

Figure 4:
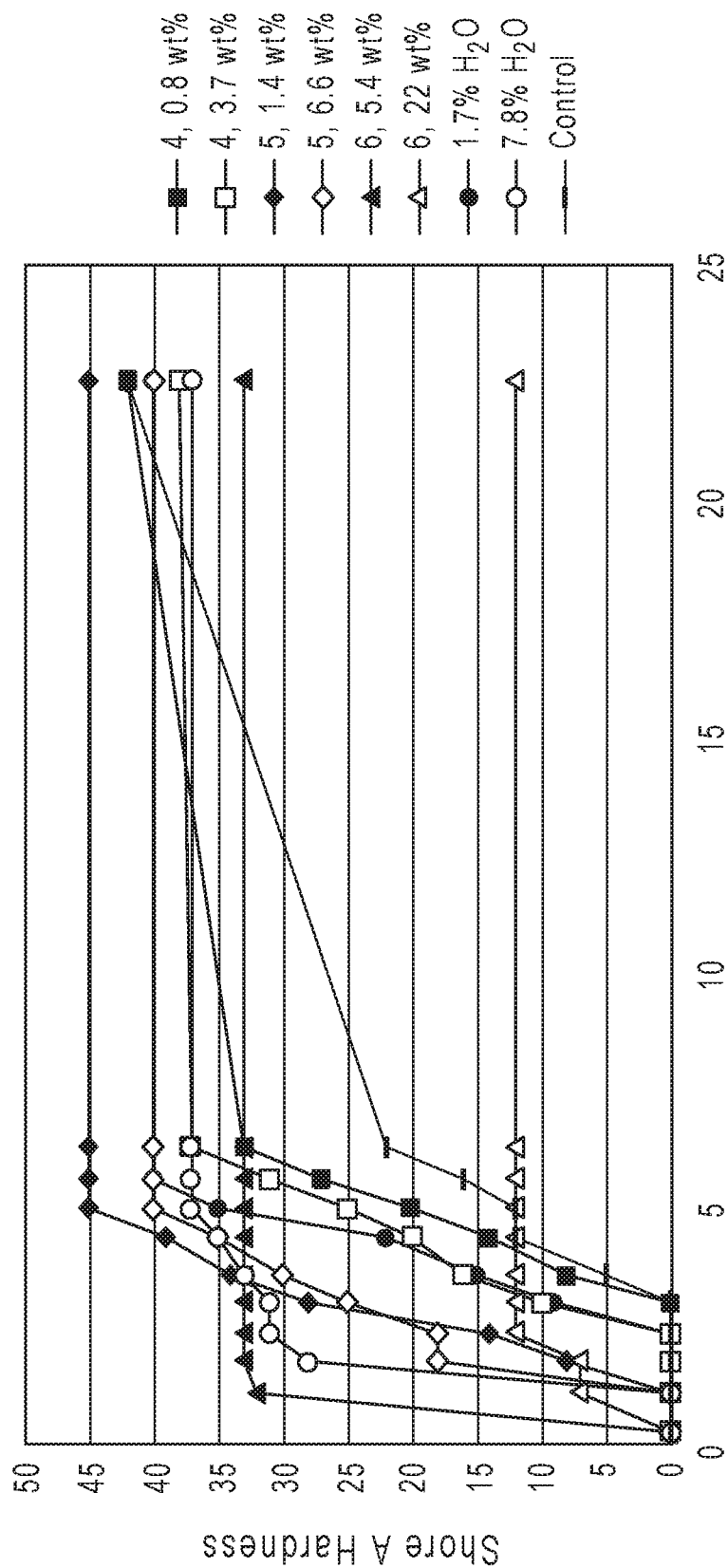
FIG. 4 shows the Shore A hardness during cure of polysulfide sealants containing different amounts and different types of polyethers, and polysulfide sealants containing water.

The Shore A hardness during cure of the sealant of Example 1 containing Polyether 4, Polyether 5, or Polyether 6 were compared with the control sealant. The results are presented in Table 8 and in FIG. 4 (polyether, wt %). The amounts of the polyether in the various sealant compositions are indicated as wt % of the total weight of the curable sealant composition. In addition, to determine the impact of water on the cure rate of the sealant, 1.7 wt % or 7.8 wt % water was added to two of the control sealant compositions.

TABLE 7

Shore A hardness during cure.

| | Polyether 4 Triton ® X-35 | | Polyether 5 Triton ® X-100 | | Polyether 6 Triton ® X-405 | | Control | | |
|---|---|---|---|---|---|---|---|---|---|
| Time (h) | 0.8 wt % | 3.7 wt % | 1.4 wt % | 6.6 wt % | 5.4 wt % | 22 wt % | 0 wt % H$_2$O | 1.7 wt % H$_2$O | 7.8 wt % H$_2$O |
| 2 | <0 | <0 | 14 | 18 | 33 | 12 | <0 | <0 | 31 |
| 3 | <0 | 10 | 28 | 25 | 33 | 12 | <0 | 9 | 31 |
| 4 | 14 | 20 | 39 | 35 | 33 | 12 | 12 | 22 | 35 |
| 5 | 27 | 31 | 45 | 40 | 33 | 12 | 16 | 40 | 37 |
| 6 | 33 | 37 | 45 | 40 | 33 | 12 | 22 | 40 | 37 |
| 23 | 42 | 38 | 45 | 40 | 33 | 12 | 42 | 40 | 37 |

Example 6

Solvent Resistance of Cured Sealants

Figure 5:
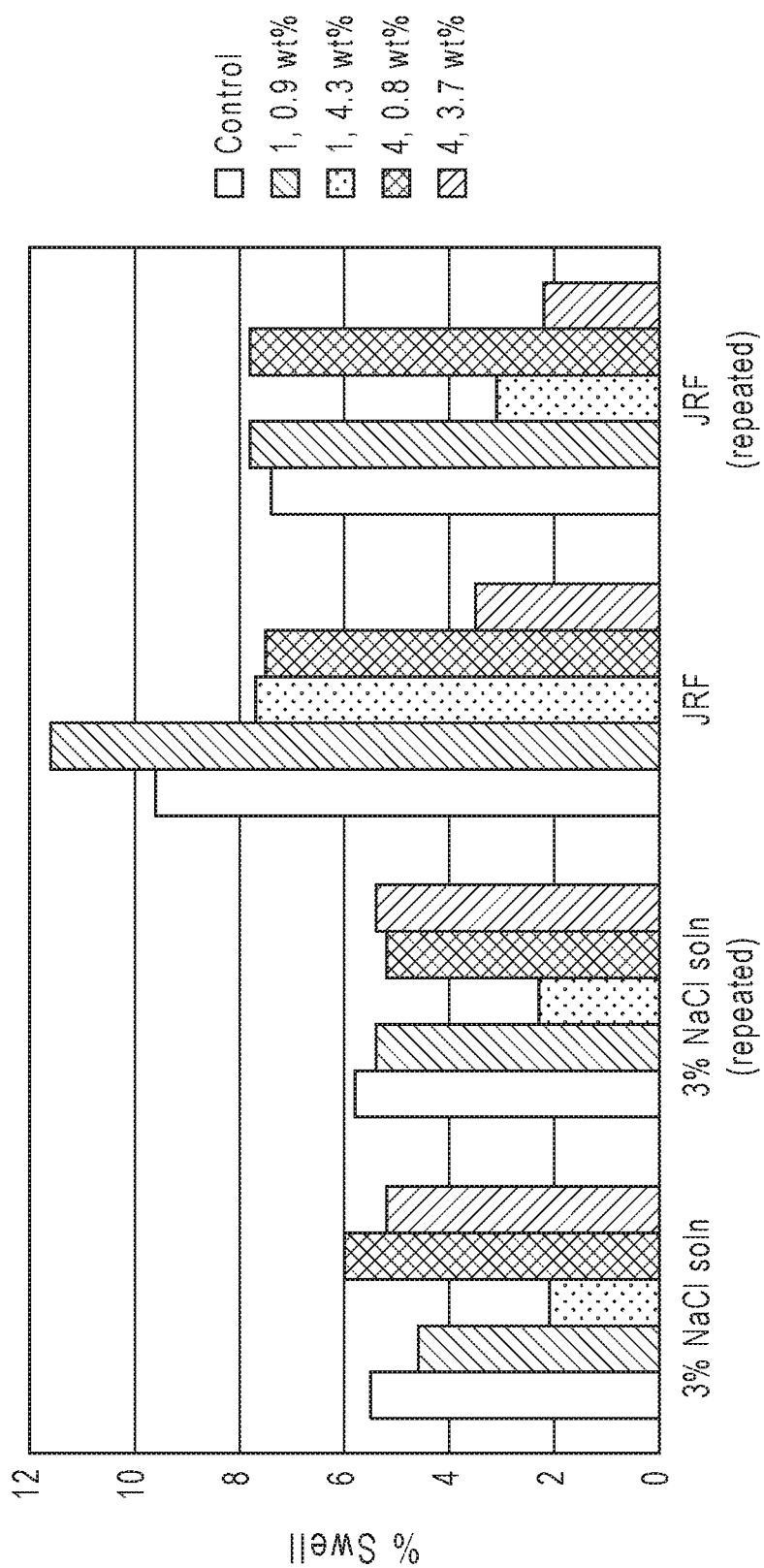
FIG. 5 shows the % swell of polysulfide sealants containing different types of polyethers following immersion in either 3% NaCl or JRF Type I for 7 days at 60° C.

The % swell of the cured sealant of Example 1 containing either Polyether 1 or Polyether 4, and a sealant without a polyether is shown in Table 9 and in FIG. 5 (polyether, wt %). The sealants were cured for 2 days at 25° C. and then for 1 day at 60° C. The cured sealants were then immersed in 3% NaCl or in JRF Type 1 for 7 days at 60° C. The tests were performed in triplicate.

TABLE 9

Percent swell following immersion in 3% NaCl or JRF Type I.

| Polyether | Content | 3% NaCl | 3% NaCl (repeated) | JRF Type 1 | JRF Type 1 (repeated) |
|---|---|---|---|---|---|
| Control | 0 wt % | 5.5 | 5.8 | 9.6 | 7.4 |
| Polyether 1 | 0.9 wt % | 4.6 | 5.4 | 11.6 | 7.8 |
| Carbowax ® 350 | 4.3 wt % | 2.1 | 2.3 | 7.7 | 3.1 |
| Polyether 4 | 0.8 wt % | 6.0 | 5.2 | 7.5 | 7.8 |
| Triton ® X-35 | 3.7 wt % | 5.2 | 5.4 | 3.5 | 2.2 |

Example 7

Cure Profiles of Sealants Incorporating Polyether 8 or Polyether 9

Figure 6:
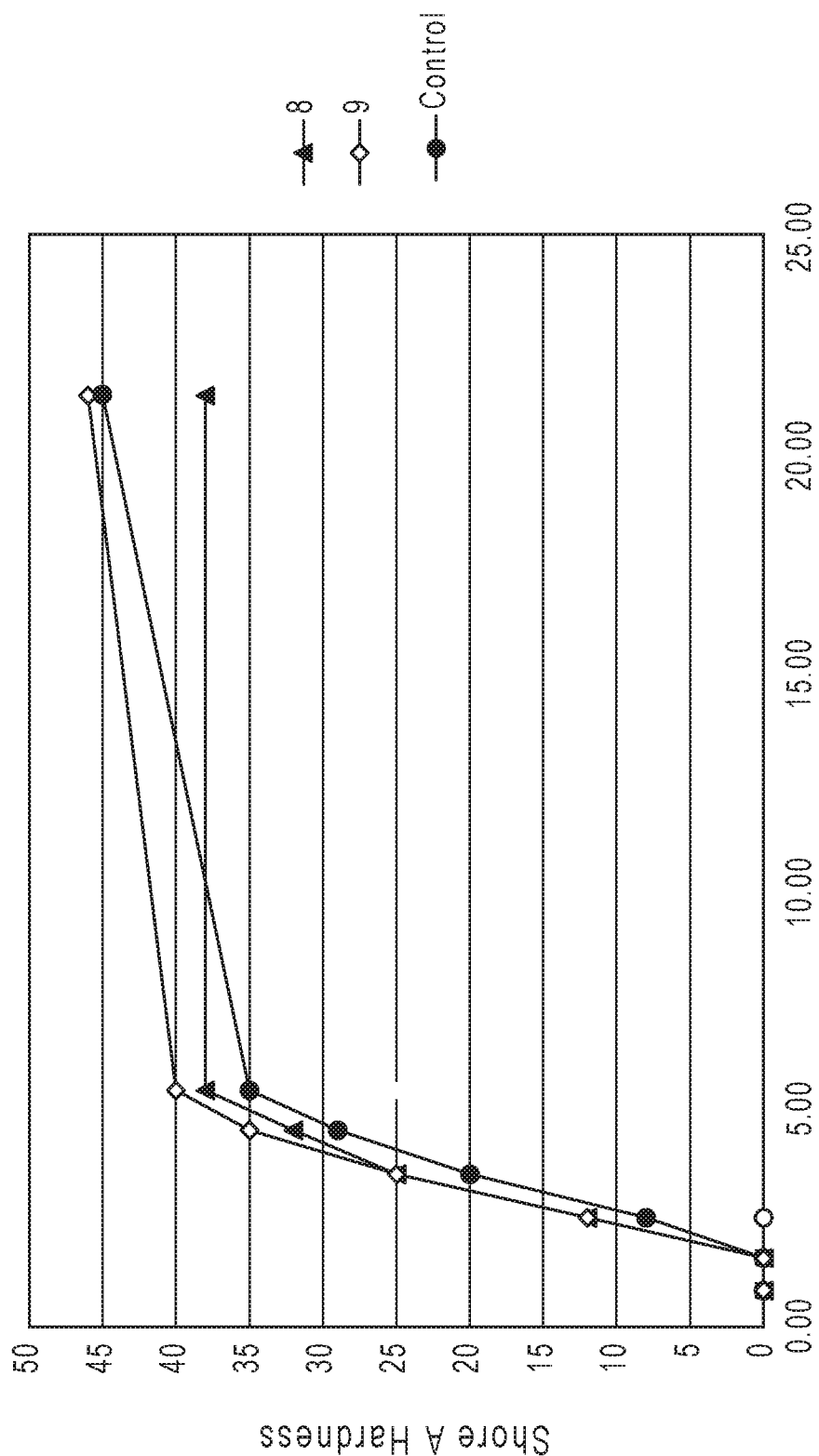
FIG. 6 shows the Shore A hardness during cure of polysulfide sealants containing different polyethers.

The Shore A hardness during cure of the sealant of Example 1 containing either Polyether 8 or Polyether 9 is shown in Table 10 and in FIG. 6 (polyether, wt %). The sealants contained 4.3 wt % and 0.9 wt % of the respective polyether, where wt % is based on the total weight of the curable sealant composition.

TABLE 10

Shore A hardness during cure.

| Time (h) | Control | Polyether 8 Terathane ® 650 | Polyether 9 Pluronic ® 17R4 |
|---|---|---|---|
| 2 | <0 | <0 | <0 |
| 3 | 8 | 12 | 12 |
| 4 | 20 | 25 | 25 |
| 5 | 29 | 32 | 35 |
| 6 | 35 | 38 | 38 |
| 120 | 48 | 47 | 47 |

Example 8

Cure Profiles of Sealants Incorporating Polyethers 10-13

Figure 7:
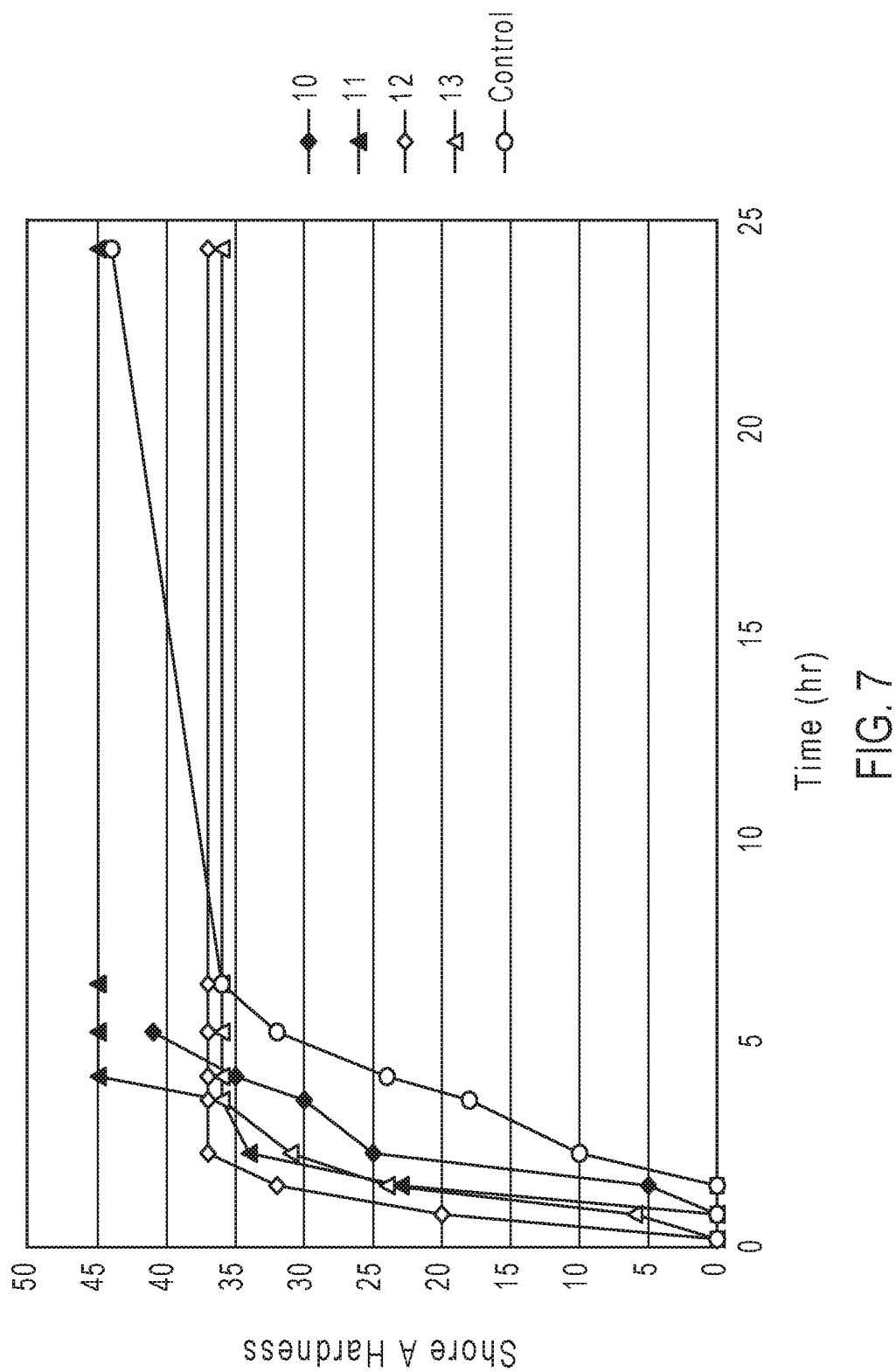
FIG. 7 shows the Shore A hardness during cure of polysulfide sealants containing different polyethers.

The Shore A hardness during cure of the sealant of Example 1 containing one of Polyethers 10-13 are compared to a sealant without a polyether in Table 11 and in FIG. 7 (polyether, wt %). The sealants contained 4.3 wt % of the respective polyether, where wt % is based on the total weight of the curable sealant composition.

TABLE 11

Shore A hardness during cure.

| Time (h) | Control | Polyether 10 Voranol® 220-056N | Polyether 11 Voranol® 220-110N | Polyether 12 Carbowax® 750 | Polyether 13 15-Crown-5 |
|---|---|---|---|---|---|
| 2 | 10 | 25 | 34 | 37 | 31 |
| 3 | 18 | 30 | 36 | 37 | 36 |
| 4 | 24 | 35 | 45 | 37 | 36 |
| 5 | 36 | 44 | 45 | 37 | 36 |
| 6 | 44 | 46 | 45 | 37 | 36 |
| 24 | 47 | 46 | 45 | 37 | 36 |

Example 9

Influence of Silica Content on Cure Profile

The influence of silica content on the effectiveness of the polyether synergist was evaluated for different silica content.

The composition of the Base Component is provided in Table 1. To prepare the Base component the polysulfide resins and adhesion promoters were combined and mixed, followed by the filler and remaining additives. The materials were intermittently mixed using a Flaktek mixer (insert type). The additional combined amount of the remaining components was then added and thoroughly mixed using the Flaktek mixer.

An additional filler component was added to the sealant. The additional filler content contained varying amounts of a porous hydrophobic silica (Sipernat® D13) and an additional amount of calcium carbonate (Socal® 2G 13UF) to bring the amount of the additional filler content to 1.2 wt % of the total weight of the curable sealant. The amount of porous hydrophobic silica in the additional filler component varied from 0 wt %, 50 wt %, 100 wt %, and 125 wt % based on the total weight of the additional filler component. Thus, the amount of porous hydrophobic silica varied from 0 wt %, 0.6 wt %, 1.2 wt %, and 1.5 wt % based on the total weight of the sealant. A nominal amount of calcium carbonate and porous hydrophobic silica is typically about 33 wt % and 1.2 wt %, respectively, based on the total weight of the sealant.

The Base component was then mixed with the $MnO_2$-containing Accelerator component (see Example 1, Table 2) at a 10:1 wt % ratio using the Flaktek to provide the curable sealant composition.

The sealant composition did not contain a polyether synergist.

Figure 8:
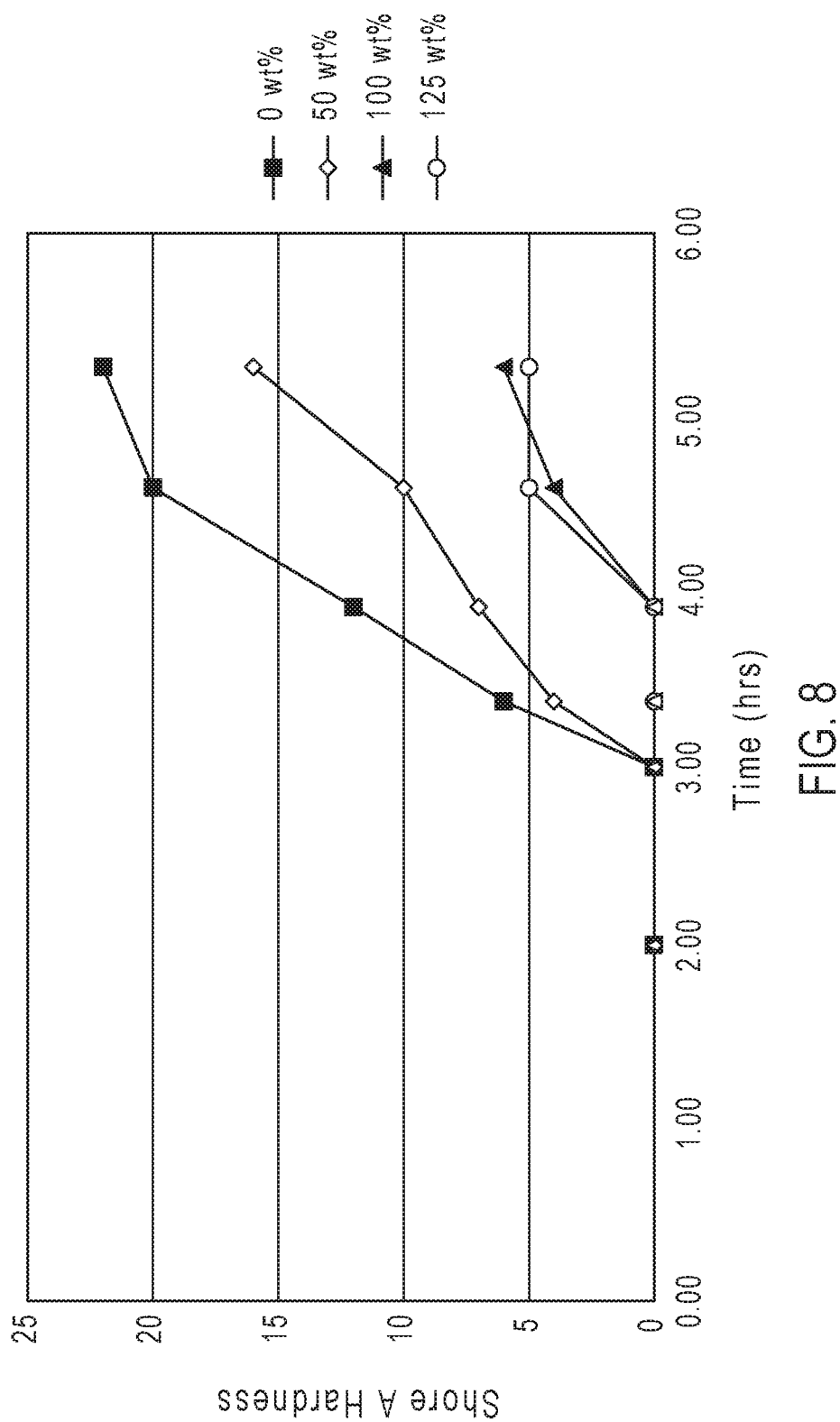
FIG. 8 shows the Shore A hardness during cure of polysulfide sealants containing different amounts of hydrophobic silica.

The sealant composition was molded into a disc (2 inches (50.8 mm) in diameter and 0.5 inches (12.7 mm) deep) and cured in a controlled humidity chamber at 50% RH, 25° C. until a constant final hardness was reached. The Shore A hardness was measured at intervals during the cure. The results are shown in Table 12 and in FIG. 8 (polyether, wt %).

TABLE 12

Shore A hardness during cure.

| | Hydrophobic Silica Content | | | |
|---|---|---|---|---|
| Time (h) | 0% | 50% | 100% | 125% |
| 2 | <0 | <0 | <0 | <0 |
| 3 | <0 | <0 | <0 | <0 |
| 4 | 6 | 4 | <0 | <0 |
| 5 | 12 | 7 | <0 | <0 |
| 6 | 22 | 16 | 6 | 5 |

Example 10

Influence of Non-Porous Filler on Cure Profile

The Base component was formulated similar to Example 9 except that the Base component did not contain silica and for the formulations without $TiO_2$ (Ti-Pure® Rutile R900 grade), the $TiO_2$ was replaced with an equivalent wt % of calcium carbonate (Socal® 2G 13UF).

The composition of the Accelerator component was the same as in Table 2.

A polysulfide cure accelerator, DPTT (dipentamethylenethiuram tetrasulfide), was added to a final wt % of either 1.4 wt % (50%) or 2.7 wt % (100%) based on the total weight of the Accelerator component.

The base was then mixed with the Accelerator component at a 10:1 wt % ratio using the Flaktek mixer to provide the curable sealant composition.

Figure 9:
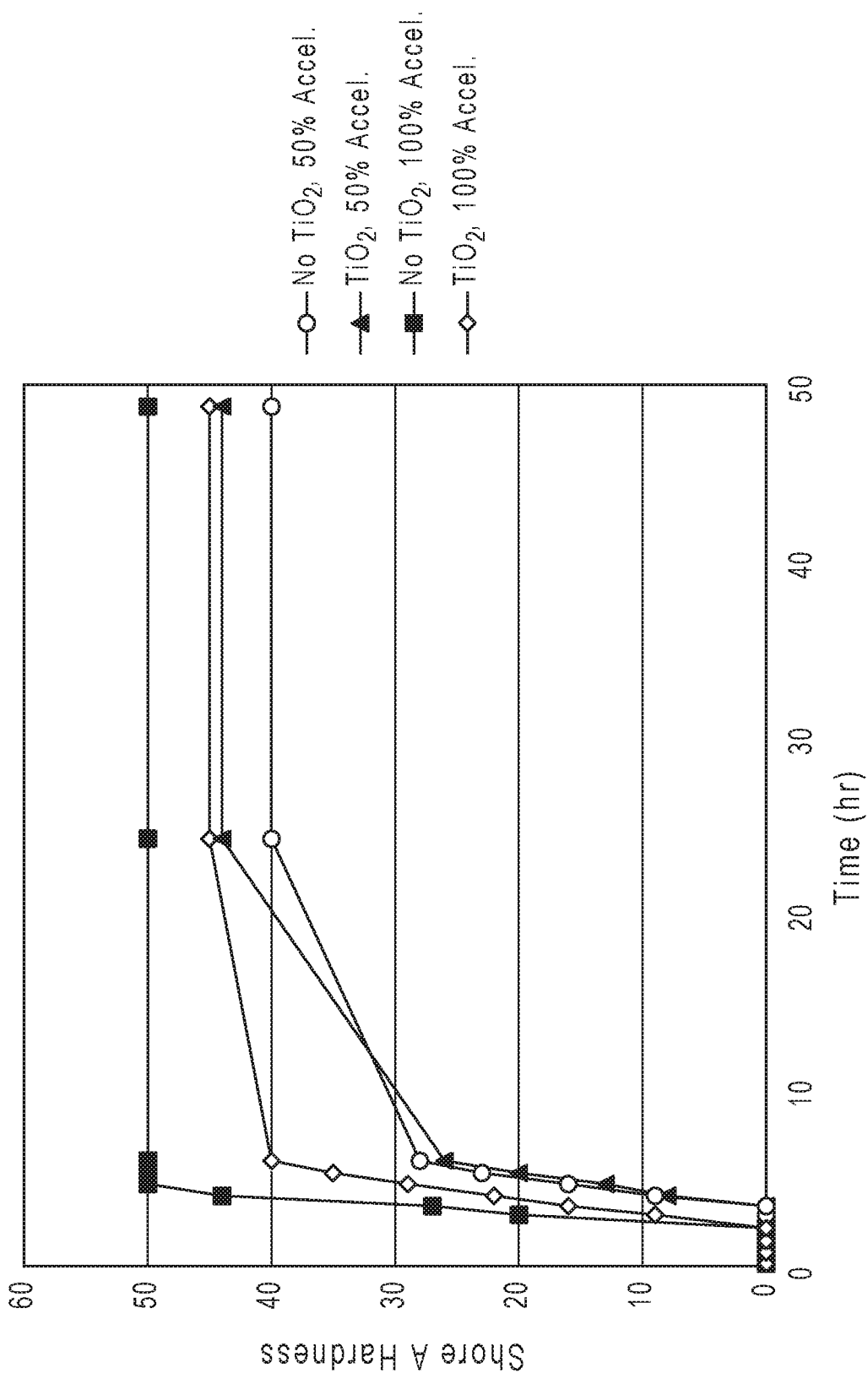
FIG. 9 shows the Shore A hardness during cure of polysulfide sealants containing different amounts of $TiO_2$ and different amounts of a polysulfide cure accelerator.

The sealant composition was molded into a disc (2 inches (50.8 mm) in diameter and 0.5 inches (12.7 mm) deep) and cured in a controlled humidity chamber at 50% RH, 25° C. until a constant final hardness was reached. The Shore A hardness was measured at intervals during the cure. The results are shown in Table 13 and in FIG. 9.

TABLE 13

Shore A hardness during cure.

| | No $TiO_2$ | | $TiO_2$ | |
|---|---|---|---|---|
| Time (h) | 50% DPTT | 100% DPTT | 50% DPTT | 100% DPTT |
| 2 | 0 | 0 | 0 | 0 |
| 3 | 0 | 20 | 0 | 9 |
| 4 | 9 | 44 | 8 | 22 |
| 5 | 23 | 50 | 20 | 35 |
| 6 | 28 | 50 | 27 | 40 |

Example 11

Influence of Hydrophilic Silica on the Cure Profile

The Base component was formulated similar to Example 4 except that a hydrophilic silica (Aerosil® 200; hydrophilic fumed silica, BET 175-225 $m^2/g$, 0.2-0.3 μm d50) replaced the hydrophobic silica.

The base was then mixed with the Accelerator component at a 10:1 wt % ratio using the Flaktek to provide the curable sealant composition.

Figure 10:
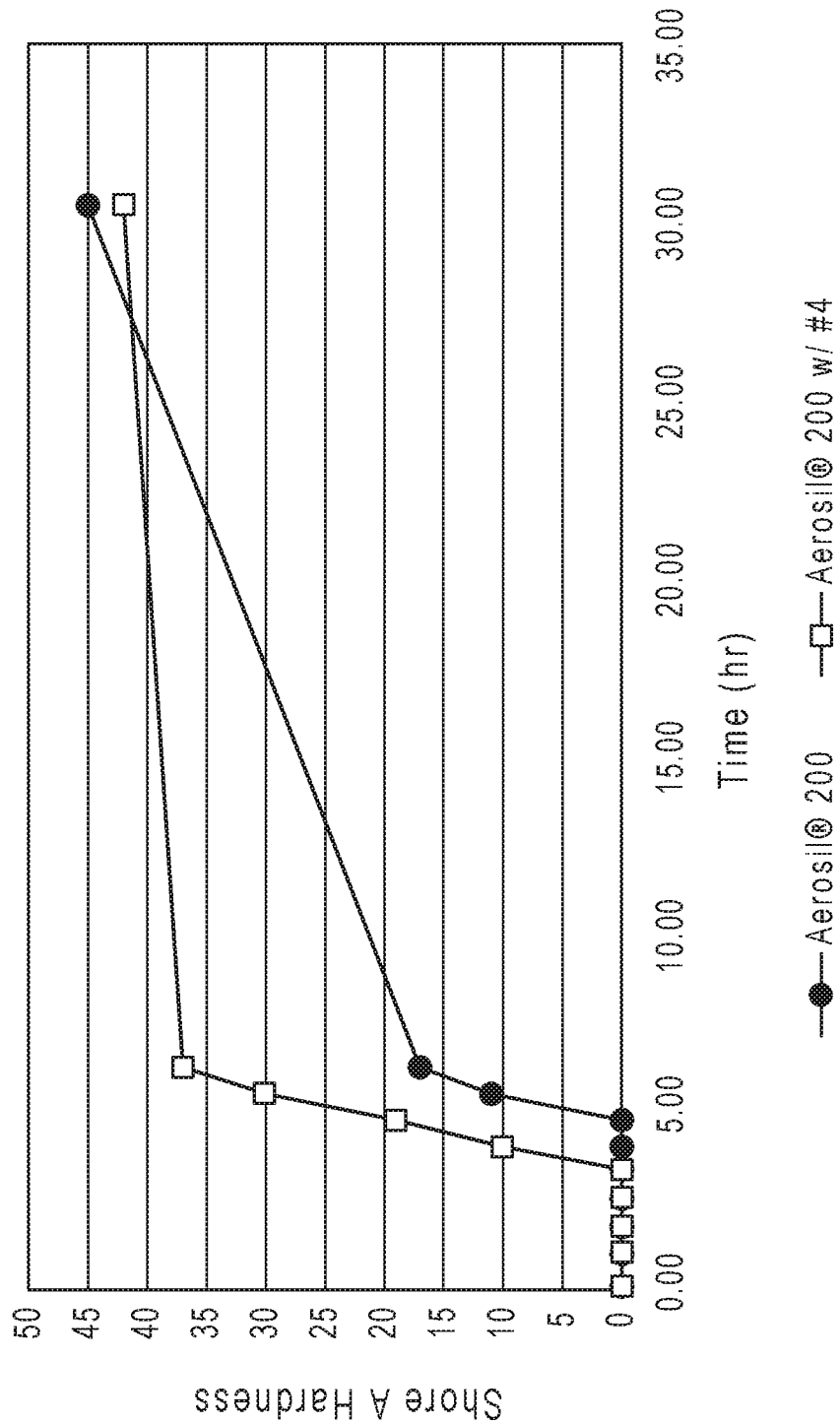
FIG. 10 shows the Shore A hardness during cure of polysulfide sealants containing hydrophilic silica, with and without a polyether.

The sealant composition was molded into a disc (2 inches (50.8 mm) in diameter and 0.5 inches (12.7 mm) deep) and cured in a controlled humidity chamber at 50% RH, 25° C. until a constant final hardness was reached. The Shore A hardness was measured at intervals during the cure. The results are shown in Table 14 and in FIG. 10.

TABLE 14

Shore A hardness during cure.

| Time (h) | No Polyether | Polyether 4 Triton ® X-35 |
|---|---|---|
| 2 | 0 | 0 |
| 3 | 0 | 0 |
| 4 | 0 | 10 |
| 5.5 | 11 | 30 |
| 6 | 17 | 37 |
| 30 | 45 | 42 |

The results demonstrate that the sealant cure profiles were similar whether a hydrophobic silica or a hydrophilic silica was used.

Example 12

Influence of Silica Type on the Cure Profile

The Base component was formulated similar to Example 9 with the exception that silica was replaced with one of the following silica: (1) Inhibisil™ 73 (1-73), a calcium-modified silica; (2) Lo-Vel™ 2018 (LV 2018), a wax-treated silica; (3) Lo-Vel™ 6000 (LV 6000), a non-treated silica; and (4) Hi-Sil™ T7000, a hydrophilic precipitated silica. The silica are available from PPG Industries, Inc. The sealant formulations with the various silica were tested with and without Polyether 1 (Carbowax® 350). The control sealant contained hydrophobic silica (Sipernat® D13).

The sealant compositions were molded into a disc (2 inches (50.8 mm) in diameter and 0.5 inches (12.7 mm) deep) and cured in a controlled humidity chamber at 50% RH, 25° C. until a constant final hardness was reached. The Shore A hardness was measured at intervals during the cure. The results are shown in Table 15 and in FIG. 11 (polyether, wt %).

TABLE 15

Shore A hardness during cure.

| | Without Polyether 1 | | | | | With Polyether 1 | | | | |
|---|---|---|---|---|---|---|---|---|---|---|
| Time (h) | LV 2018 | LV 6000 | Hi-Sil T700 | I-73 | Control | LV 2018 | LV 6000 | Hi-Sil T700 | I-73 ® | Control |
| 1 | 0 | 0 | 0 | 0 | 0 | 6 | 10 | 0 | 13 | 6 |
| 2 | 20 | 0 | 0 | 0 | 13 | 33 | 40 | 35 | 45 | 36 |
| 3 | 27 | 16 | 9 | 15 | 23 | 35 | 45 | 45 | 45 | 38 |
| 4 | 36 | 24 | 15 | 27 | 30 | 42 | 46 | 50 | 45 | 43 |
| 5 | 42 | 40 | 31 | 40 | 40 | 50 | 46 | 50 | 45 | 43 |
| 6 | 42 | 43 | 39 | 43 | 44 | 50 | 46 | 50 | 45 | 43 |
| 25 | 50 | 48 | 44 | 45 | 45 | 52 | 45 | 50 | 45 | 44 |

Figure 11:
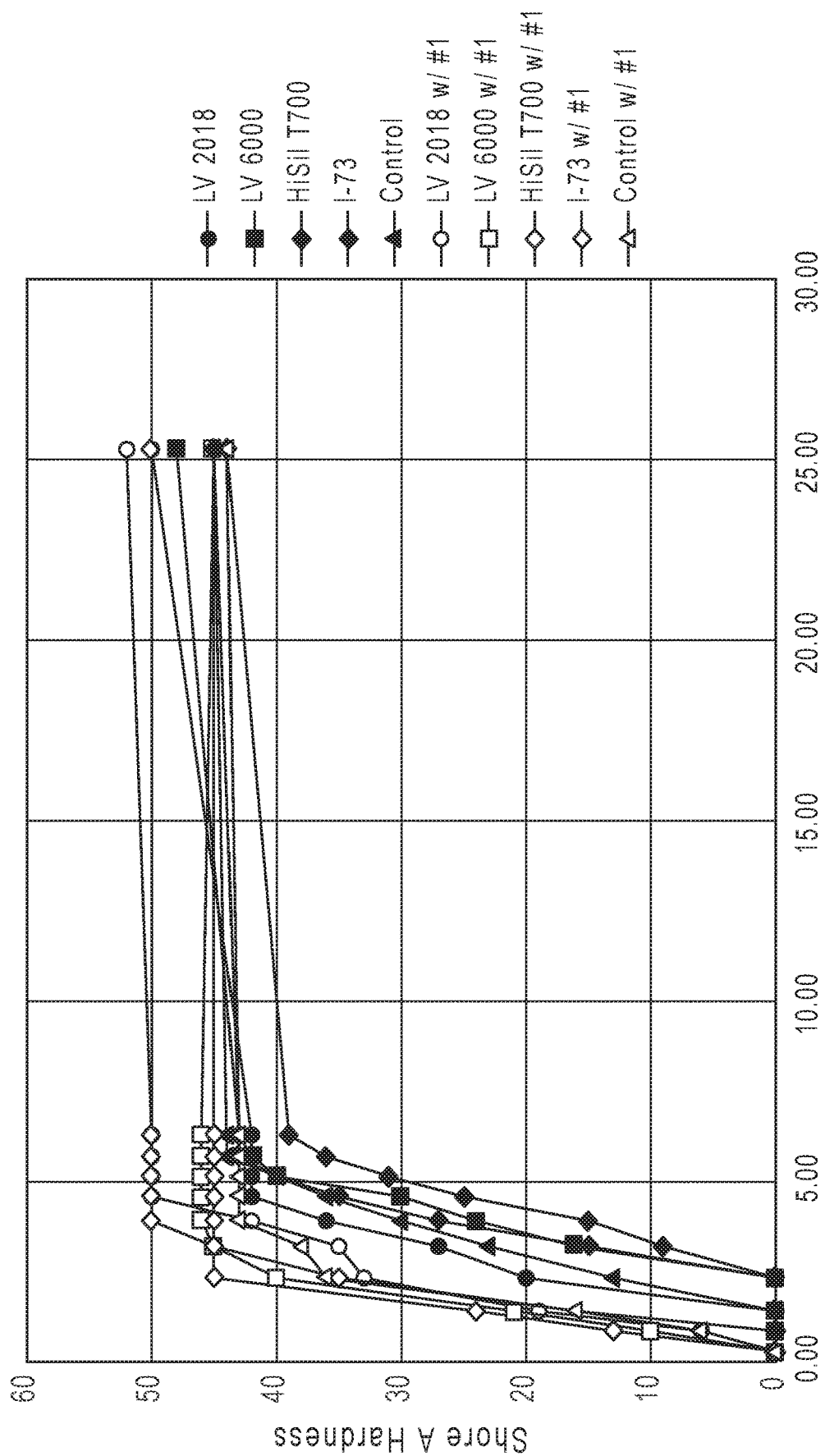
FIG. 11 shows the Shore A hardness during cure of polysulfide sealants containing different types of silica with and without a polyether synergist.

As shown in Table 15 and in FIG. 11, accelerated cure is observed for sealants containing the polyether synergist regardless of the silica type.

Example 13

Filler Properties

Table 16 shows properties of certain silica and $TiO_2$ used in the examples.

TABLE 16

Filler Properties.

| Filler | BET SA ($m^2/g$) | Total Pore Volume (mL/g) | Average Pore Diameter (nm) | Comments |
|---|---|---|---|---|
| Inhibisil ™ 73 | 14.3 | 0.06 | 17.3 | calcium modified silica |
| Lo-vel ™ 2018 | 145.1 | 1.44 | 21.4 | wax treated silica |
| Lo-vel ™ 8100 | 185.4 | 1.15 | 23.3 | wax treated silica |
| Lo-vel ™ 6000 | 591.1 | 1.16 | 12.1 | non-treated silica |
| Inhibisil ™ 75 | 17.3 | 0.07 | 17.9 | calcium modified silica |
| Hi-sil ™ T700 | 173.9 | 0.64 | 15.8 | hydrophilic precipitated silica |
| Hi-sil ™ WB10 | 141.8 | 0.55 | 18.5 | precipitated silica |
| Sipernat ® D13 | 110 | — | — | hydrophobic (PDMS treated) silica |
| Aerosil ® 200 | 175-225 | — | — | hydrophilic fumed silica |
| Ti-Pure ™ Rutile R900 | 2-160 | 0.03-1.0 | 10-15 | $TiO_2$; particle size is 3 orders of magnitude smaller than silica. |

Finally, it should be noted that there are alternative ways of implementing the embodiments disclosed herein. Accordingly, the present embodiments are to be considered as illustrative and not restrictive. Furthermore, the claims are not to be limited to the details given herein and are entitled to their full scope and equivalents thereof.

What is claimed is:
1. A composition, comprising:
 a thiol-terminated polysulfide prepolymer;
 a polysulfide cure activator;
 a polysulfide cure accelerator;
 a porous material; and
 a synergist, wherein the synergist comprises a polyether having a number average molecular weight less than 5,000 Da, wherein molecular weight is determined by gel permeation chromatography, and
 wherein the composition comprises from 0.1 wt. % to 10 wt % of the synergist, wherein wt % is based on the total weight of the composition.
2. The composition of claim 1, wherein,
 the polysulfide cure activator comprises a metal oxide; and
 the polysulfide cure accelerator comprises an amine-based sulfur donor.
3. The composition of claim 1, wherein the porous material is characterized by:
 a BET from 5 $m^2/g$ to 700 $m^2/g$;

a total pore volume from 0.01 mL/g to 10 mL/g;
an average pore diameter from 10 nm to 30 nm; or
a combination of any of the foregoing.

4. The composition of claim 1, wherein the porous material comprises silica, alumina, zinc oxide, titanium dioxide, zirconia, hafnia, yttria, rare earth oxides, boehmite, alkaline earth fluorides, calcium phosphates, and hydroxyapatite, or a combination of any of the foregoing.

5. The composition of claim 1, wherein the porous material comprises silica.

6. The composition of claim 1, wherein the composition comprises from 0.1 wt % to 10 wt % of the porous material, wherein wt % is based on the total weight of the composition.

7. The composition of claim 1, wherein the composition further comprises a filler.

8. The composition of claim 7, wherein the composition comprises from 5 wt % to 70 wt % of the filler, where wt % is based on the total weight of the composition.

9. The composition of claim 1, wherein the polyether comprises polyethylene glycol, polypropylene glycol, poly (tetramethylene ether) glycol, blocked copolymers of any of the foregoing, crown ethers, or a combination of any of the foregoing.

10. The composition of claim 1, wherein the polyether comprises terminal hydroxyl groups, terminal alkyl groups, terminal substituted phenyl groups, terminal (meth)acryloyl groups, or a combination of any of the foregoing.

11. The composition of claim 1, wherein the polyether comprises a polyether having the structure of Formula (7), the structure of Formula (8), or a combination thereof:

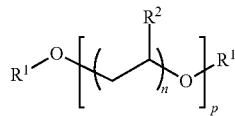

(7)

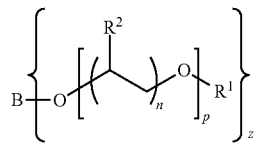

(8)

wherein,
n is an integer from 1 to 6;
p is an integer from 2 to 50;
z is an integer from 3 to 6;
each $R^1$ is independently selected from hydrogen, $C_{1-10}$ alkyl, (meth)acryloyl, and substituted aryl;
each $R^2$ is independently selected from hydrogen and $C_{1-3}$ alkyl; and
B is a polyfunctional moiety.

12. The composition of claim 1, wherein the composition comprises:
from 20 wt % to 70 wt % of the thiol-terminated polysulfide prepolymer;
less than 10 wt % of the polysulfide cure activator;
less than 2 wt % of the polysulfide cure accelerator; and
from 1 wt % to 6 wt % of the synergist,
wherein wt % is based on the total weight of the composition.

13. A cured composition prepared from the composition of claim 1.

14. A part comprising the cured composition of claim 13.

15. A method of sealing a part, comprising:
applying the composition of claim 1 to a surface of a part; and
curing the applied composition to seal the part.

16. A part sealed using the method of claim 15.

* * * * *